US005659625A

United States Patent [19]
Marquardt

[11] Patent Number: 5,659,625
[45] Date of Patent: Aug. 19, 1997

[54] METHOD AND APPARATUS FOR ANALYZING FACIAL CONFIGURATIONS AND COMPONENTS

[76] Inventor: Stephen R. Marquardt, 17262 Citron, Irvine, Calif. 92715

[21] Appl. No.: 247,614

[22] Filed: May 23, 1994

Related U.S. Application Data

[63] Continuation of Ser. No. 894,751, Jun. 4, 1992, abandoned.
[51] Int. Cl.⁶ .............................. G06K 9/00; G06F 15/00
[52] U.S. Cl. ........................ 382/118; 382/254; 395/135
[58] Field of Search ................................ 382/2, 19, 21, 382/25, 41, 118, 195, 197, 203, 276, 254; 364/413.13, 413.19, 413.22, 413.28; 395/120, 121, 124, 135

[56] References Cited

U.S. PATENT DOCUMENTS

| 3,805,238 | 4/1974 | Rothfjell | 382/2 |
|---|---|---|---|
| 4,729,098 | 3/1988 | Cline et al. | 395/124 |
| 4,975,969 | 12/1990 | Tal | 382/2 |

OTHER PUBLICATIONS

Morishima, Shigeo, "A Media Conversion from Speech to Facial Image for Intelligent Man–Machine Interface", IEEE, May 1991, vol. 9, No. 4, pp. 594–600.

Choi, Chang, et al., "A System of Analyzing and Synthesizing Facial Images", IEEE, 1991, pp. 2665–2668.
Waters, Keith, et al., "A Physical Model of Facial Tissue and Muscle Articulation", IEEE, 1990, pp. 77–82.
Fukuhara, J. et al., "3–D Motion Estimation for Model–Based Image Coding", IEE, Apr. 7, 1992, pp. 69–72.
Wright, A.M., "Facial Proportions in Medical Illustrating", *Anthropometric Facial Proportions in Medicine*, 1987, Chapter 13, pp. (143–153).
Panofsky, Erwin, "The History of the Theory of Human Proportions as a Reflection of the History of Styles," *Meaning in the Visual Arts*, 1955, Chapter 2, pp. (55–107).
Parramon, Jose M., *How to Draw Heads and Portraits*, 1989, pp. 10–17.

(List continued on next page.)

*Primary Examiner*—Leo Boudreau
*Assistant Examiner*—Matthew C. Bella
*Attorney, Agent, or Firm*—Lyon & Lyon LLP

[57] ABSTRACT

There is disclosed herein: (1) overlay systems which define a face, in frontal and lateral views, which are comprised of mathematically inter-related pentagons and parts of those pentagons and which establish a reference system to analyze human faces for surgical, cosmetic, and identification purposes; and (2) a method of applying the overlay systems to human faces or facial images to analyze the form and proportion of faces and components of those faces (e.g., eyes, nose, mouth, etc.) for surgical, cosmetic, and identification purposes.

28 Claims, 51 Drawing Sheets

OTHER PUBLICATIONS

Richter, Jean Paul, "On the Proportions and on the Movements of the Human Figure," *The Notebooks of Leonardo Da Vinci*, vol. I, Chapter 7, 1989, pp. PLIII–PLXVIII and 167–PLXXXVIII.

Strauss, Walter L., "Human Proportions," *The Complete Drawings of Albrecht Durer*, vol. 5, 1974, pp. 2411–2594.

Strauss, Walter L., *The Human Figure by Albrecht Durer—The Complete Dresden Sketchbook*, 1972, Chapter 16, pp. 218–241.

Cook, Theodore A., "Final Results," *The Curves of Life*, 1979, Chap. 20, pp. 407–432.

Goleman, D., & Bennett–Goleman, T., "Beauty's Hidden Equation," *American Health*, Mar. 1977, pp. 70–78.

Rufenacht, Claude R., "Structural Esthetic Rules," *Fundamentals of Esthetics*, 1990, Chapter 4, pp. 87–92.

Coleman, Samuel & Coan, C. Arthur, "The Golden Series in Nature," *Proportional Form—Further Studies in the Science of Beauty, Being Supplemental to Those Set Forth in Nature's Harmonic Unity*, 1920, Chapter 6, pp. 173–193.

Ghyka, Matila, *The Geometry of Art and Life*, 1977, pp. 1–168.

Powell, Nelson & Humphreys, Brian, *Proportions of the Aesthetic Face*, 1984, p. 172.

Hatfield, Elaine and Sprecher, Susan, *Mirror, Mirror... The Importance of Looks in Everyday Life*, 1986, pp. 1–397.

Jacobson, A., "The Proportionate Template as a Diagnostic Aid," *Amer. J. Orthodont.*, Feb. 1979, 75(2): 156–172.

Levin, Edwin I, "Dental Esthetics and the Golden Proportion," *Journal of Prosthetic Dentistry*, Sep. 1978, 40:244–252.

Lombardi, Richard E., "The Principles of Visual Perception and Their Clinical Application to Denture Esthetics," *The Journal of Prosthetic Dentistry*, Apr. 1973, 29:No. 4.

Peck, H., and Peck, S., "A Concept of Facial Esthetics," *Angle Orthodont.*, 1970, 40(4):284–317.

Ricketts, Robert M., "The Divine Proportion Applied to Orthodontic and Orthognathic Surgery," *Syllabus—The American Institute of BioProgressive Education*, p. 1–27.

Ricketts, Robert M., "The Golden Divider," *J. Clinical Orthodont.*, Nov. 1981, 15(11).

Ricketts, Robert M, "The Biologic Signifigance of the Divine Proportion and Fibonacci Series," *American Journal of Orthodontics*, May 1982, vol. 81, No. 5.

Ricketts, Robert M., "Divine Proportion in Facial Esthetics," *Clin. Plast. Surg.*, Oct. 1982, 9(4):401–422.

Caltagirone, J., & Kostecki, J.L., "The Face in Greek and Roman Art," *Plast. & Reconstruct. Surg.*, 1955, 15:165.

Farkas, L.G., & Hreczko, T.A., & Kolar, J.C. & Munro, I.R., "Vertical and Horizontal Proportions of the Face in Young Adult North American Caucasians—Revision of the Neoclassical Canons.," *Plast. Reconstr. Surg.*, Mar. 1985, 75(3):328–337.

Farkas, L.G., & Sohm, P., & Kolar, J.C., & Katic, J.J., & Munroe, I.R., "Inclinations of the Facial Profile: Art Versus Reality," *Plast. and Reconstr. Surg.*, Apr. 1985, 75(4):509–519.

Farkas, L.G., & Kolar, J.C., "Anthropometrics and Art in the Aesthetics of Women's Faces," *Clinics in Plastic Surgery*, Oct. 1987, 14(4):599–616.

Kawakami, S. and Tsukada, S., "Golden Proportion for Maxillofacial Surgery in Orientals," *Annals of Plastic Surgery*, Nov. 1989, 23(5):417–425.

Seghers, M.J., & Longacre, J.J., & Destefano, G.A., "The Golden Proportion of Beauty," *Plast. and Reconstr. Surg.*, 1964, 34:382.

Goleman, D., "Equation for Beauty Emerges in Studies," *New York Times —Science Times*, Tuesday, Aug. 5, 1986.

Walt Disney Home Video, "Donald in Mathmagic Land," Walt Disney Mini Classics, 1959.

220
236
223

230

184
186
188
190
192
194
196
198
200
202
204
206
208
210

212
214

170
172
174
176
224

*162*

*164*

*150*

METHOD AND APPARATUS FOR ANALYZING FACIAL CONFIGURATIONS AND COMPONENTS

This is a continuation of application Ser. No. 07/894,751, filed on Jun. 4, 1992, and which designated the U.S., now abandoned.

INTRODUCTION

The present invention relates to a method and apparatus for analyzing facial configurations and/or facial components which can be used to: (1) plan surgical corrections or other treatments; (2) plan cosmetic application schemes; or (3) establish a "fingerprint" of any human face for identification or study.

BACKGROUND

The face is the most important part of the human body for interpersonal communication, emotional expression, and most other forms of social interaction. The face is also the primary feature of the body by which people recognize one another. Even newborn infants have a natural ability to recognize familiar faces.

Throughout human history, societies have placed great emphasis and value on facial attractiveness. The significance of the aesthetics of the face is demonstrated by the thousands of works of art and sculpture dedicated to portraying attractive facial features. Modern research studies suggest that human beings have a natural tendency to prefer facial configurations that are aesthetically pleasing. Studies have shown that persons whose faces are attractive are more likely to be perceived as personable, intelligent, and are generally perceived as possessing a variety of positive attributes. Sociological researchers have chronicled many of the benefits enjoyed by those who are fortunate to be born with a configuration of facial features that is aesthetically pleasing. The benefits of having an attractive face have been shown to begin very early in life and to continue throughout the formative years and well into adulthood. It has been documented that parents tend to give more attention and care to babies with more attractive faces. Studies also reveal that teachers perceive attractive children as more intelligent and popular than their less attractive peers. In comparisons of facial attractiveness, better looking high school females were found to be enjoying a higher socioeconomic status 15 years later compared to their other classmates. Even in the military, when a class of West Point cadets were rated for attractiveness, and later compared with their rank achieved after graduation, the more attractive cadets tended to achieve a higher military rank than the less attractive cadets.

Recent sociological studies also suggest that the tendency of humans to prefer an attractive face is not learned from society or from constant exposure to the popular culture. Strong evidence suggests that perceptions of attractiveness or beauty are generally similar in persons in different nations and even in diverse cultures.

While it is oft said that "beauty is in the eye of the beholder," researchers have also discovered that perceptions of beauty vary little from culture to culture, and that perceptions of beauty do not vary substantially from person to person. When asked to rank photographs of 20 young women in the order of attractiveness, responses from over 100,000 Americans showed substantial agreement as to which photographs featured the most attractive faces. Furthermore, recent research has revealed that these perceptions begin shortly after birth. Researchers have discovered that even newly born infants show a positive reaction to photographs of attractive faces.

Unfortunately, those born with facial deformities are likely to suffer greatly from social prejudices. Throughout history, ridicule, ostracization, and even death have been inflicted on people who suffer from facial deformities.

Modern medicine and surgical techniques offer hope to those born with facial deformities or those whose faces are deformed from accident or disease. Today, surgeons can use X-ray models, synthetic implants and a variety of other techniques to improve facial appearance. However, although modern medicine offers improved techniques and materials, neither artists, surgeons, nor sociologists are presently able to understand why certain faces are perceived as attractive nor are those skilled in the art able to offer a technique to describe the physical parameters that, when viewed together as a human face, cause a face to be perceived as attractive.

Many attempts throughout history have been made to develop parameters to quantify idealized facial proportions and, in essence, to quantify human faces. Attempts to quantify human faces initially stemmed from the Greek philosophy that all beauty and aesthetics are based on mathematics. The Greeks proposed that all beauty could be quantitatively determined and analyzed, and that the essence of beauty in all things was mathematical. The Greeks showed great interest in a mathematical relationship called the "Golden Proportion" that is discussed in detail below. Following the Renaissance, the study of facial beauty, particularly in art, led to multiple attempts, most notably by Leonardo Da Vinci and Albrecht Durer, to quantify facial proportions and to establish a "norm" from which all faces could be analyzed.

In the last few centuries, the attempts to quantify facial proportions involved measuring distances of and between the facial features of persons considered normal or attractive by the individual performing the study. Significant studies with large numbers of subjects were not conducted until the twentieth century. In the last one hundred years, the studies were conducted primarily by plastic surgeons and orthodontists who were continually studying faces and attempting to quantify selected facial dimensions and proportions. Although the medical and dental literature is replete with studies of the face, there are certain inherent weaknesses in the studies.

Dentists, particularly orthodontists, are naturally interested in function and, rather than studying attractive faces and soft tissue parameters, dental studies tend to focus on faces having normal function and only then studying those faces for soft tissue parameters. Thus, the studies do not disclose detailed parameters for attractive faces, rather the studies tend to depict functional parameters or soft tissue aesthetic parameters which are common to people with "normal function" who may or may not be attractive.

Plastic surgeons have been interested primarily in soft tissue drape and focused their attention on measuring the parameters for ideal soft tissue drape configurations. The weakness of the medical literature is the tendency to study isolated facial soft-tissue topography as opposed to the entire face as a unit. Studies of the nasal angle, nasal frontal angle, nasal tip projection, etc., are helpful only in analyzing individual parts of the face and give little or no information regarding an ideal or aesthetically pleasing relationship of those features to the rest of the face.

The general weakness in this literature is a tendency to borrow parameters and canons for soft tissue aesthetics from the artists of the classical and Renaissance periods. Much of the contemporary literature in this area merely restates these classical canons adhered to by early artists.

Although techniques for orthodontics as well as oral surgery and plastic surgery have become extremely sophisticated. Whether one is controlling development of the facial bones or teeth through orthodontics, restructuring facial bones through oral or reconstructive surgery, or reconfiguring facial soft tissue through plastic surgery, the technical expertise to perform these procedures has advanced far beyond the ability to comprehensively diagnose variations from an ideal facial form because an apparatus or technique to analyze the face as a whole and to provide a guide towards achieving an overall attractive appearance does not presently exist. Therefore, the improvements in technical skills in medicine and dentistry in the twentieth century, particularly in orthodontics, oral surgery, and plastic surgery, heightens the need to develop unifying parameters for an ideal facial form.

Early Greek mathematicians discovered that it is possible to describe a mathematical relationship between two linear distances as follows:

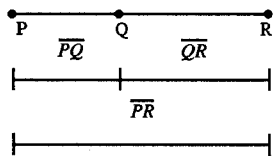

such that the distance from P to Q when compared to the distance from Q to R, has the same ratio as the distance from Q to R compared to the distance from P to R. This relationship applies only when the ratio of the distance between Q and R and the distance between P and Q is 1.618 $\overline{18}$ or approximately 89/55. Greek mathematicians recognized the unique properties of a mathematical proportion where the ratio between the greater proportion and smaller part is equal to the ratio between the whole and the greater part. This proportion, typically indicated with the Greek letter Φ, has been called the "Golden Proportion" or the "Golden Section" and has long been used by artists, architects, and other scholars to create aesthetically pleasing works of art and structures. Architects studying the Parthenon built on the Acropolis in Athens, Greece in the Fifth Century B.C. have noted that the Golden Proportion is reflected in the architectural design of the frontal view of the Parthenon.

As used here, the greek letter Phi (Φ) represents the "golden proportion" or its numerical value (≈89/55). Using phi, identical sets of numbers can be generated through both geometric and arithmetic progressions. For example, setting Φ=1,618, a geometric progression can be defined as follows:

1.000×Φ=1.618

1.618×Φ=2,618

2.618×Φ=4.236

4.236×Φ=6.854

6.854×Φ=11.090 the corresponding arithmetic progression is:

1,000+Φ=2.618

Φ+2.618=4,236

2.618+4,236=6.854

4,236+6.854=11.090

Thus, Φ is unique. The same set of numbers is generated both geometrically and arithmetically and any product in the geometric progression can be determined by adding the two preceding products in the sequence.

These unusual properties of phi are well known. In addition, much has been written about the occurrence of the phi proportion in nature. A number of examples of the Golden Proportion can be found in animal and plant life and the importance of the natural symmetry of the Golden Proportion has been studied in the context of biological growth mechanisms. For example, the Golden Proportion is reflected in the structure of a number of flowers and when applied mathematically to construct a spiral shape, describes the appearance of certain shell types. The Golden Proportion was applied to human aesthetics as early as the ancient Greeks who noted that the distances from the top of the head to the navel and from the navel to the feet were related to each other, and to the total height of the body, by the Golden Proportion Φ.

The Golden Proportion has been recognized as describing an aesthetically pleasing relationship between the sizes of the frontal upper teeth when viewed from the front and has been applied by a number of scholars in making linear measurements to analyze dental aesthetics. Beyond application to the teeth, a number of researchers have noted the appearance of the Golden Proportion in measuring the linear distances between certain points on the face. For example, in the attractive face the width of the mouth in repose is roughly 1.618 multiplied by the width of the nose. In the 1946 book *The Geometry of Art and Life*, Professor M. Ghyka undertakes a detailed and comprehensive analysis of the Golden Proportion (Φ) and its application to biological systems. Professor Ghyka notes that the Φ ratio, in an "average or ideal" face, describes the vertical linear distance of the face and the distance from the line of the eye brows to the lower chin. The Φ ratio also is noted to describe the linear vertical distance from the lower part of the nose to the lower tip of the chin and the lower tip of the chin to the meeting line of the lips. Ghyka applied rectangles containing line segments corresponding to the Golden Proportion to the frontal view of the face of an Olympic athlete. Furthermore, a practical application of the principles set forth by Ghyka to plastic surgery is discussed in "The Golden Proportion and Beauty" a medical journal article published in 1964. Doctors used the rectangular relationships noted by Ghyka to repair a severe facial deformity in a patient resulting from untreated facial fractures suffered in childhood.

BRIEF DESCRIPTION OF THE INVENTION

It has been discovered that the parameters of an attractive face and the orientation of the features that are collectively recognized as an attractive face, can be described using a collection of lines and points selected from a composite of pentagons whose sizes are related by the proportion and mathematical formula described above. Based on the discovery that certain lines and points suggested by the pentagon composite are common to faces that are perceived as attractive, this invention uses selected points and lines to construct an overlay system that illustrates major and minor features common to beautiful faces and may be used for several purposes, including as a guide in application of cosmetics, as a presurgical aid for planning plastic and reconstructive surgery, or as a standard for analyzing the face for academic study or for quantifying the features of the face for use in an identification system. In a preferred embodiment, the overlay system is applied to a recorded image of a face and variations between the face and the overlay system are analyzed.

This invention uses a composite of pentagons whose size is related by the Φ proportion to describe the points and lines which are used to develop an overlay system to describe individual soft-tissue parameters and overall configurations of an attractive face and provides an actual overlay system for the face in repose in both the frontal and lateral view and in a smiling face in the lateral and frontal view. By applying the technique described here, one skilled in the art may use the pentagon complex system to analyze other facial expressions.

Moreover, this invention enables description of a large number of the major and minor details that individually and collectively cause the features of the face, and the face as a whole, to be perceived as beautiful or attractive. By describing the elements of an attractive face in both the lateral and frontal view, this invention enables a three-dimensional analysis of the aesthetic quality of the face. Significantly, the overlay system defined by this invention is not limited to merely describing an ideal proportion for the distance between two points, but rather describes the smooth features of the face, individually and collectively, and provides a unifying model that describes the individual features of the face and how they interrelate to form a face that is aesthetically pleasing.

Most applications of the overlay system to a subject's face requires that an image of the subject's face be obtained. A variety of techniques may be used to produce a facial image suitable for use with the present invention. The simplest is a conventional photograph or set of photographs showing both frontal and profile or lateral views of the face. Alternatively, and depending on the reasons for using this invention to analyze the face, it is possible to use a video system consisting of a camera and monitor. Video cameras are particularly suitable when used with a monitor to display a fixed image of the face. Video camera compatible computer systems are available that allow an image of the face recorded with a video camera to be altered on a screen so that the visual results of a prospective surgical procedure may be analyzed. Moreover, recent developments in computer technology allow creation of three-dimensional models of faces that can be manipulated to be advantageously used with the method and apparatus disclosed by this invention.

The use of advanced computer-image analysis systems allows one skilled in the art to use the comprehensive and detailed parameters described by this invention as a means to create an electronic "fingerprint" that may be used to identify persons based on their facial appearance. One potential application of the overlay system would be to perform sophisticated measurements of the human face for use in a security system. Using the overlay system described here, a computer could analyze the face of an individual and measure and store a large number of parameters describing the individual's facial features based on an application of pentagon complexes or overlay systems to the individual's face and a large number of measurements of the variance points. Once that information is stored in the computer, the computer possesses a virtual "fingerprint" of the individual's face. This process would allow the computer to recognize individuals whose facial features have been analyzed and stored. Such a system would offer unique advantages when used in a security system, as an aid to identification, in law enforcement, or in any application where repeatable identification of an individual's face is important. Even where a face has aged or been surgically altered, certain parameters of the face such as the distance between the pupils or the distance between the ear canal and the pupil are difficult or impossible to alter surgically. Modern computer technology could assess the deviations between two faces and determine the probability that two faces were the same individual.

Also, a bust or moulage of the face may be made from a mold to obtain a three-dimensional facial image. As will become apparent from the following description, depending on the application, one particular image-recording device may offer advantages over another. For example, for advantageously applying cosmetics to a face using the overlay system of this invention, a photographic print may be preferred because it is simple and inexpensive. For most cases of cosmetic or reconstructive surgery, a collection of photographs will be satisfactory for use of this invention to plan and anticipate the results of a contemplated procedure. In other cases, computer-generated images of the face, or images recorded with a video camera that may be altered using a computer, may be preferred due to the enhanced capability of showing the soft tissue of the face before and after surgery. In these cases, the overlay system of this invention may be stored in the computer and applied to the image of the face being generated on a computer display screen.

The present invention discloses apparatus and methods for their construction and use, comprising a overlay system which outlines an idealized facial configuration standard and can be used to analyze individual facial configurations to:

(1) analyze the aesthetics of a face with respect to the overlay systems to aid in applying cosmetics or planning surgical corrections or other treatments to correct variations from a desired appearance (e.g., augmentation, reduction or repositioning of facial parts or components);

(2) quantify facial proportions relative to the overlay systems or pentagon complexes; and (3) mathematically quantify individual facial proportions, for example, for security or identification purposes.

The parameters and configuration of an attractive human face can be depicted by selecting lines and points from a composite of pentagons termed "pentagon complexes" whose sizes are related to each other according to the proportions disclosed herein. The pentagon complexes are formed from:

(1) a primary pentagon complex which forms a basic framework for the overlay system and from which specific lines, line segments, and points have been selected to construct the component lines and points of the overlay system; and (2) various secondary pentagon complexes, the sizes of which are mathematically related to the primary pentagon complex and from which specific lines, line segments, and points have been selected to construct the component lines and points of the overlay system.

In brief summary, to apply one preferred embodiment of the overlay system of this invention, the lateral view of a face in repose, the following general steps are executed:

(1) A lateral view image of the person's face is recorded (e.g., via photograph, computer, etc.) ensuring that the expression of the face is properly posed and that the head is properly positioned.

(2) Anthropometric points are established on the facial image.

(3) An overlay system containing a lateral view in repose (FIG. 1) is placed upon the image and certain anthropomorphic points of the overlay system are aligned with those marked on the facial image.

(4) The lateral overlay system is sized, oriented, and adjusted to the facial image to enable a comparison between the overlay system and the image.

(5) The facial image is compared to the overlay system and the variations noted or measured.

The same five basic steps (which may be performed manually or via computer) are followed to analyze a person's face from a frontal perspective or with a smiling expression by using a frontal view or smiling overlay system. Thus, the overlay systems of the present invention, whose derivation and use is described in much greater detail below, may then be used to analyze a person's face to detect deviations from the overlay systems. It is generally recognized that humans exhibit a static facial expression known as "repose," and ten dynamic facial expressions: happiness/joy, surprise, anger, loathing/contempt, fear, distress/sadness, interest/excitement, disgust, shame and guilt. The facial expressions that are perceived as the most attractive are the face in repose and the smiling face. Therefore, it is believed that the overlay systems for these two facial expressions, as provided in FIGS. 1 through 4, are the most useful analytical tools for analyzing the aesthetics of a face.

To practice this invention, FIGS. 1–4 can be used by creating a transparency directly from the figures and applying it to the image of a face. The detailed description below that describes how the individual points and lines that form the overlay system are derived from the various pentagon complexes need not be relied upon to analyze the aesthetic properties of a particular face by applying an overlay system to an image of a subject's face. The detailed descriptions of the derivation of the overlay system of FIGS. 1–4 is provided to enable one skilled in the art to practice this method of analysis for other facial expressions and for the minor deviations from the overlay system in FIGS. 1–4 that have been observed in the male face.

The overlay system was derived from application of the pentagen system and complexes of the faces of females. It is believed that the overlay system can be advantageously applied to the male face. Observation suggests that the primary distinction between the ideal female parameters and the ideal male parameters rests primarily in a more angular face and more prominent lower jaw. Applying one of the pentagon complexes described below, the repose smile complex of the frontal repose overlay system 220, the outline of the attractive male jaw may be described.

Furthermore, depending on the nature of a computer system used with this invention, the detailed and specific description of the lines that form the overlay systems described here will further enable quantifying the facial parameters.

DETAILED DESCRIPTION OF THE INVENTION

For purposes of reference and description, individual anthropometric points or features of the soft tissue of the face are defined as follows and as indicated in FIGS. 5, 6, 7, and 8 and may be described herein with the two or three letter designation indicated. For the purposes of this description, "anterior" indicates the direction towards the front of the head and to the right of the printed page in FIGS. 1, 3, 5, and 7. The term "posterior" indicates the direction towards the back of the head and to the left on the printed page in FIGS. 1, 3, 5, and 7. The term "inferior" refers to the lower portion of the feature and to the bottom of the printed page in FIGS. 1 through 8. The term "superior" refers to the upper portion of a feature and to the top of the printed page in FIGS. 1 through 8. As used in the context of this invention, the term "overlay" and "overlay system" refers to a graphic representation of the features of an aesthetically pleasing face, or component part thereof, that can be compared to a subject's face for analysis. The "overlay system" does not merely describe the distances between two points, but provides an outline of individual facial features and the entire face that is aesthetically pleasing. In some cases, the "overlay system" is a tangible object that will actually physically overlay the image of a face. In other cases, the "overlay system" may electronically overlay the face such as where the "overlay system" of this invention may be applied to a face using a computer system. Similarly, using a specially selected projector, the "overlay system" may be visually projected onto the face to be analyzed.

Referring to the lateral or profile view in FIGS. 5 and 7, the following anthropometric points are primary:

Primary Points

1) Pupil Point (PU)—the center of the pupil 1 seen in a frontal view and the most anterior point of the pupil 1 seen in a profile view.
2) Tragion (T)—the notch 2 on the upper margin of the tragus 25.
3) Cheilion (CH)—the most lateral extent 3 of the outline of the lips.
4) Porion (POR)—the highest point 4 on the upper margin at the cutaneous auditory meatus.
5) Otobasion Inferius (OBI)—the point 5 of attachment of the ear lobe to the cheek.
6) Alare Posterior (AP)—the most posterior point 6 of the soft tissue outline of the lateral cartilaginous wall of the naris.
7) Glabella (GS)—the most anterior point 7 on the soft-tissue forehead.
8) Nasion (NS)—the most concave point 8 of the soft-tissue outline of the bridge of the nose.
9) Trichion (TRU)—the point 9 on the hairline in the midline of the forehead. In early childhood, identification of this landmark may be difficult because of an irregular or indistinguishable hairline. It cannot be determined on a balding head.
10) Pronasale (PRN)—the most anterior point 10 of the nose.
11) Menton (MES)—the most inferior point 11 of the soft-tissue outline of the chin.
12) Pogonion (PGS)—the most anterior point 12 on the convexity of the soft-tissue chin.
13) Inferior Palpebrion (IPR)—the most inferior point 13 of the inferior palpebral line on the right lower eyelid.
14) Subtragion (SBT)—the point 14 where the tragus joins the intertragal notch.

Again referring to FIGS. 5 and 7, the following anthropometric points are secondary:

Secondary Points

15) Subnasale (SBN)—the point 15 at which the columella merges with the upper cutaneous lip.
16) Vermilion Superius (VS)—the point 16 at the intersection between the vermilion border of the upper lip and the cutaneous portion of the upper lip.
17) Labrale Superius (LS)—the most anterior point 17 on the convexity of the upper lip.
18) Upper Stomion (UST)—the most inferior point 18 of the anterior portion of the upper lip.
19) Lower Stomion (LST)—the most superior point 19 on the anterior portion of the lower lip.

20) Labrale Inferius (LI)—the most anterior point 20 on the convexity of the lower lip.

21) Vermilion Inferius (VI)—the point 21 of intersection between the vermilion border of the lower lip and the cutaneous portion of the lower lip.

22) Gnathion (GNS)—the most everted point 22 of the soft-tissue chin between the Pogonion 12 and the Menton 11.

23) Gonion (GN)—the most posterior point 23 of the lower mandible.

24) Malar Point (MLR)—the most everted point 24 on the convexity of the cheek.

25) Tragus (TRG)—the soft-tissue lobe 25 between the tragion 2 and the subtragion 14.

To practice this invention, it is necessary to properly orient the head relative to the image-recording device. The following procedure describing the technique to properly orient the face before recording a frontal or lateral image, assumes the use of a conventional camera or video camera that may be fixed in a stable position so that the position of the subject's head may be adjusted relative to the camera.

To record an image of the face of a subject for use with this invention, the hair should be pulled back so that the entire face and ears are exposed from the hairline to the chin bottom. The teeth should be lightly held together. The facial expression should be one of repose where the muscles of the face are completely relaxed with the eyes open as in a naturally awake state. Proper pupil position is established by directing the subject to look at the reflection of their own eyes in a mirror positioned at eye level. Once proper pupil position is achieved, the position of the head is carefully adjusted relative to X, Y, and Z axes before the image is recorded. The following discussion assumes that the X and Z axes are horizontal axes that are parallel to the floor (or horizontal plane) on which the subject is standing and that the Y axis is a vertical axis perpendicular to the floor on which the subject is standing. The overlay system possesses distinct reference axes defined by the features of the face portrayed in the overlay system.

On the lateral view, the Z axis of the overlay system is a line parallel to $\overline{\text{IPR-POR}}$ and passing through a midpoint 29 which is the bisection of $\overline{\text{PU-AP}}$. The Y axis is a line perpendicular to the Z axis and passing through midpoint 29 as described above. The X axis is perpendicular to both the Y and the Z axes passing through a midpoint 29 as described above. On the frontal view, the Y axis of the overlay system is a line coincident with F and the X axis is perpendicual to the Y axis at the level of the coronal plane bisecting the line segment $\overline{\text{PU-AP}}$, intersecting at a midpoint 30. The Z axis is perpendicular to the Y and X axes and intersects them at a midspoint 30.

As used in this description, the phrase "line of view" refers to an imaginary line from the eye of the viewer to a point on the object being recorded. When using a conventional lens reflex or video camera, the line of view actually extends from the center of the image plane to the center of the image as it appears in the viewfinder of the camera.

The following procedure is followed for obtaining a properly oriented, or "true," lateral image of the face. Referring to FIG. 5, the true lateral image is obtained by adjusting the position of the head relative to the line of view of the camera or other image-recording device such that a line A passing through the pupil point 1 and the alare posterior 6 is perpendicular to the horizontal plane. In addition, the position of the head should be adjusted so that a line B passing through the inferior palpebrion 13 and the porion 4 is parallel to the horizontal plane. When lines A and B are oriented as described, the lateral view of the face is thus initially oriented relative to the Y and Z axes.

To achieve proper orientation of the lateral image view of the face relative to the Y axis, the position of the head is adjusted so that a midsagittal plane of the head is perpendicular to the horizontal plane. Proper rotation about the Y and Z axis is achieved by verifying that the image plane of the camera is parallel to the midsagittal plane. The height of the camera should be adjusted so that the line of view is perpendicular to the midsagittal plane at a midpoint 29 that bisects the segment of the line A between the pupil point 1 and the alare posterior 6 (line segment $\overline{\text{PU-AP}}$). This establishes the proper orientation relative to the X axis.

Although a rough approximation of the proper head position may be achieved by extremely careful visual inspection, it is preferable in practice to achieve a more precise orientation of the face by actually marking important lines and points on the face as an aid to visualizing proper head position or by projecting horizontal and vertical lines, such as lines A and B in FIG. 5, onto the face and adjusting the head position so that the points indicated above fall on the projected lines.

It is also possible to project the overlay system in FIGS. 1 through 4 directly onto the subject's face using specially selected projection equipment. To project the overlay, a lens system is needed that will not enlarge or reduce the size of the overlay as it is projected through space.

Once proper orientation in the X, Y, and Z axes is achieved, the facial expression of absolute repose is posed and the image recorded. If another facial expression is also to be analyzed, that expression is posed without altering the head position and the image recorded. After all desired images are recorded, each of the primary and secondary anthropometric points of the soft tissue of the face are identified and designated on the recorded image of the face in absolute repose. If a photograph of the face has been obtained, one may simply place marks on the image corresponding to the primary and secondary points as described herein.

Once the points are marked on the recorded image of the subject's face, the overlay system that is the subject of this invention can be applied to that image. Preferably a transparency containing the overlay system is placed onto a photograph of the face on which the primary and secondary anthropometric points have been marked.

The proper size and orientation of the overlay system is determined by comparing the location of certain points, and the length and location of certain line segments, on the facial image and on the overlay system. The technique described here for positioning the head with the face in repose is also used to position the head to the smiling face and other facial expressions. To record an image of facial expressions other than repose, the head is first positioned with the face in repose, then the desired facial expression is posed just prior to the image being recorded.

To create the line segments described here, a straight line of finite distance is drawn between, and terminates on, two points. Thus, a line segment from a point A to a point B, would be designated as $\overline{\text{AB}}$ herein, would contain points A and B as endpoints and would have a length equal to the minimum distance between points A and B.

Referring to FIG. 5, the pupil point 1 of the overlay system should be "coincident," meaning placed directly on top of so as to partially or totally cover the pupil point 1 of the subject's facial image. When the pupil point 1 of the overlay systems and the facial image are aligned, the size of the overlay system relative to the facial image must be adjusted. To do so, the size of the entire lateral overlay system is reduced or enlarged so that the length of the line segment from the pupil point 1 to the cheilion 3 $\overline{\text{PU-CH}}$ in the overlay system is equal to the length of the line segment $\overline{\text{PU-CH}}$ in the facial image. The proper size of a lateral overlay system is verified by comparing, between the image of the face and the lateral overlay system, the length of the line segment from: (1) the pupil point 1 to the alare posterior 6 (line segment $\overline{\text{PU-AP}}$), (2) the pupil point 1 to the menton 11 (line segment $\overline{\text{PU-MES}}$), (3) the pupil point 1 to the potion 4 (line segment $\overline{\text{PU-POR}}$), and (4) the alare posterior 6 to the potion 4 (line segment $\overline{\text{AP-POR}}$).

Once the length of the $\overline{\text{PU-CH}}$ line in the overlay system is correct, and verified with the four other line segments, the overlay system is properly sized in the Y and Z axis.

To establish the proper orientation of the lateral overlay system in the Y-Z plane, the overlay system transparency is rotated around the pupil point 1, maintaining coincidence of the pupil points 1 on the overlay system and pupil point 1 on the facial image. The final orientation of the overlay system is set by visually examining the relative positions of lines and points on the facial image and the overlay system. In setting the final orientation of the overlay system relative to the face, primary consideration is given to placing line segment $\overline{\text{PU-POR}}$ of the overlay system coincident to or parallel with the $\overline{\text{PU-POR}}$ line of the facial image or, alternatively, tangent to the POR point 4 of the facial image. Secondary consideration is given to adjusting the overlay system such that the $\overline{\text{PU-AP}}$ line coincides with the $\overline{\text{PU-AP}}$ line of the facial image. Proper position of the lateral overlay system in the Y-Z plane is verified by insuring approximate coincidence between the tragus 25 and the otobasion inferius 5 in the lateral overlay system and the facial image.

To finally orient the overlay system on the Z axis, the overlay system is moved along the Z axis to achieve a best fit between the primary anthropometric points of the overlay system and the corresponding points of the face. In determining a best fit, aesthetic judgment may guide the fine adjustments to the positioning of the overlay system relative to the facial image. For example, if the outline of the chin and jaw alone are being analyzed, the remaining points on the facial image would be given priority in fixing the location of the overlay system so that the subject's chin and jaw could be compared to the position of the chin and jaw in the overlay system. In most cases, less priority is given to achieving coincidence of the ear features because it has been discovered that the location of the ear may vary in individuals who otherwise possess highly attractive facial features.

Therefore, the analyst may make numerous fine adjustments by changing the orientation of the overlay system to the study of the points on the profile of the face that are of interest.

Generally, the following points are significant in creating the aesthetic appearance of the face: Pupil Point 1, Cheilion (CH) 3, Alare Posterior 6, Glabella Point (GS) 7, Nasion Point (NS) 8, Trichion Point (TR) 9, Pronasale Point (PRN) 10, Menton (MES) 11, Pogonion (PGS) 12, Subnasale (SBN) 15, Vermillion Superius (VS) 16, Labrale Superius (LS) 17, Upper Stomion (UST) 18, Lower Stomion (LST) 19, Labtale Inferius (LI) 20, Vermillion Inferius (VI) 21, and Gnathion (GNS) 22.

These last fine adjustments now establish the position of the overlay on the lateral repose face image and this in turn establishes the true Y and Z axes of the subject face. The amount of variance between the segment of the B $\overline{\text{POR-IPR}}$ on the facial image and a line segment $\overline{\text{POR-IPR}}$ on the overlay system is noted. If any variance exists, the $\overline{\text{POR-IPR}}$ segment of the overlay system should be transferred to the face to create a hypothetical $\overline{\text{POR-IPR}}$ segment for later application to the orientation technique for the frontal view.

The principles that are used to position the head to properly record the image of the frontal view of the face are similar to those described above for the lateral view. In practice, when the lateral view is properly fixed initially, proper orientation of the frontal view is more precisely obtained. Therefore, it is preferable to fix the lateral orientation of the head and face, record the lateral image, and then re-position the image-recording device and make minor adjustments to the head position to obtain the frontal images.

Referring to FIG. 7, proper rotation of the head for the frontal view relative to the X axis is achieved by adjusting the position of the head until the line B in the lateral view that contains the inferior palpebrion (IPR) 13 and the porion (POR) 4 is parallel to the horizontal in the true lateral view. To avoid introducing an error in the frontal view relative to the position in the X axis that may be caused by a misalignment of the inferior palpebrion (IPR) 13 and the porion (POR) 4 in the subject's face, the amount of variance in the position of the line segment $\overline{\text{POR-IPR}}$ of the subject's face and the $\overline{\text{POR-IPR}}$ line segment of the overlay system, which was noted in setting the lateral view, is examined. If the $\overline{\text{POR-IPR}}$ line in the lateral view of the subject's face varied from the $\overline{\text{POR-IPR}}$ line segment of the lateral overlay system, the $\overline{\text{POR-IPR}}$ line segment (or sufficient reference points to allow the segment to be visualized) from the lateral overlay system was transferred to the facial image and the subject's head oriented so that this transferred line is parallel to the horizontal. When the $\overline{\text{IPR-POR}}$ line segment is properly aligned with the horizontal, the frontal view is properly oriented relative to the Z axis.

To achieve proper orientation relative to the X axis, the midsagittal plane of the head should be perpendicular with the horizontal. Proper rotation relative to the Y axis is obtained by verifying that the frontal plane of the face is parallel to the image plane of the image recording device and that the line of view is contained in the midsagittal plane. The orientation of the frontal view is correct when the axes of the frontal view and the axes of the lateral view are coincident. Also, when the head is properly oriented, the X axis of the frontal view is perpendicular to the Y and Z axes of the lateral view.

Finally, the height of the image recording device is adjusted so that the line of view is perpendicular to the frontal plane, coincident with the midsagittal plane, and coincident with a coronal plane at a vertical level such that the coronal plane bisects the line segment $\overline{\text{PU-AP}}$. This establishes proper orientation of the image recording device. As with the lateral view, the entire face should be exposed from hairline to chin bottom including the ear, the facial expression of absolute repose is confirmed, and the image recorded. If another facial expression is also to be analyzed, that expression is posed without altering the head position and the image recorded.

After all desired images are recorded, each of the primary and secondary anthropometric points of the soft-tissue of the face are identified and designated on the recorded image of the face.

Using the recorded image of the frontal view of the face, the anthropometric points are established as indicated below. The following points are designated as primary points and are consistent with the descriptions given above for the lateral view: right pupil point 1, left pupil point 1', right cheilion 3, left cheilion 3', right alare posterior 6, and left alare posterior 6'.

The following points are designated as secondary points of the frontal view and are consistent with the descriptions given above as used with the lateral view: trichion 9, menton 11, right malar point 24, left malar point 24' right gonion point 23, and left gonion point 23'.

Referring to FIG. 7, to properly apply the overlay system to the frontal view of the facial image, a midline is established by constructing the following line segments. Referring to FIG. 7, a first line segment 1—1' is drawn from the right pupil point 1 to the left pupil point 1'. A second line segment 3—3' is drawn from the right cheilion 3 to the left cheilion 3'. A third line segment 6—6' is drawn from the right alare posterior 6 to the left alare posterior 6'. The mid-points 26, 27, and 28 of the three line segments 1—1', 3—3', 6—6' are measured and marked and a straight vertical line F that attempts as much as possible to intersect the three mid-points 26, 27, and 28 respectively are drawn.

As with the lateral repose overlay system of FIG. 1, the frontal repose overlay system of FIG. 2 is best used by creating a transparency of FIG. 2 and overlaying the transparency onto a properly oriented photograph of the frontal view of the face.

To orient the frontal overlay complex relative to the Y axis, the line F of the frontal overlay system is placed coincident to the line F of the facial image.

The proper size of the frontal overlay system is determined by enlarging or reducing the overlay system such that (1) the right pupil point 1 and left pupil point 1' of the overlay system lie on line segment 1—1' of the facial image, and (2) the right cheilion 3 and left cheilion 3' lie on line segment 3—3' of the frontal overlay system.

The correct vertical size for the frontal overlay complex is verified by evaluating the correlation of the length of the line segment between the trichion 9 and the menton 11 (TRU-MES) in the facial image and the frontal overlay system. The horizontal size is verified by evaluating the length of the line segment between the right malar point 24 and the left malar point 24' and the right gonion point 23 and the left gonion point 23' and respectively, as well as facial outline.

A final adjustment of the orientation of the frontal overlay complex is accomplished by visually performing a best fit of the primary anthropometric points while maintaining approximate coincidence of line Γ of the facial image and line Γ of the frontal overlay system. In making the final adjustment, the secondary points, trichion 9, mention 11, right gonion 23, and left gonion 23', and right malar 24 and left malar 24' points are considered as are the remaining anthropometric points of the frontal view. Aesthetic judgment and the particular use to which the invention is applied should be considered when applying the frontal overlay system as in the application of the lateral repose overlay system.

Moreover, due to the wide variety of potential uses to which the overlay system may be advantageously applied, the user of the overlay system may choose to analyze the face or an individual feature in a multitude of ways. The technique described above instructs on how to achieve the proper orientation of the head so that the overlay system disclosed here can be consistently and advantageously applied. Once the overlay system is properly sized to fit a properly oriented facial image, the user of this invention may then apply the knowledge thus obtained in several ways. For example, if the overlay system suggests that the face would be aesthetically enhanced by de-emphasis of a particular feature, the user may apply cosmetics to achieve the desired effect. The surgeon may use the same information to plan a procedure and then check a hypothetical post-operative face against the overlay system to determine whether the result of the surgery will be desirable in terms of the overall harmony of the facial features. Alternatively, the researcher may use the overlay system to qualitatively or quantitatively study the facial features for medical or sociological studies, and/or security or identification purposes.

(1) $\Phi/2$ times the base pentagon; and (2) $2/\Phi$ times the base pentagon.

Figure 14A:
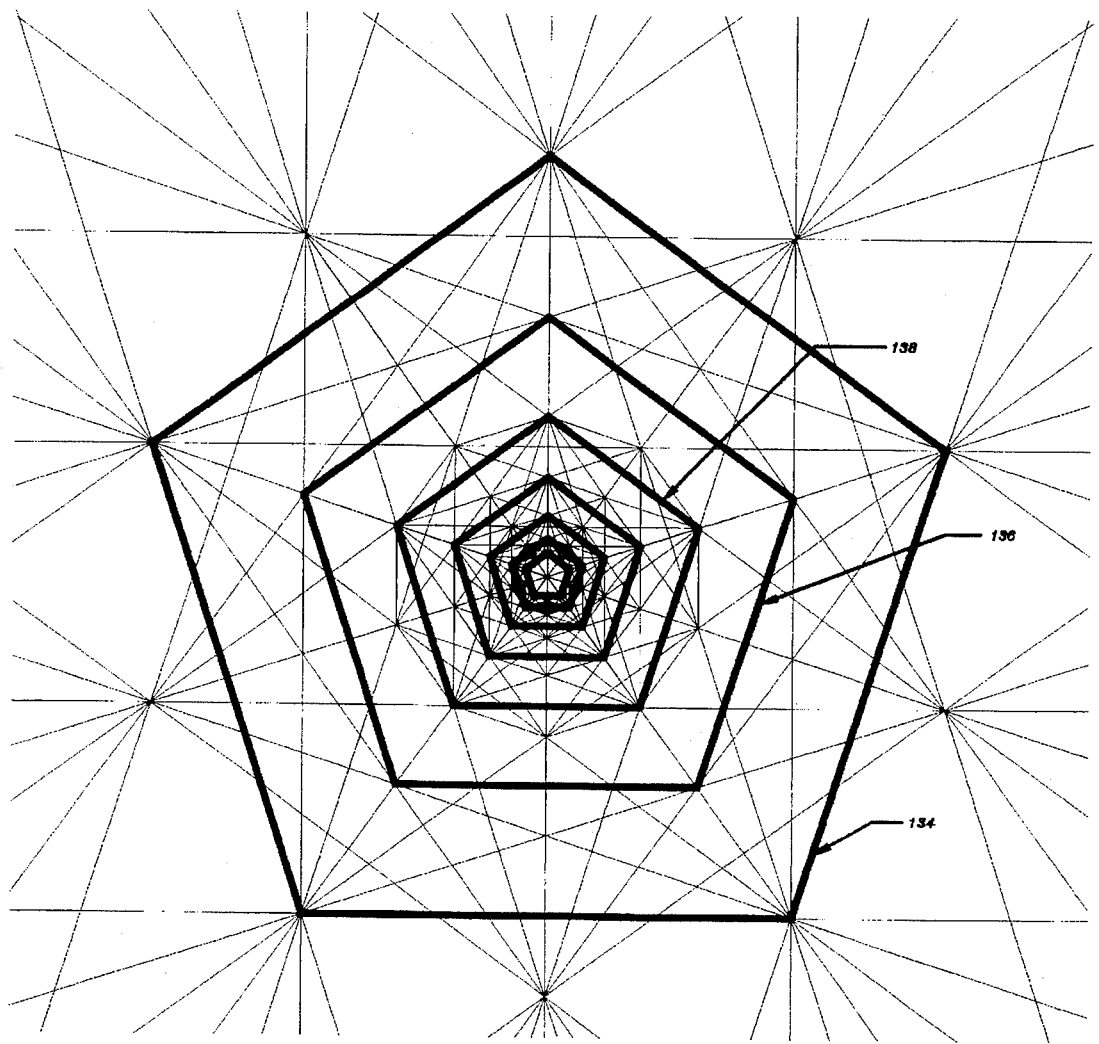
FIG. 14A shows concentric pentagons each of which is related in size by a factor of $1/\Phi$ times the next larger pentagon.
Figure 14B:
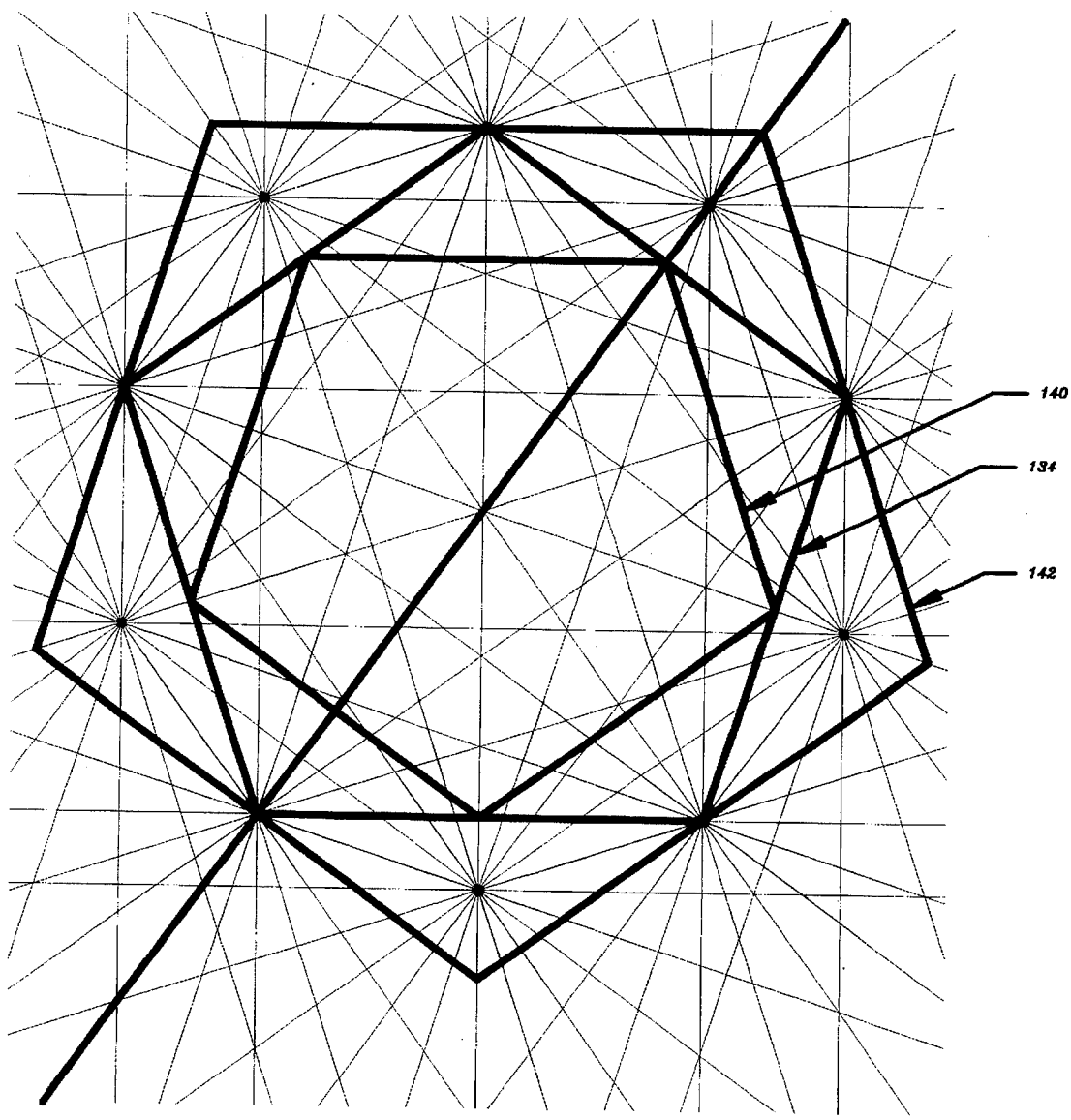
FIG. 14B shows the size relation between a base pentagon and pentagons sized.
Figure 14C:
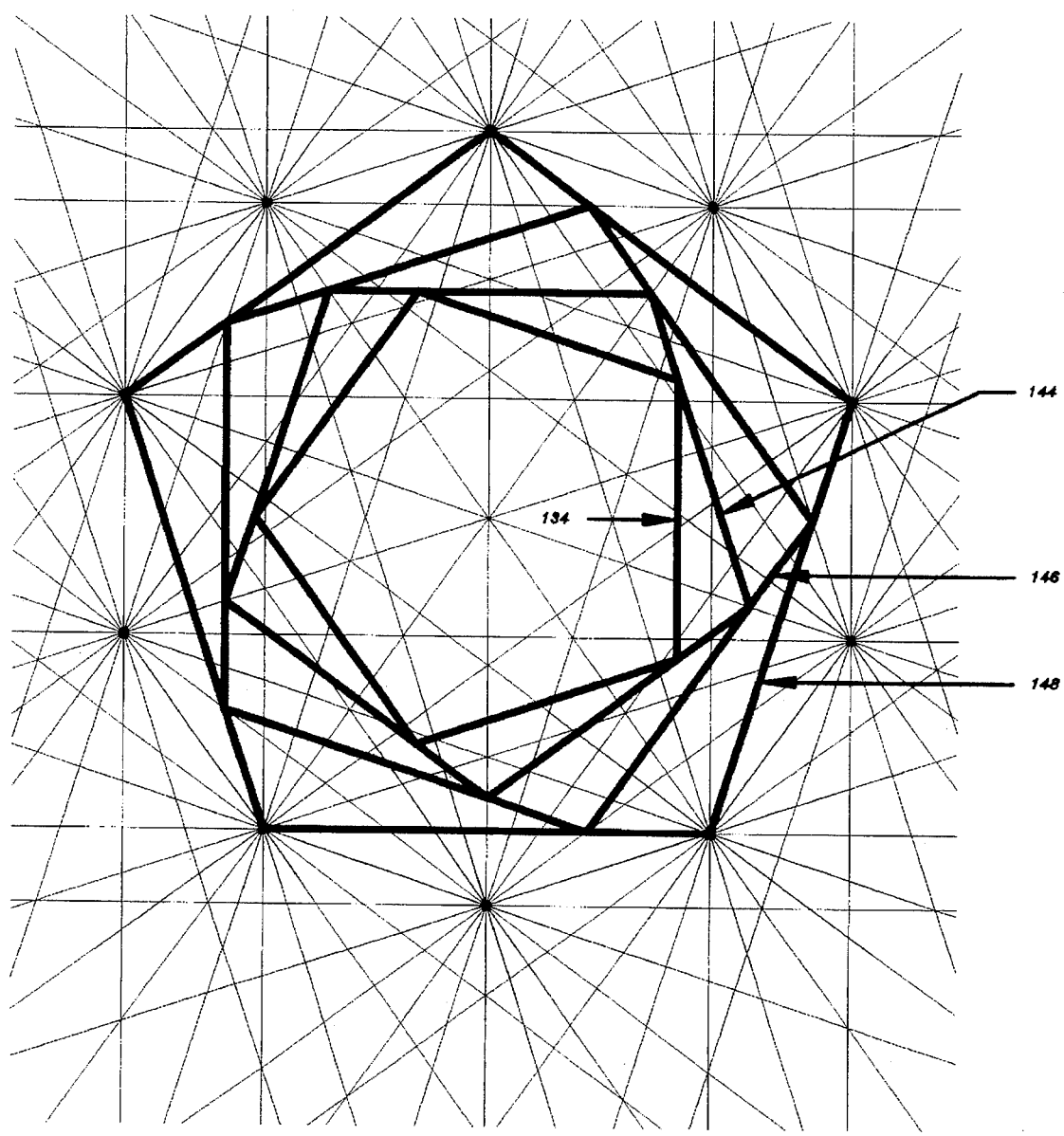

FIG. 14C shows the size relation between a base pentagon and pentagons sized:

(1) $(\Phi)^{1/3}$ times the base pentagon;

(2) $(\Phi)^{2/3}$ times the base pentagon; and (3) $(\Phi)^{3/3}$ or $\phi$ times the base pentagon.

Figure 15:
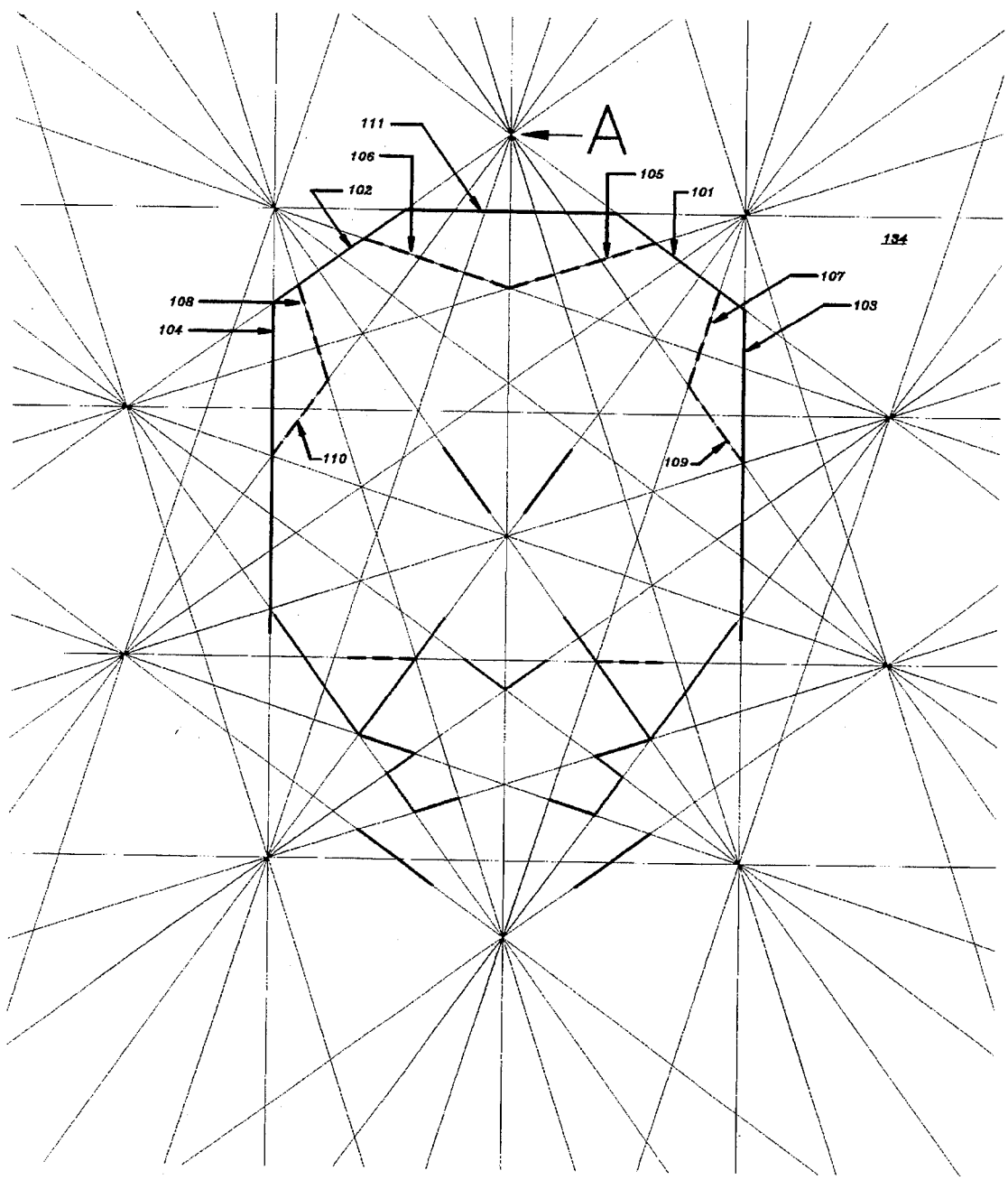

FIG. 15 shows a matrix pentagon complex of the frontal repose overlay system.

Figure 16:
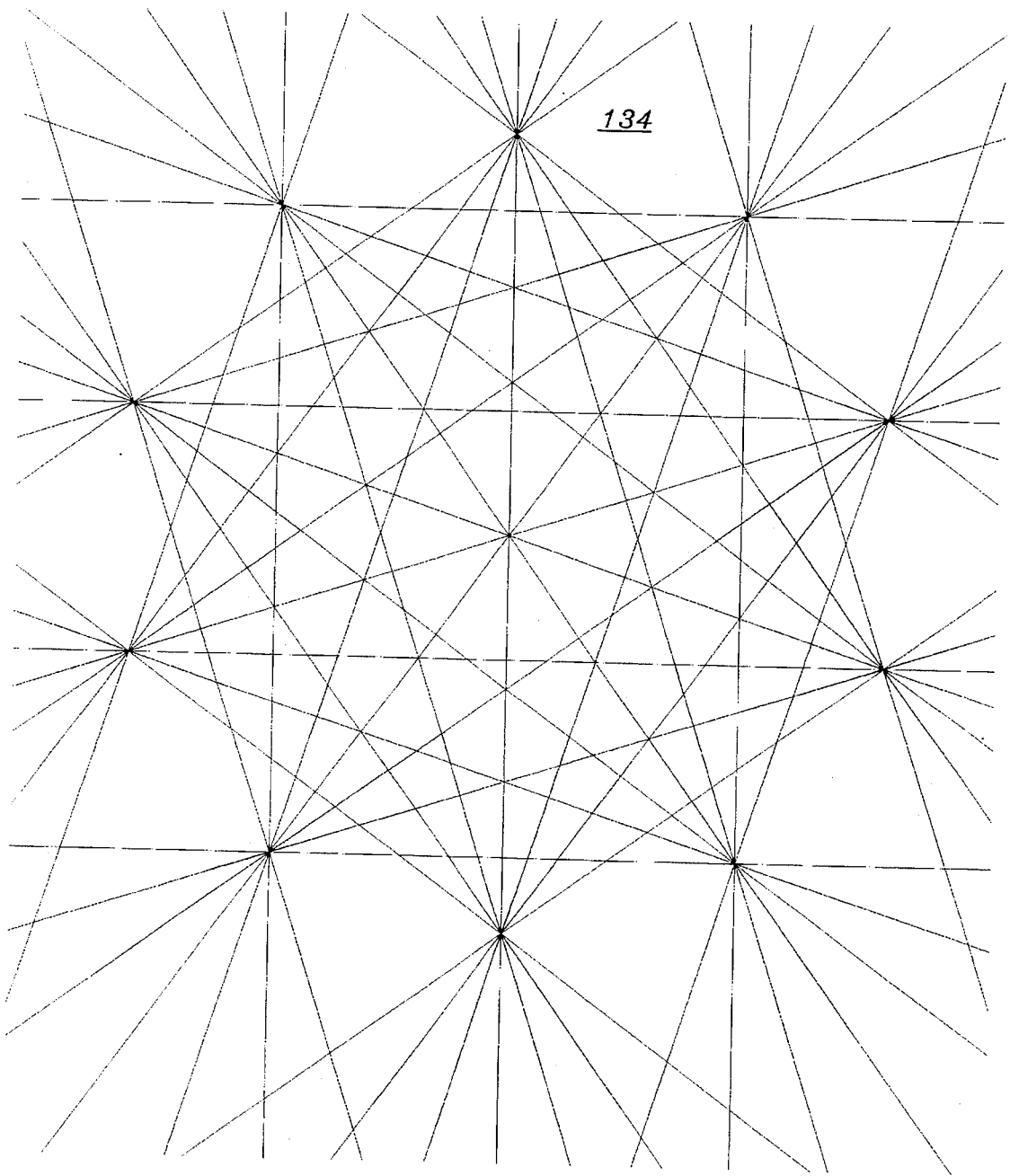

FIG. 16 shows a pentagon complex size n=0, Z=1.

Figure 17:
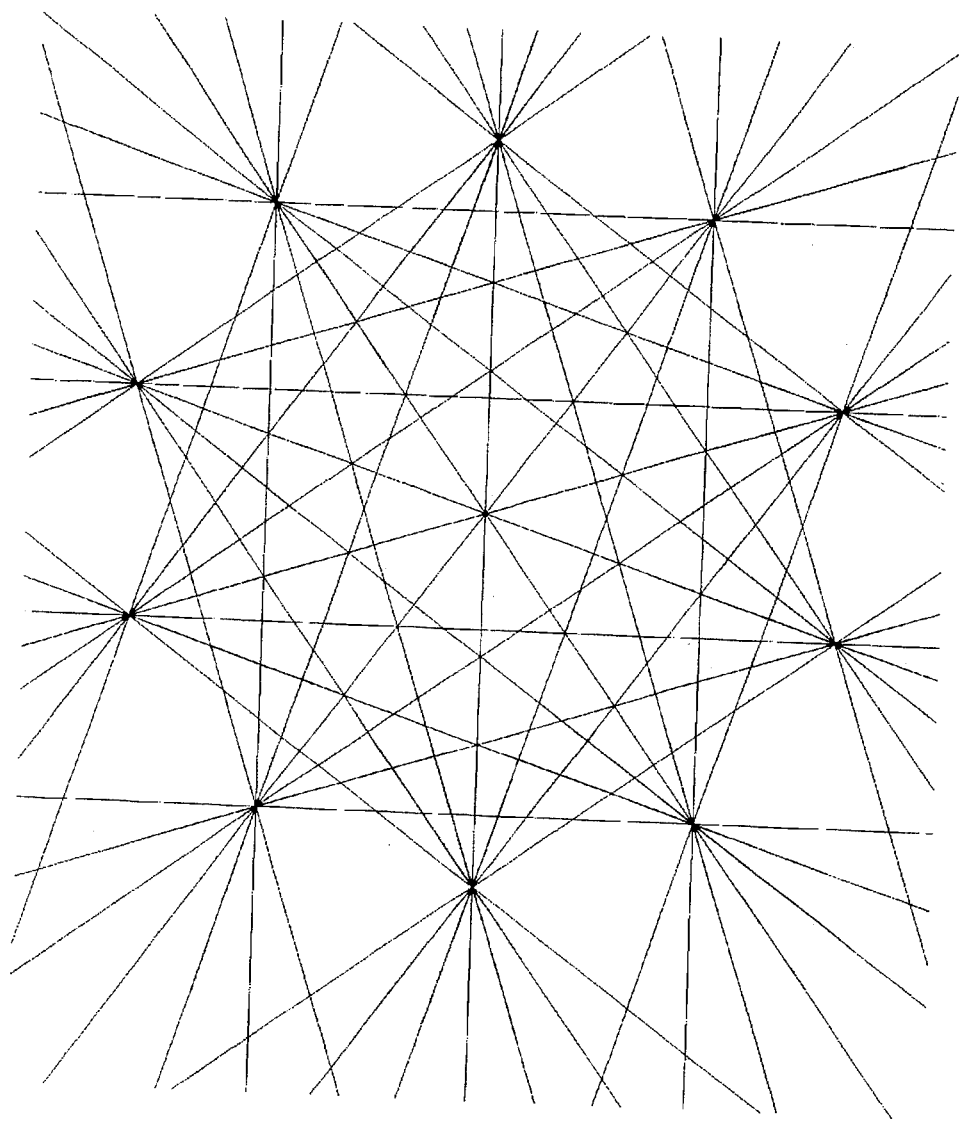

FIG. 17 shows a pentagon complex size n=1, Z=1.

Figure 18:
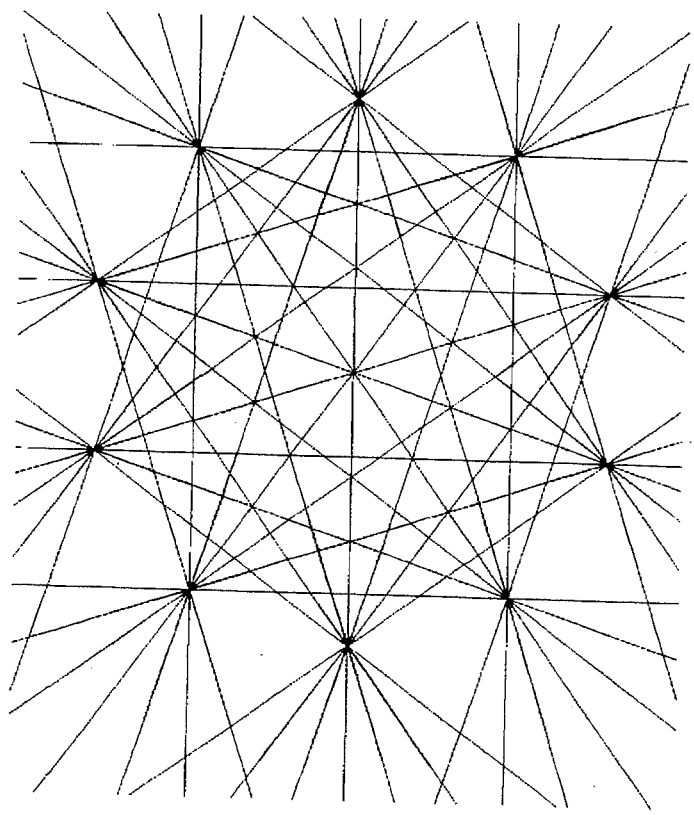

FIG. 18 shows a pentagon complex size n=2, Z=1.

Figure 19:
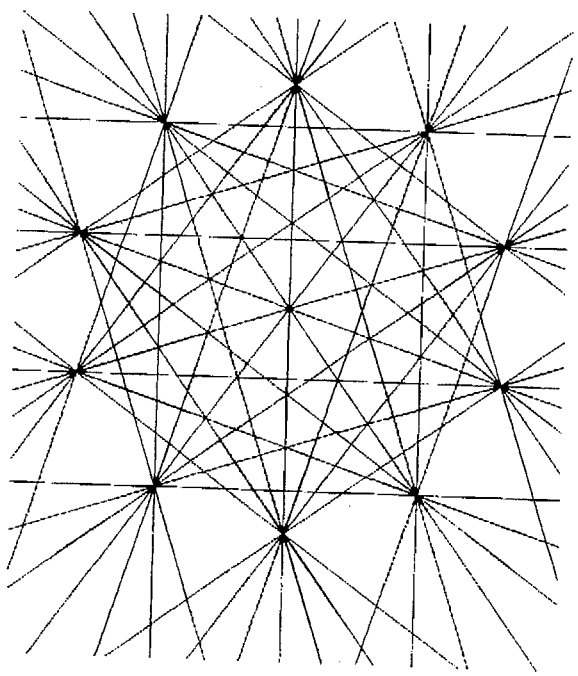

FIG. 19 shows a pentagon complex size n=2, Z=$\Phi/2$.

Figure 20:
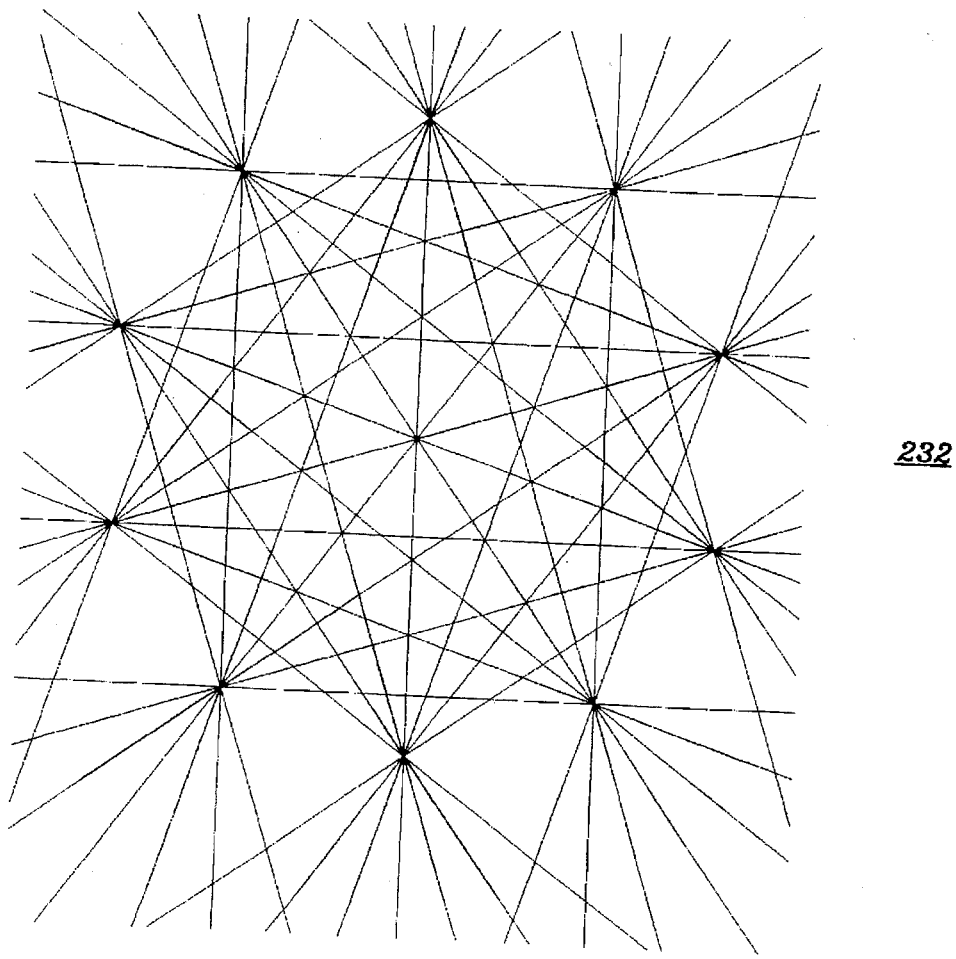

FIG. 20 shows a pentagon complex size n=2, Z=$2/\Phi$.

Figure 21:
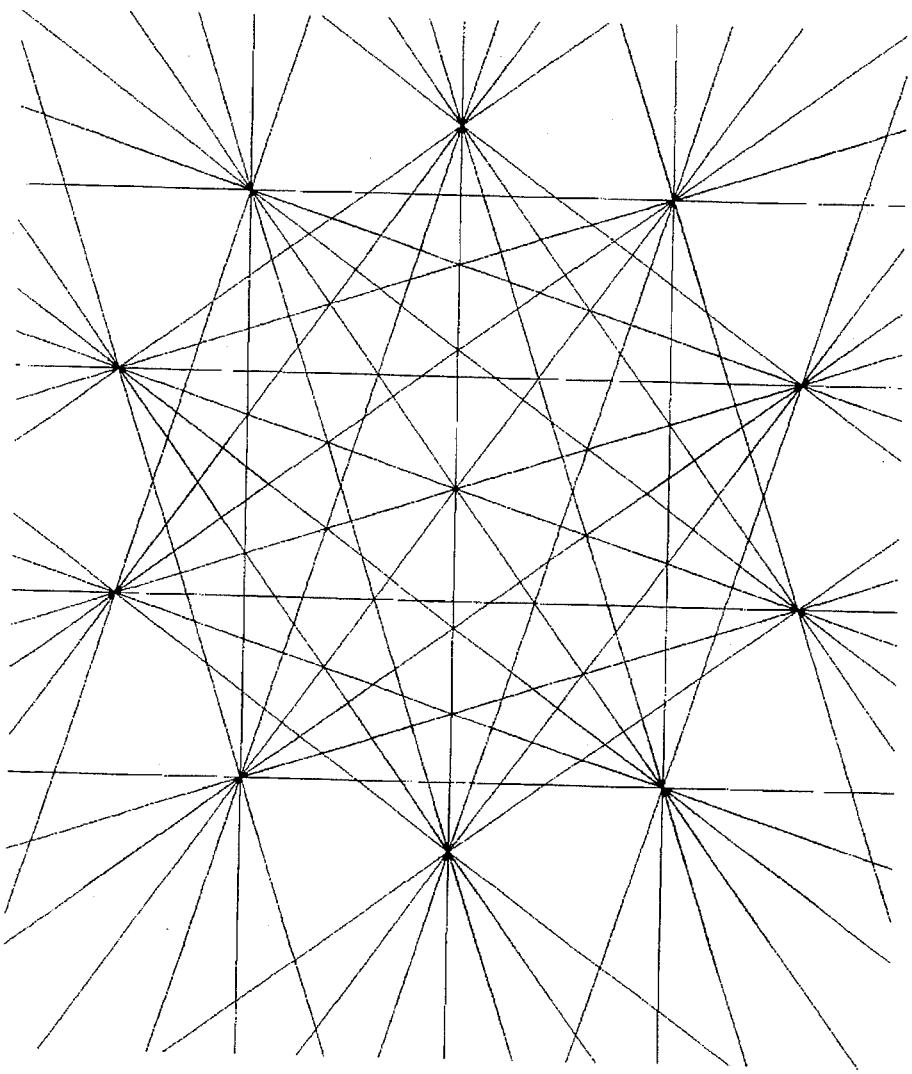

FIG. 21 shows a pentagon complex size n=2, Z=$2/\Phi \times \Phi^{1/3}$.

Figure 22:
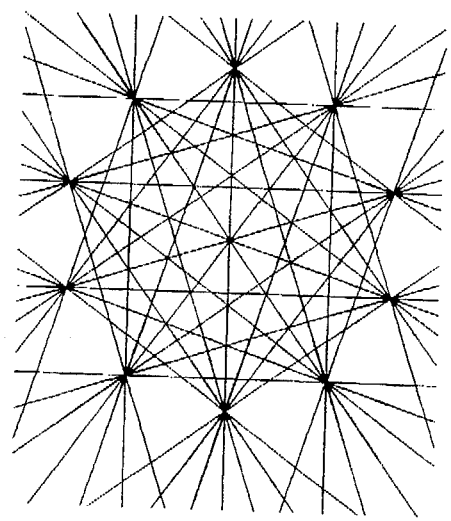

FIG. 22 shows a pentagon complex size n=3, Z=1.

Figure 23:
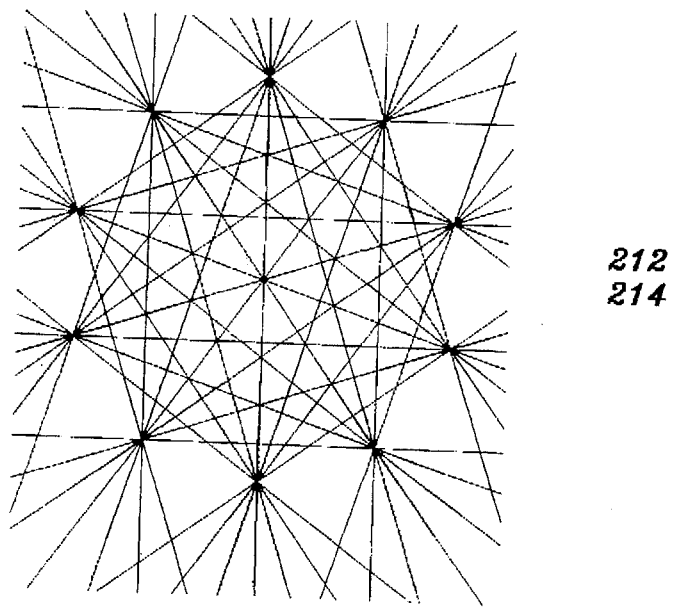

FIG. 23 shows a pentagon complex size n=3, Z=$\Phi^{1/3}$.

Figure 24:
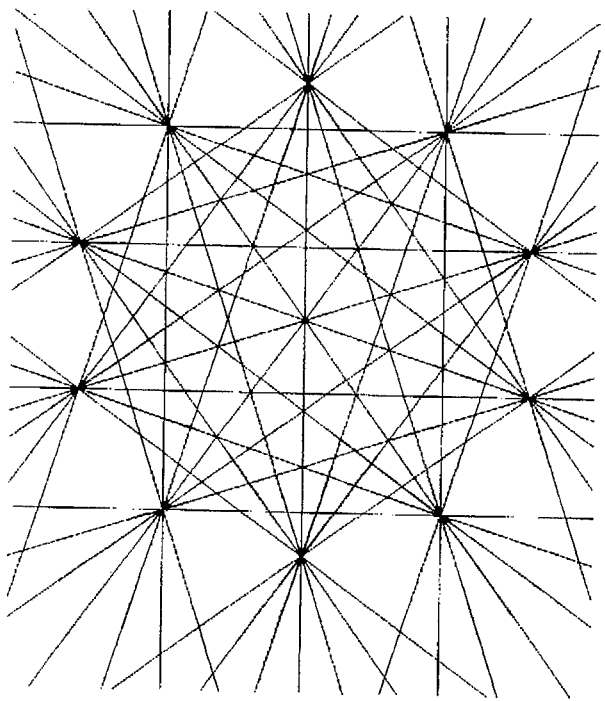

FIG. 24 shows a pentagon complex size n=3, Z=$\Phi^{2/3}$.

Figure 25:
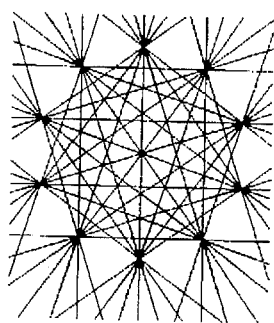

FIG. 25 shows a pentagon complex size n=4, Z=1.

Figure 26:
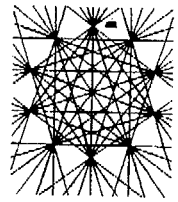

FIG. 26 shows a pentagon complex size n=5, Z=1.

Figure 27:
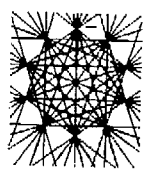

FIG. 27 shows a pentagon complex size n=5, Z=$\Phi/2$.

Figure 28:
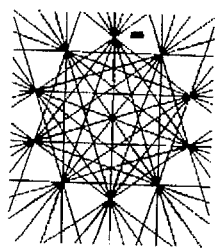

FIG. 28 shows a pentagon complex size n=5, Z=$2/\Phi$.

Figure 29:
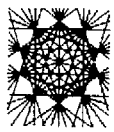

FIG. 29 shows a pentagon complex size n=6, Z=1.

Figure 30:
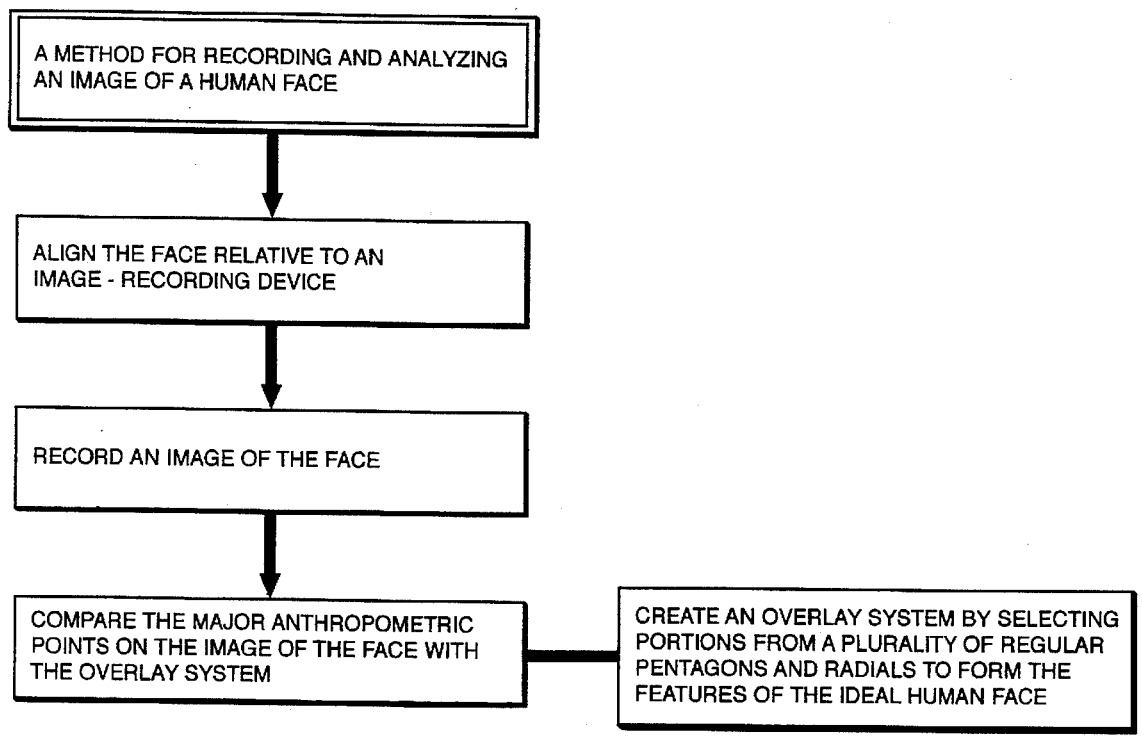

FIG. 30 is a flow diagram of a method for recording and analyzing an image of a human face according to the invention.

Figure 31:
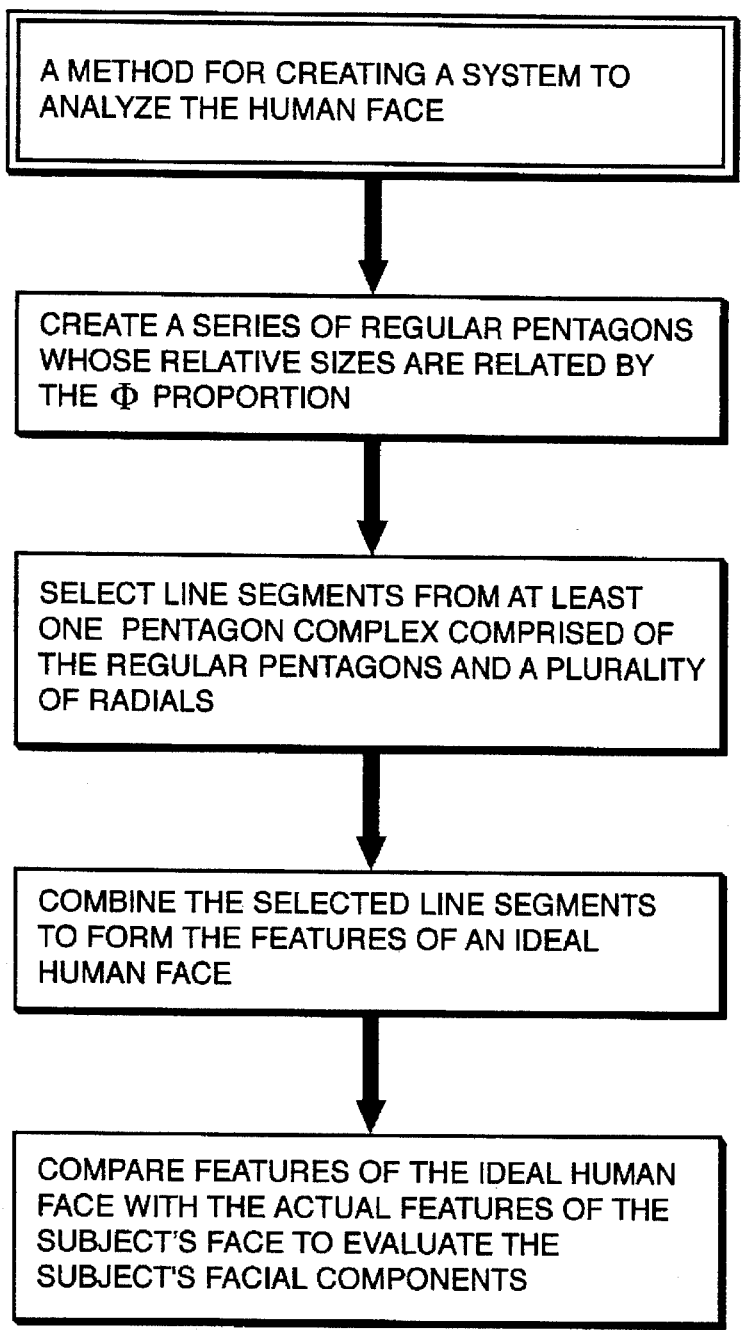

FIG. 31 is a flow diagram of a method for creating a system to analyze the human face according to the invention.

Figure 32:
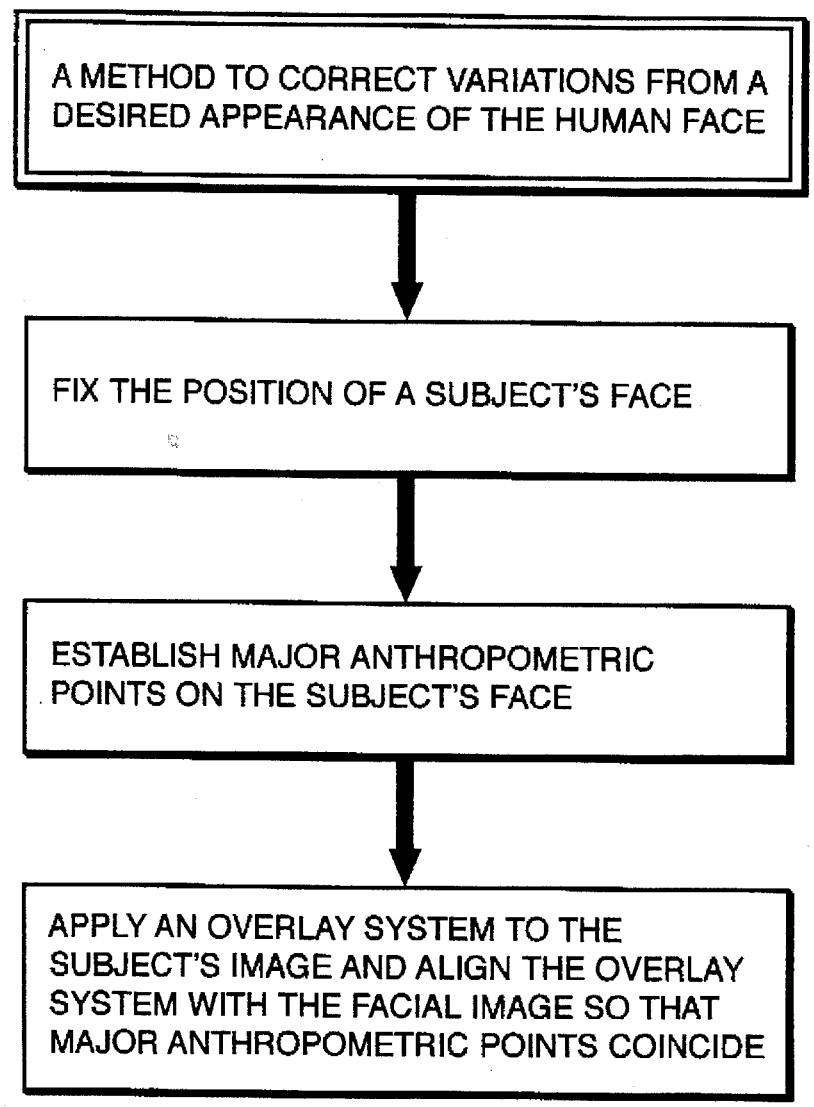

FIG. 32 is a flow diagram of a method to correct variations from a desired appearance of the human face according to the invention.

Figure 33:
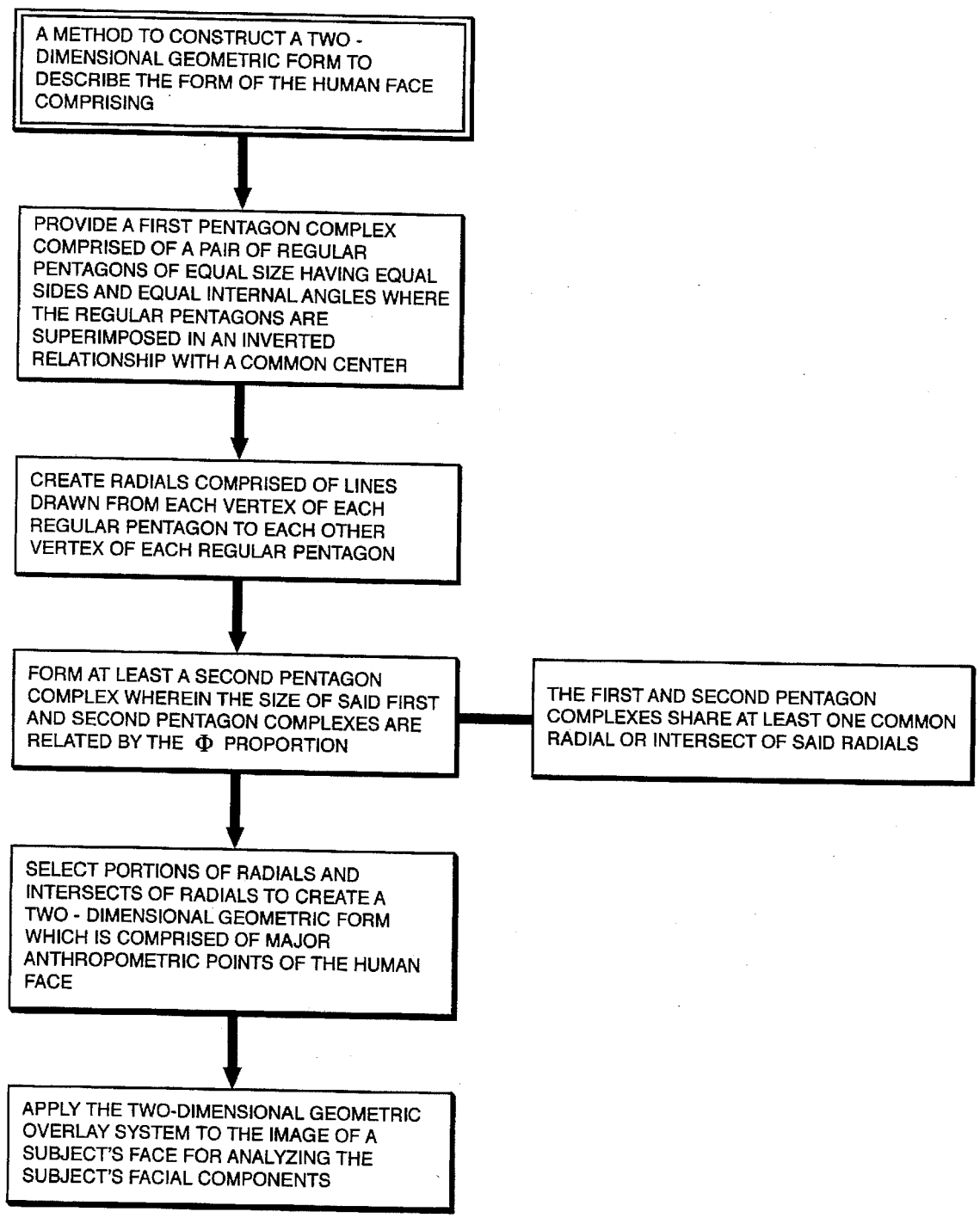

FIG. 33 is a flow diagram of a method to construct a two-dimensional geometric form to describe the form of the human face according to the invention.

DESCRIPTION OF THE PREFERRED EMBODIMENTS

One embodiment of this invention comprises overlay systems derived from mathematically inter-related pentagons and specific components of those pentagons. All pentagons referred to herein are regular pentagons, defined as having sides of equal length and having equivalent internal angles. These pentagons can be combined to form a composite such that selected points and lines of the composite define the parameters of an aesthetically attractive face. FIGS. 9A, 9B, 10A, and 10B show preferred overlay systems 110a, 110b, 110c, and 110d comprising frontal (FIG. 9A) and lateral (FIG. 9B) views of a repose facial configuration and frontal (FIG. 10A) and lateral (FIG. 10B) views of a smiling facial configuration.

Figure 1:
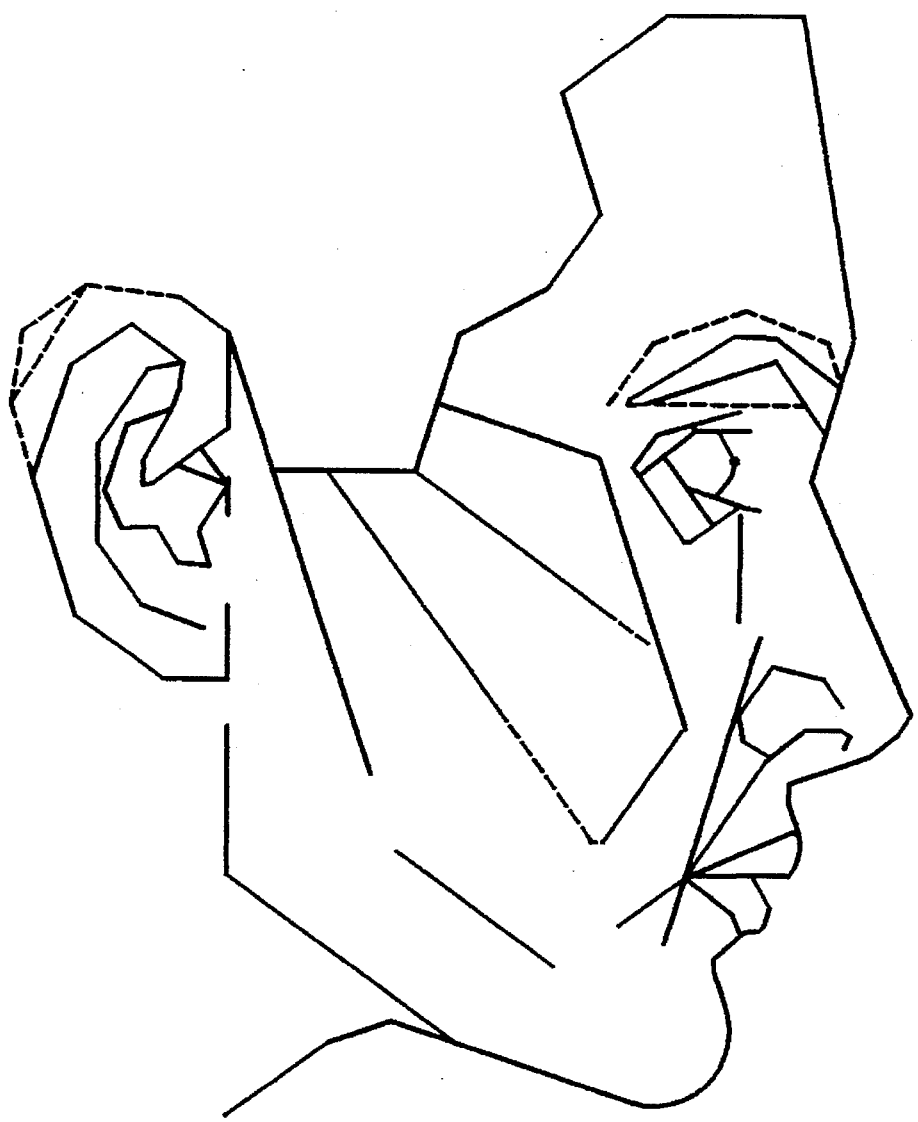
FIG. 1 is an overlay system of the lateral view of a face in repose.
Figure 2:
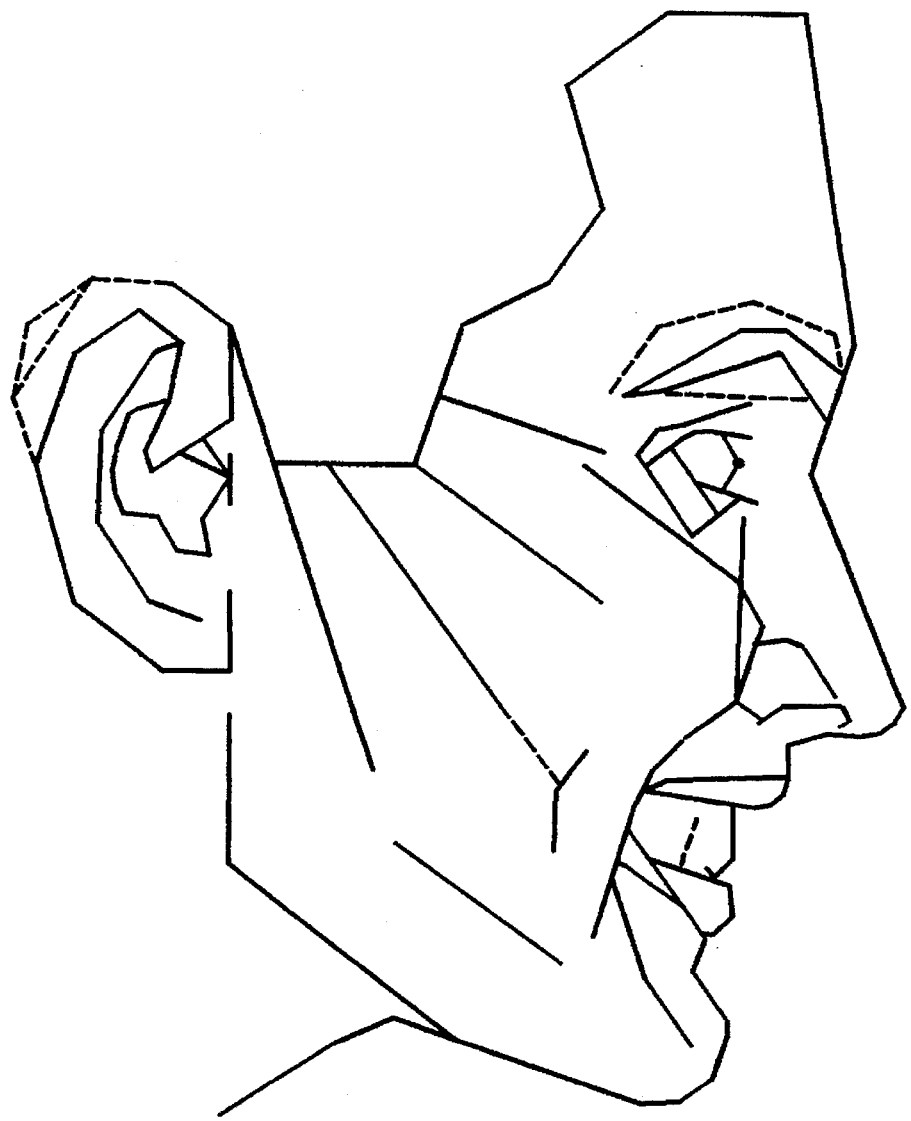
FIG. 2 is an overlay system of the lateral view of a smiling face.
Figure 3:
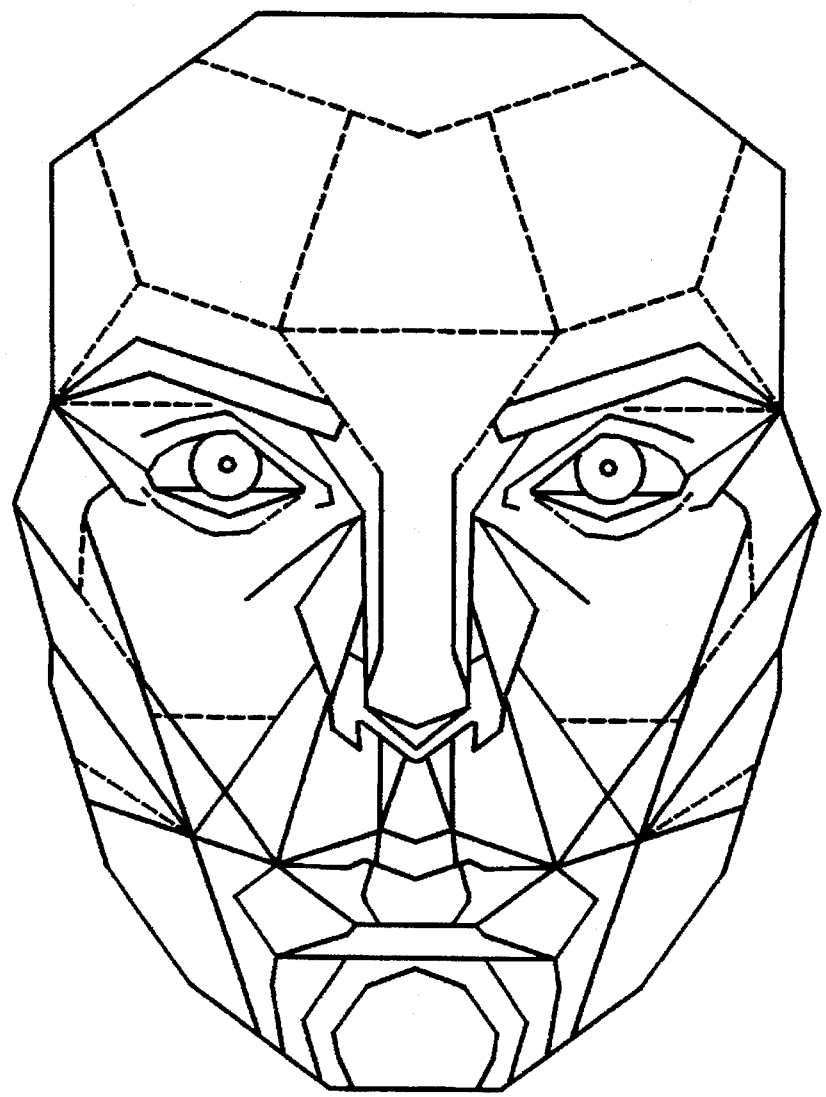
FIG. 3 is an overlay system of the frontal view of a face in repose.
Figure 4:
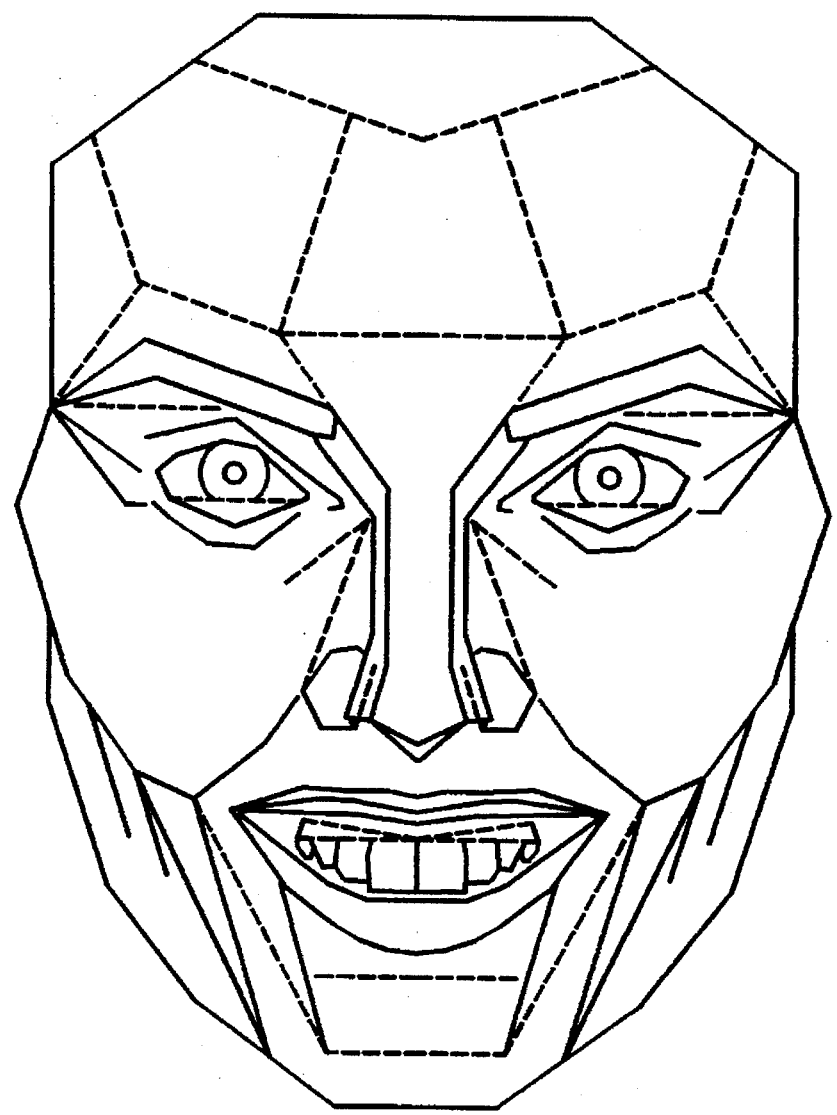
FIG. 4 is an overlay system of the frontal view of a smiling face.
Figure 5:
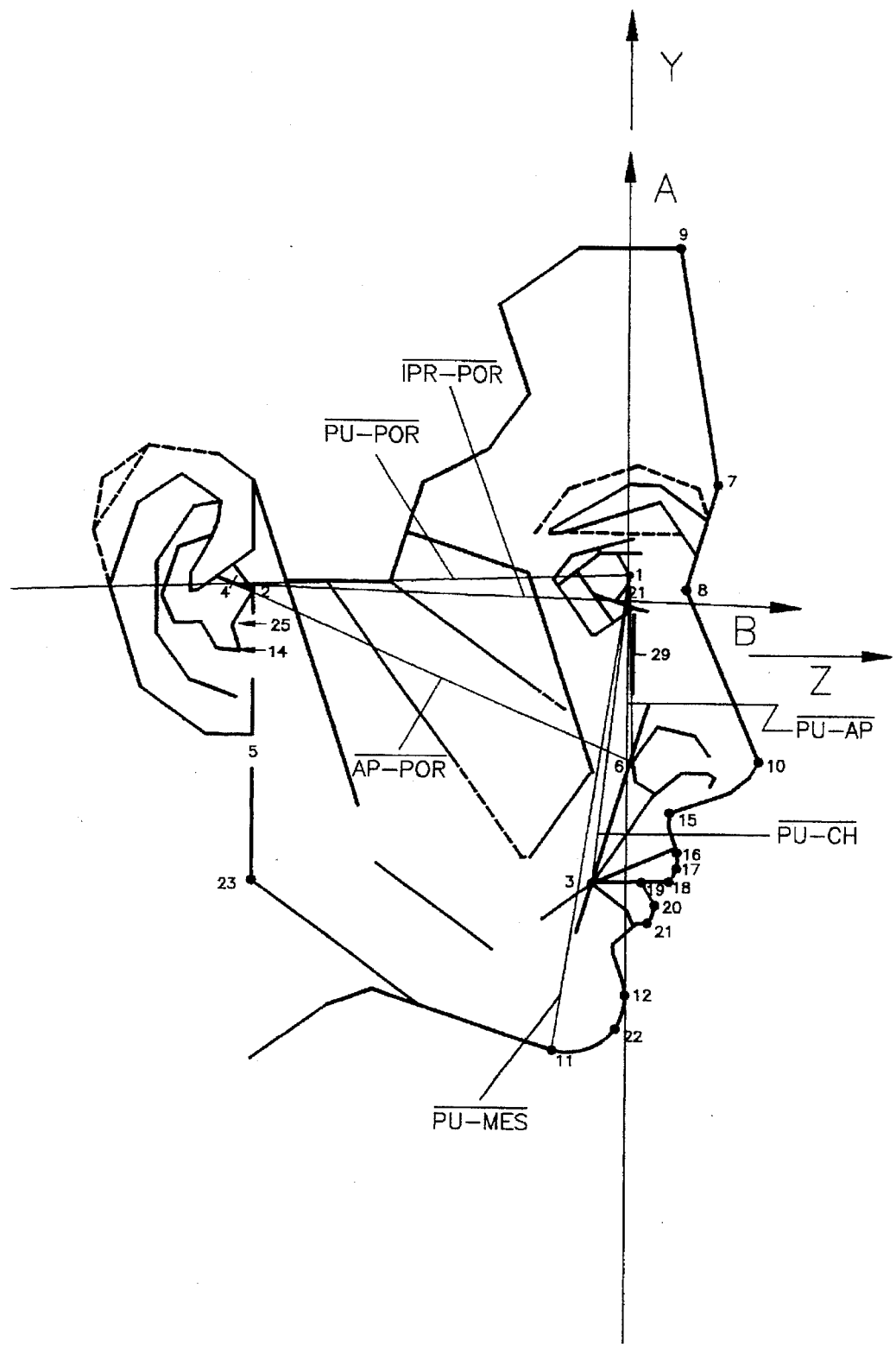
FIG. 5 is a lateral view of a face in repose where the anthropometric points, lines, and line segments used in positioning the head and applying the overlay system have been marked and the points and line segments needed to size and orient the overlay system relative to the facial image are indicated.
Figure 6:
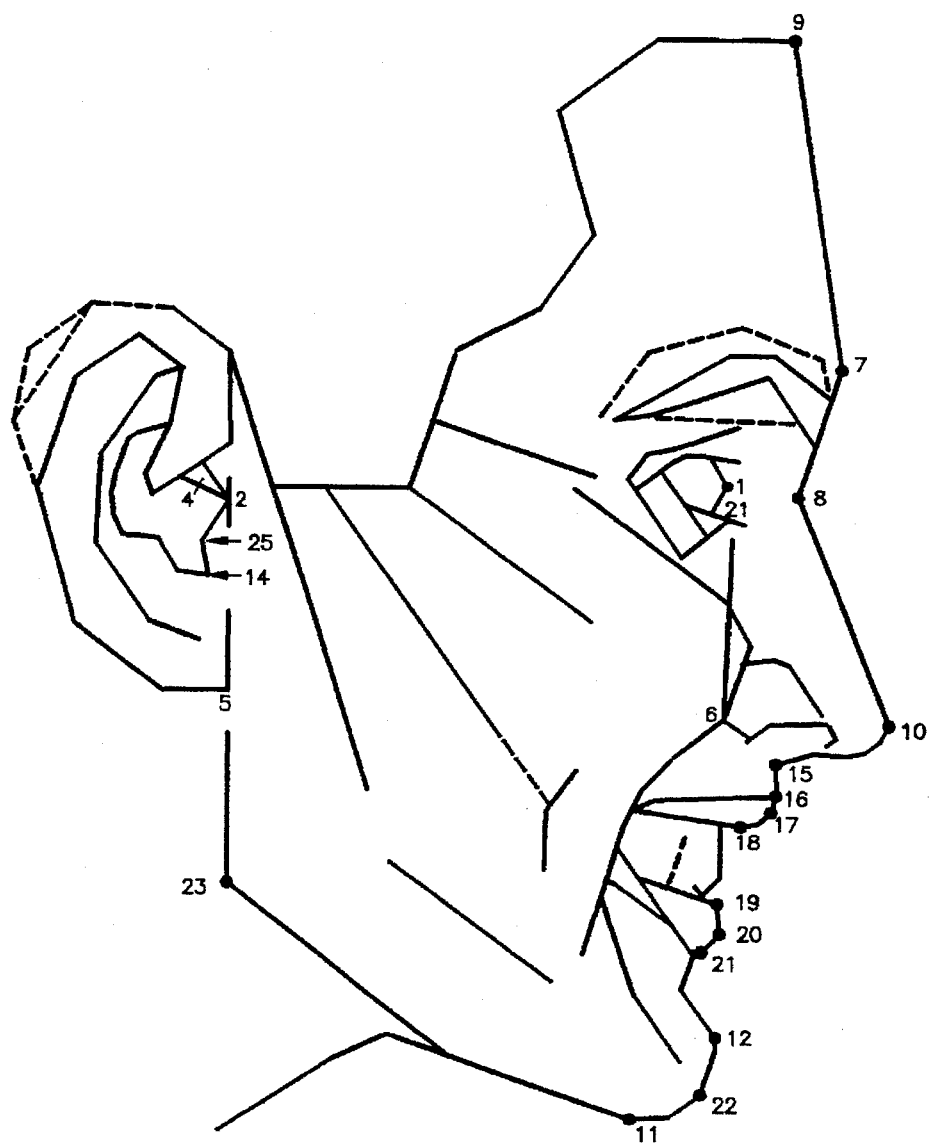
FIG. 6 is a lateral view of a smiling face marked with anthropometric points.
Figure 7:
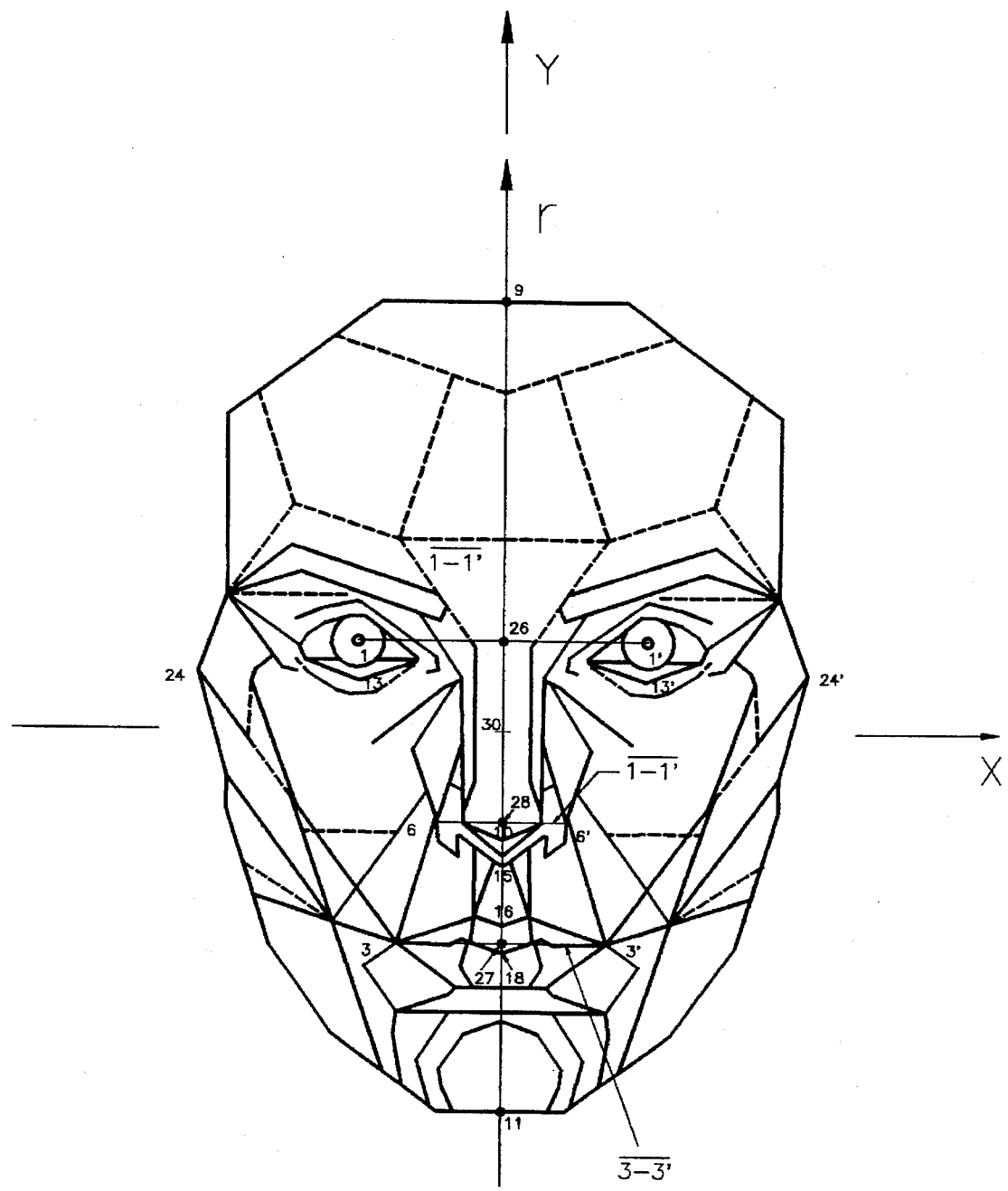
FIG. 7 is a frontal view of a face in repose where the anthropometric points, lines, and line segments used in positioning the head and applying the overlay system have been marked and the points and line segments needed to size and orient the overlay system relative to the facial image are indicated.
Figure 8:
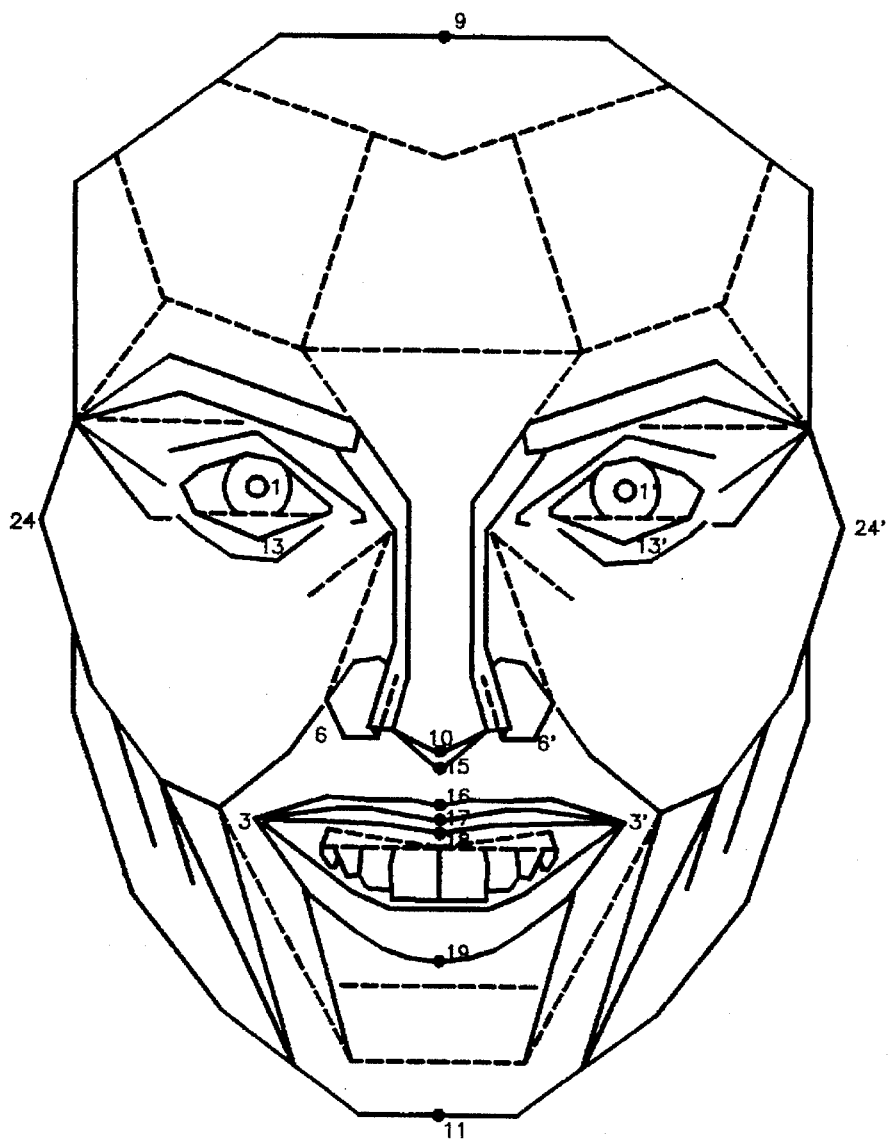
FIG. 8 is a frontal view of a smiling face marked with anthropometric points.
Figure 9A:
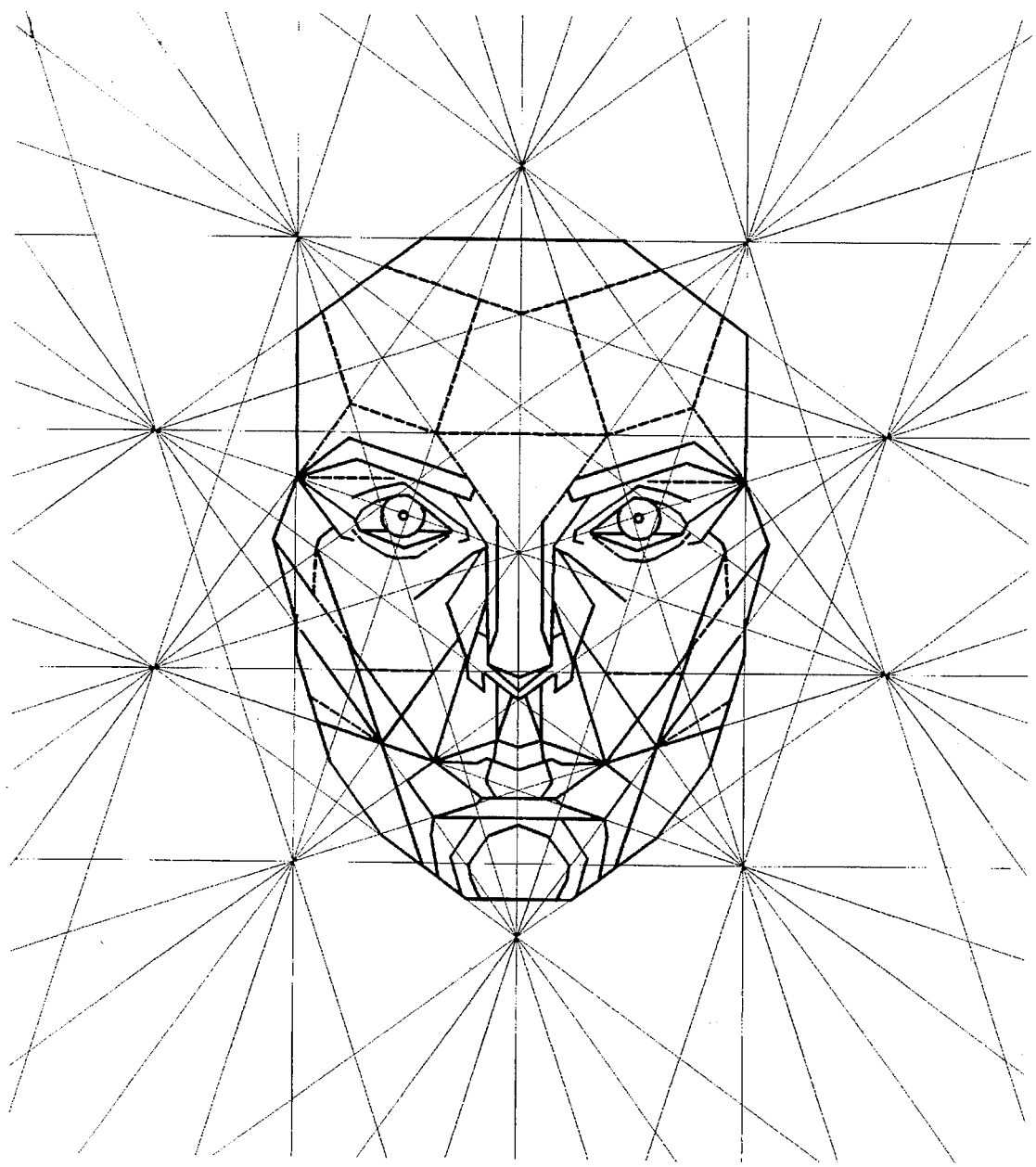
FIG. 9A shows an overlay system of the present invention including a frontal view of a repose facial configuration.
Figure 9B:
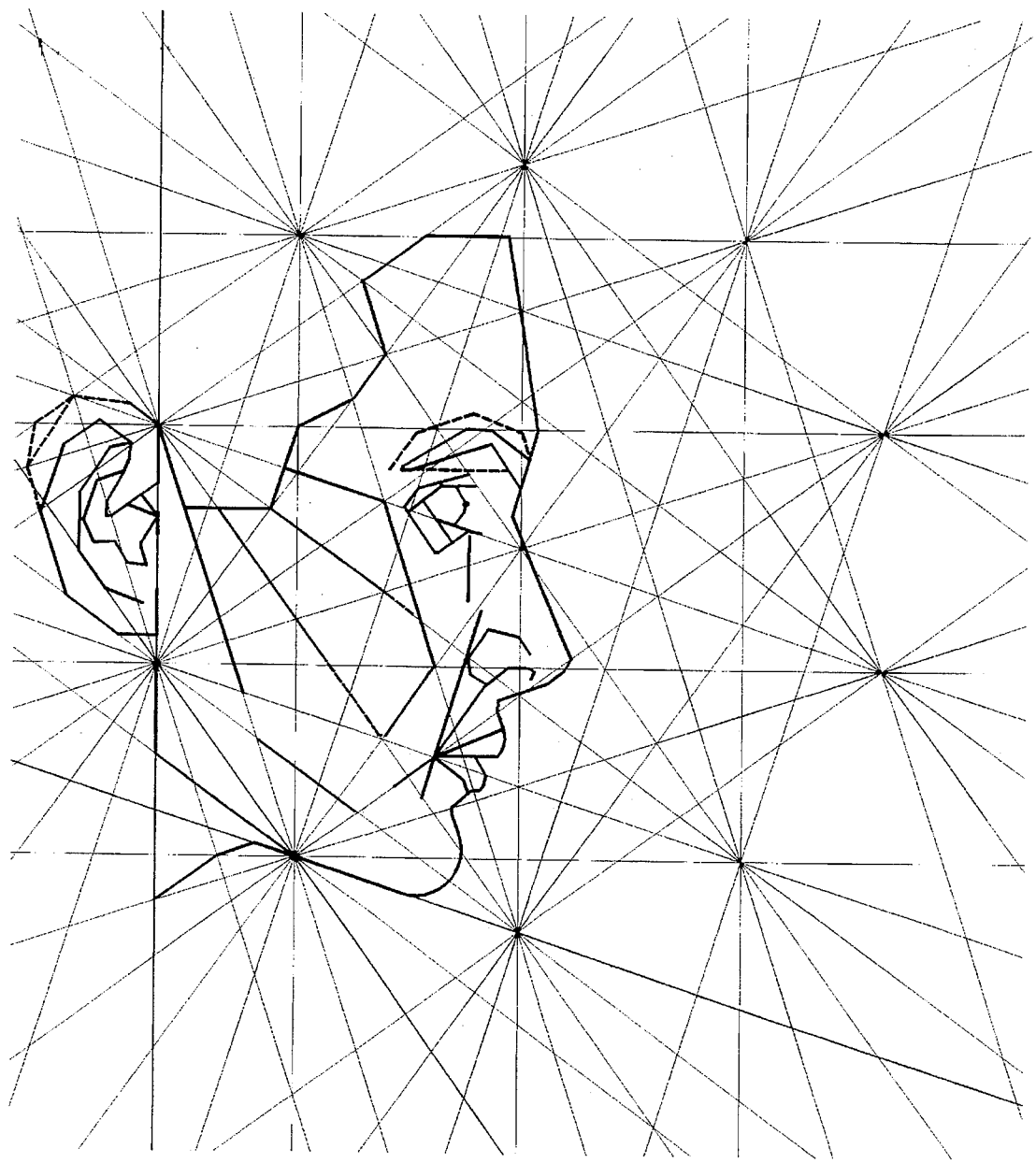
FIG. 9B shows an overlay system of the present invention including a lateral view of a repose facial configuration.
Figure 10A:
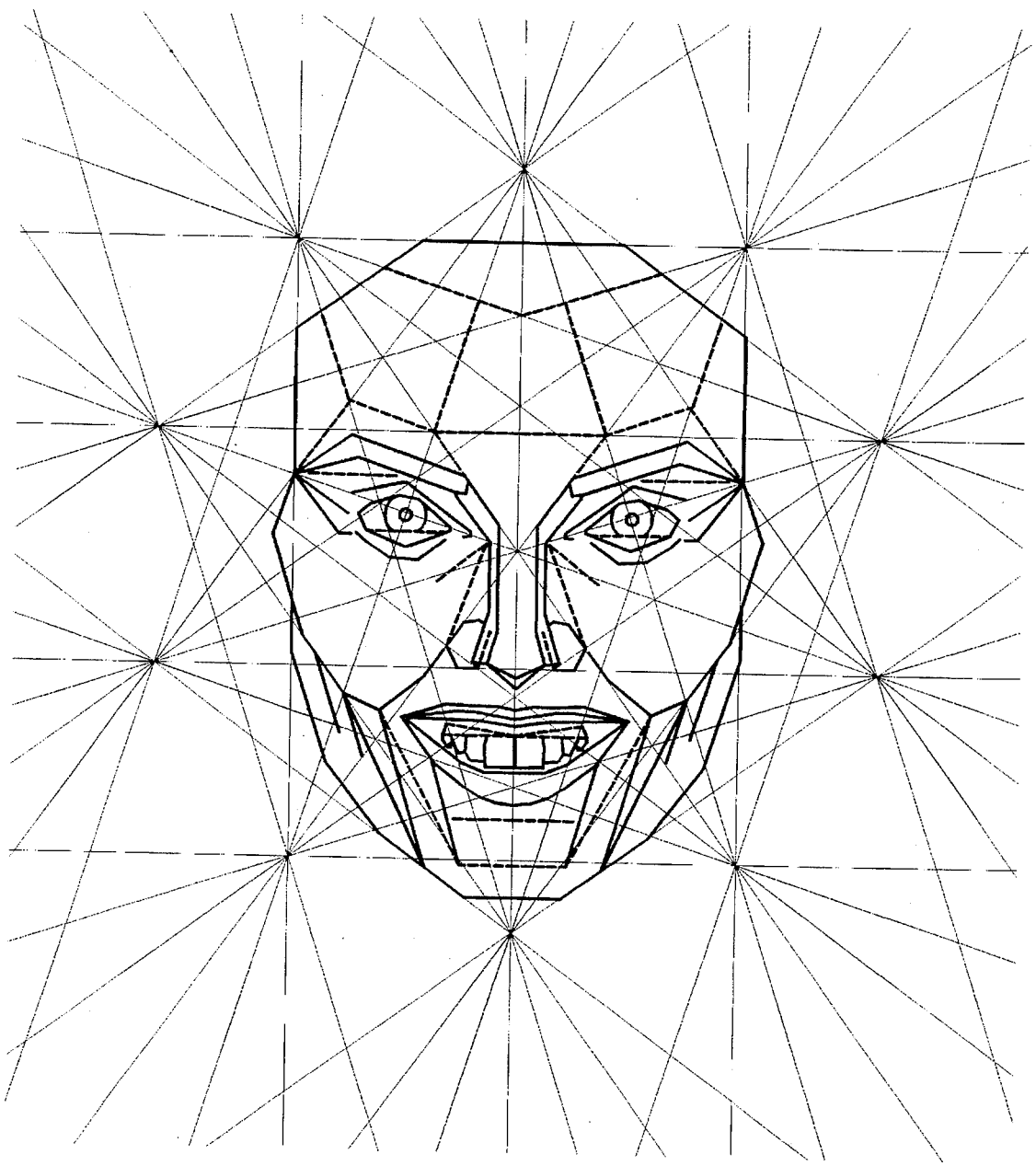
FIG. 10A shows an overlay system of the present invention including a frontal view of a smiling facial configuration.
Figure 10B:
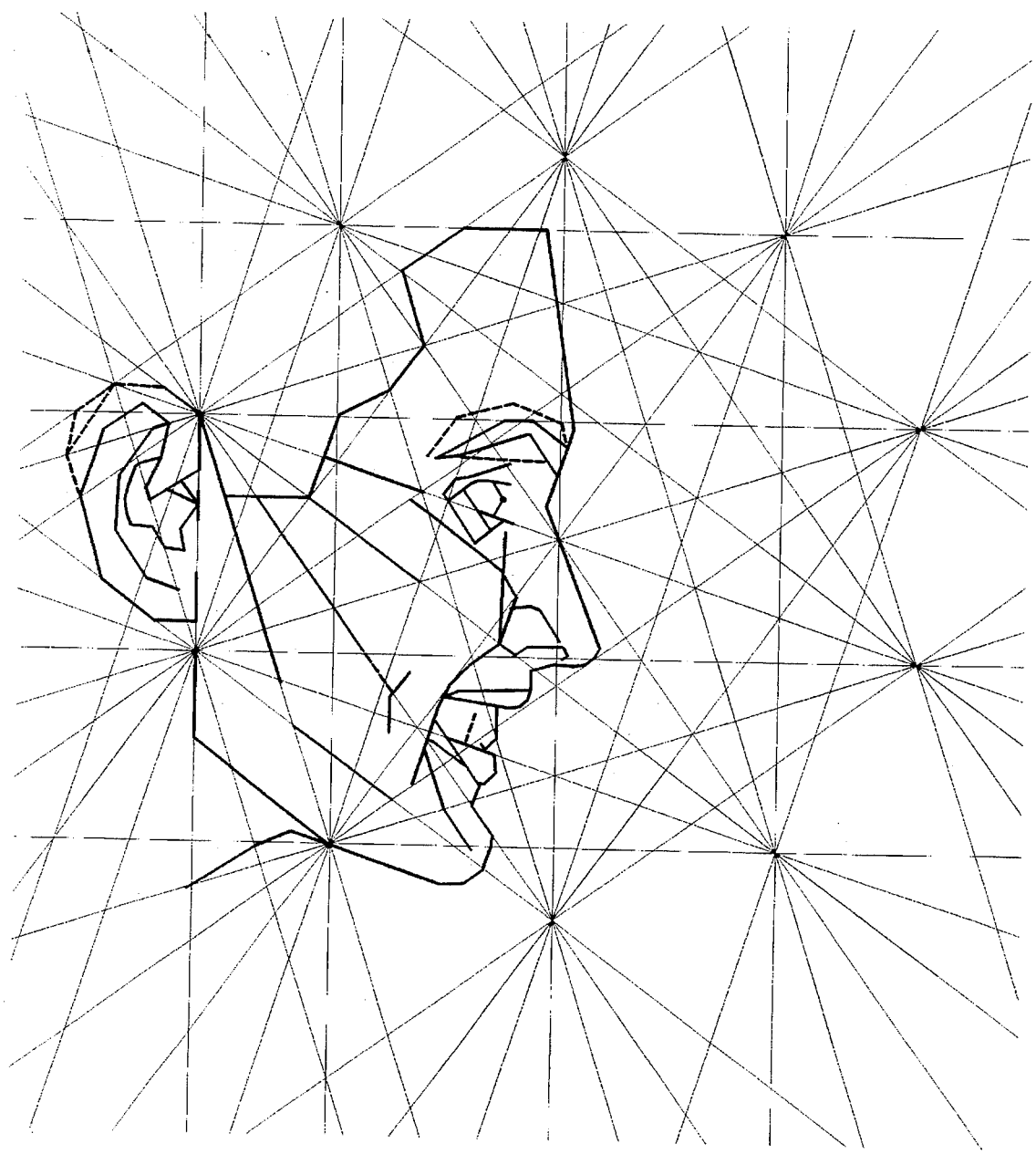
FIG. 10B shows an overlay system of the present invention including a lateral view of a smiling facial configuration.

Turning to the overlay systems 110a–d of the present invention, FIGS. 9A and 9B show two-dimensional representations of frontal and lateral views of a facial configuration standard in repose. It will be apparent to one skilled in the art that these two-dimensional representations could be projected into a three-dimensional system to form a three-dimensional overlay structure. Therefore, the present disclosure will primarily describe the two-dimensional overlay systems 110a–d.

Figure 11:
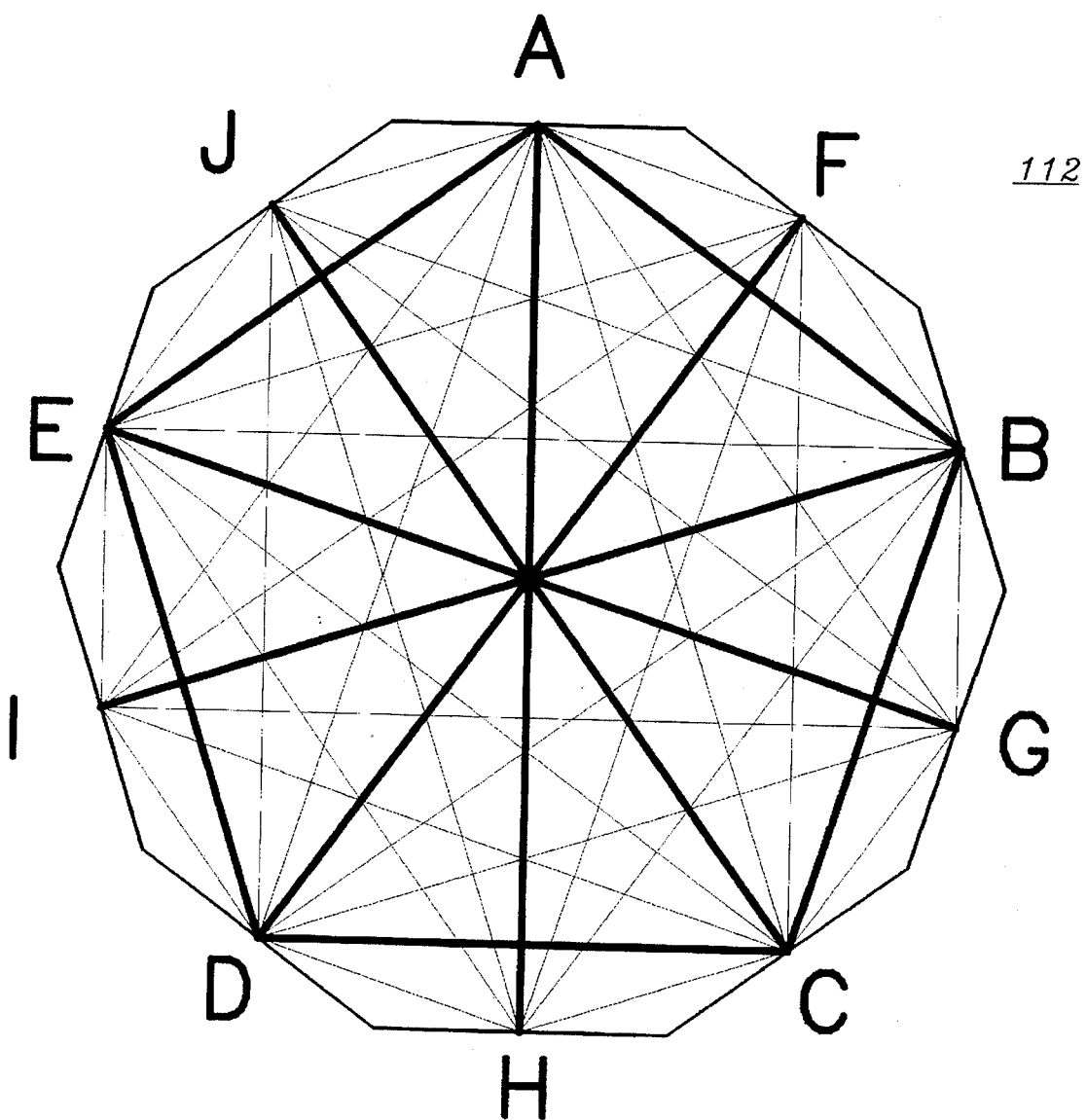
FIG. 11 shows a pentagon complex of the present invention.
Figure 12A:
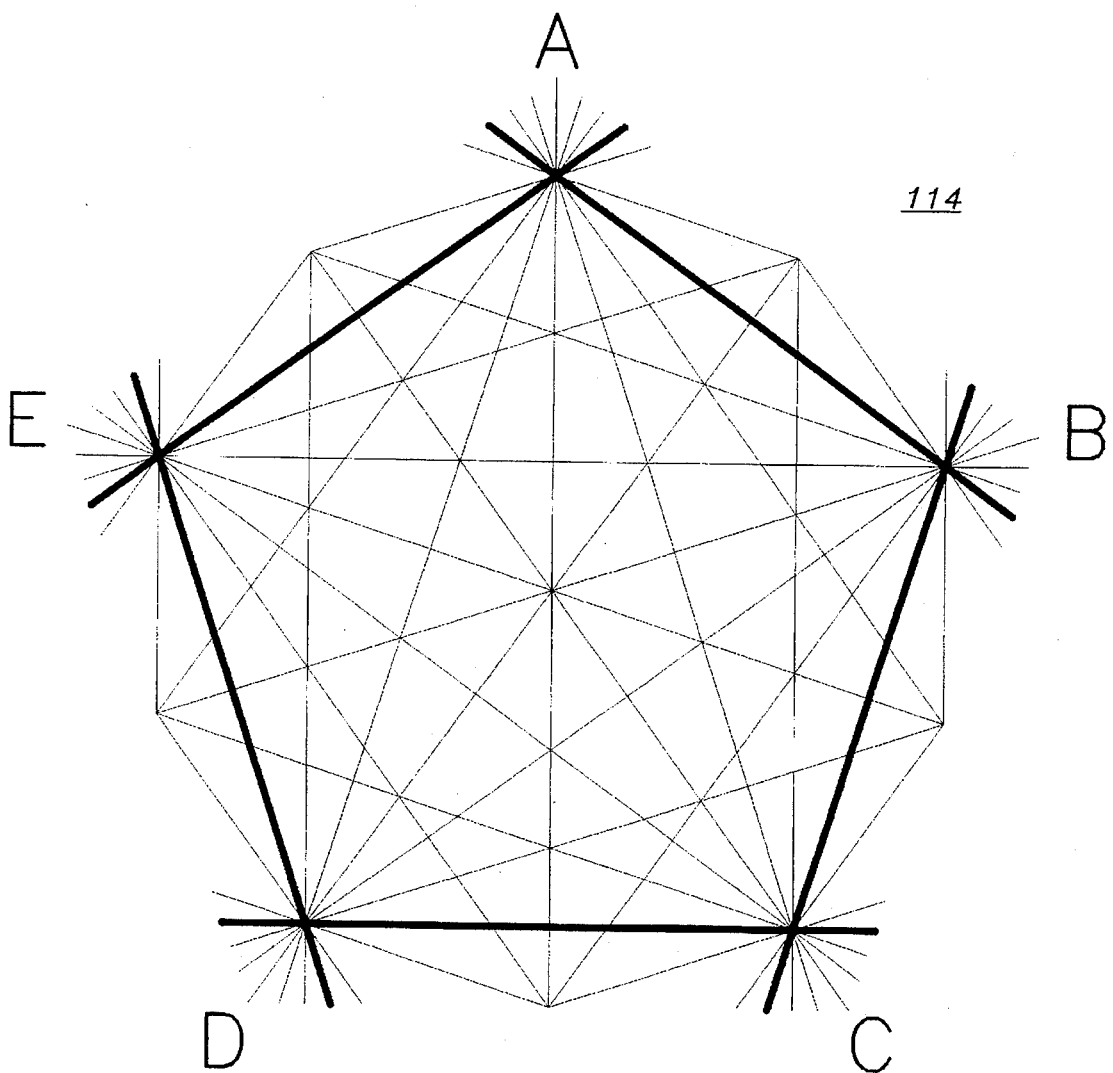
FIG. 12A shows a base pentagon system of the present invention.
Figure 12B:
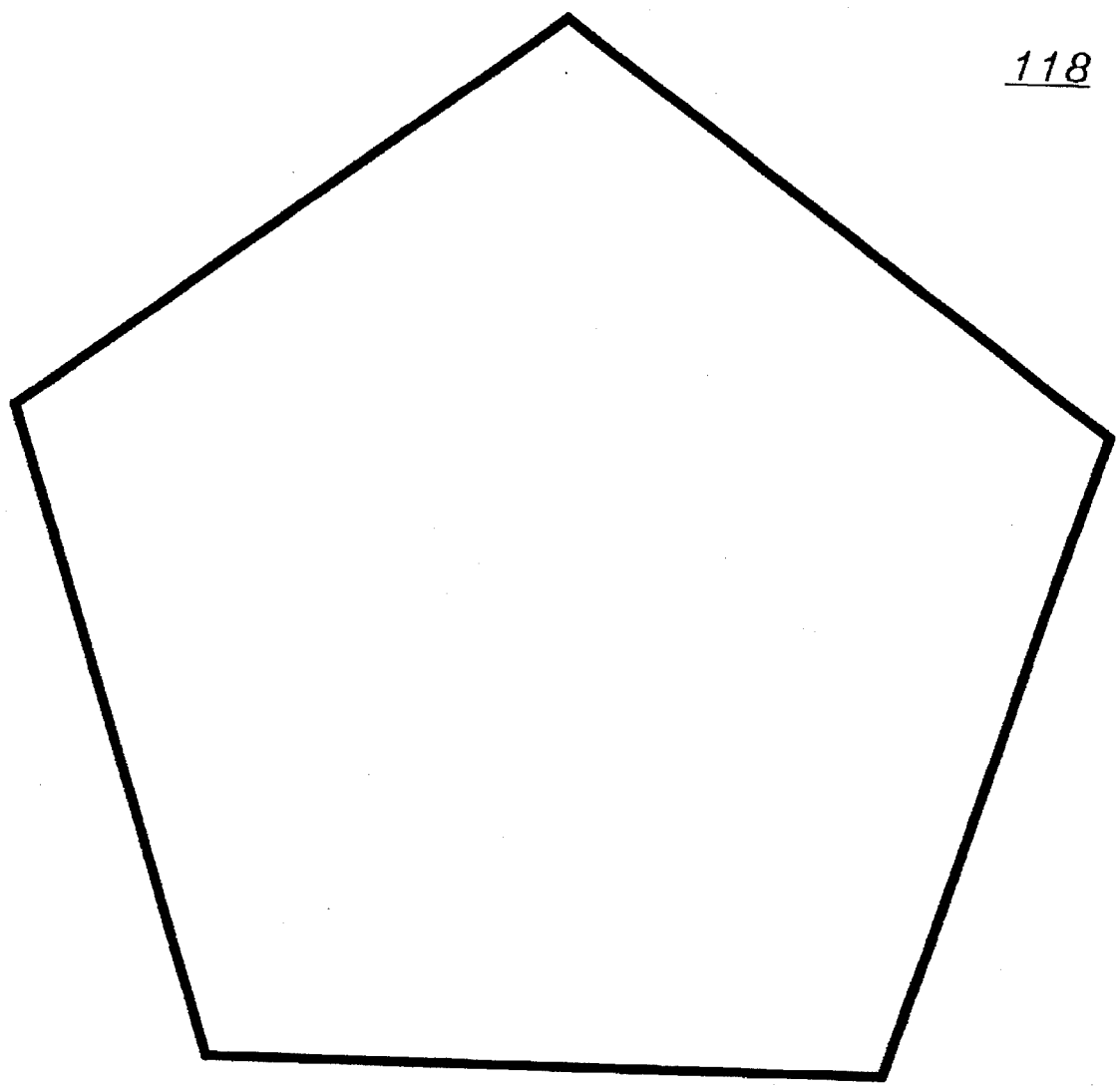
FIG. 12B shows a regular base pentagon.
Figure 12C:
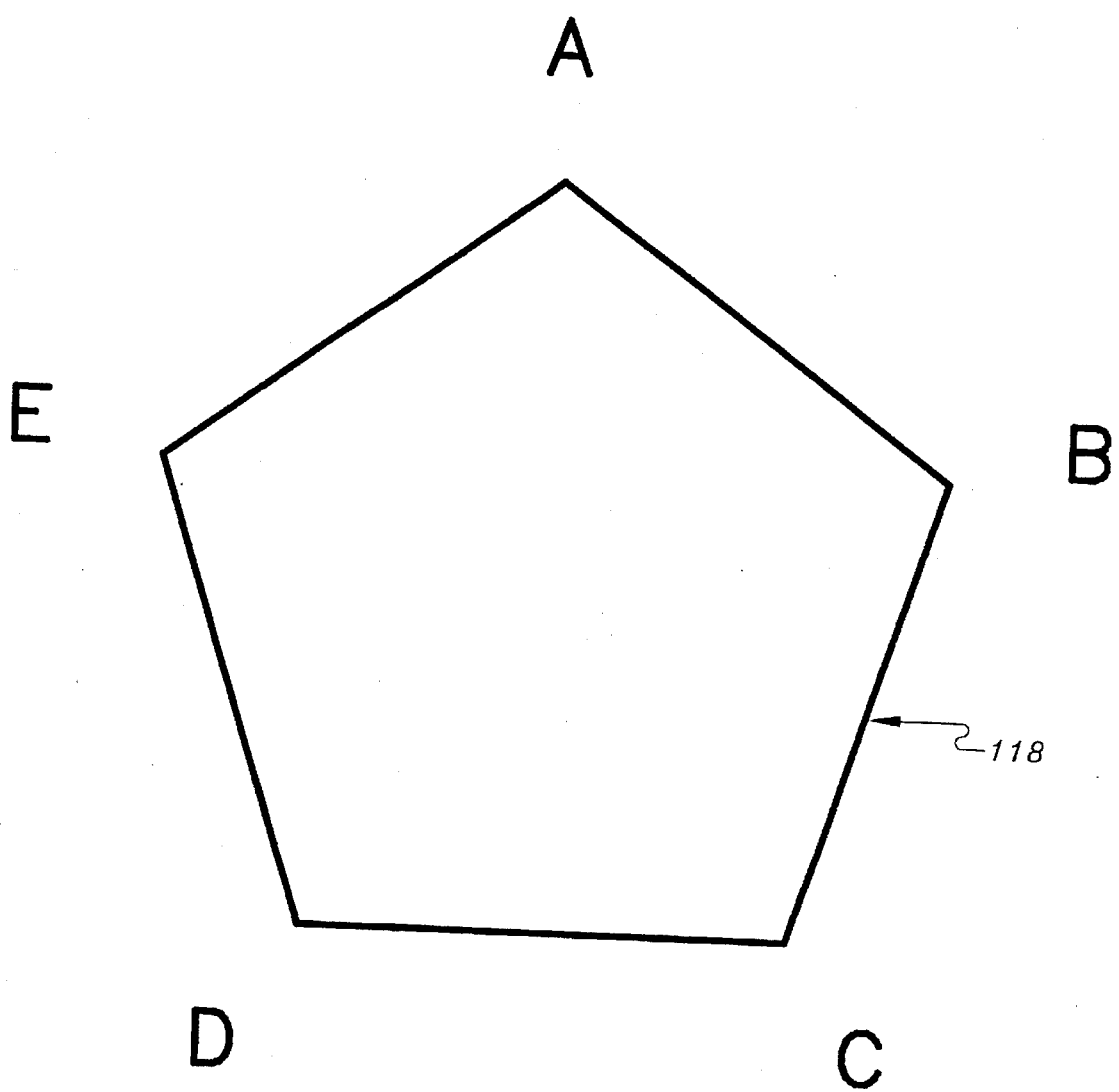
FIG. 12C shows the vertices of the regular base pentagon of FIG. 12B.
Figure 13A:
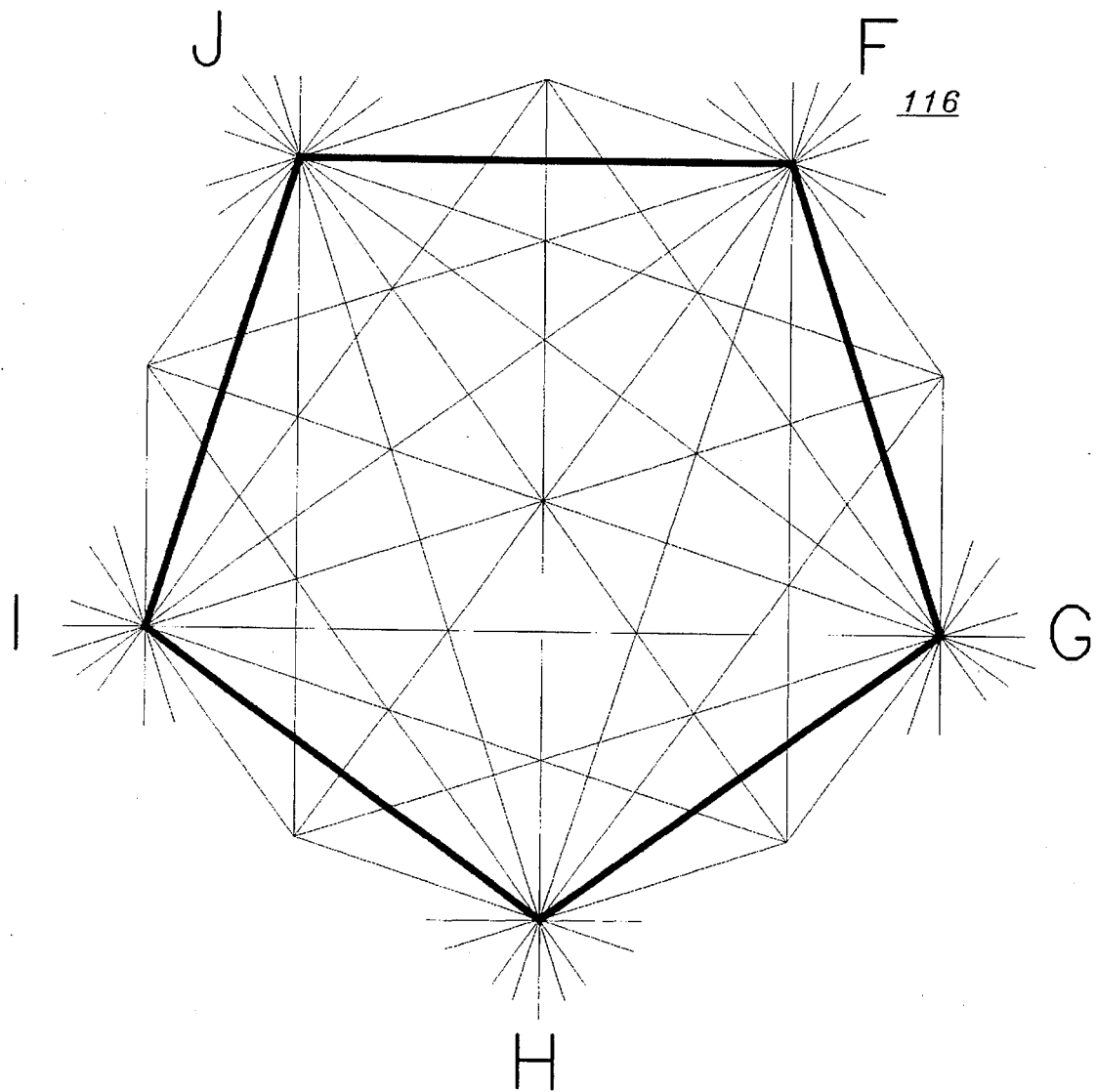
FIG. 13A shows an inverse pentagon system of the present invention.
Figure 13B:
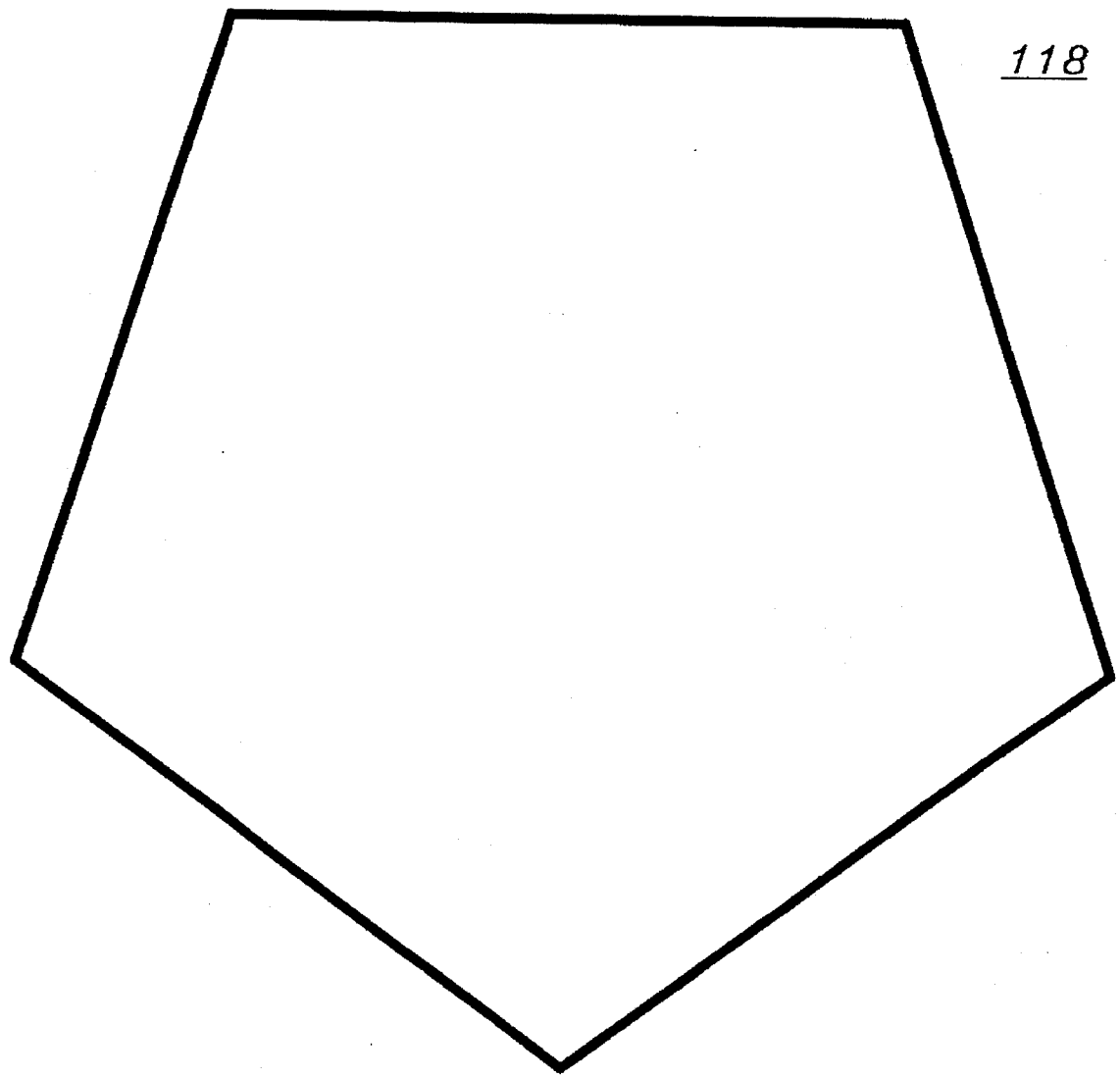
FIG. 13B shows an inverse regular pentagon.

Turning to the structure of the present invention, the overlay systems 110a–d comprise multiple pentagon complexes 112 (FIG. 11). Each of the many pentagon complexes making up the overlay systems comprise a base pentagon system 114 (FIG. 12A) and an inverse-pentagon system 116 (FIG. 13A). The base pentagon system 114 (FIG. 12A) and the inverse-pentagon system 116 (FIG. 13A) each comprise a regular base pentagon 118 (FIGS. 12B and 13B) and specific components of those pentagons as described below.

Figure 12D:
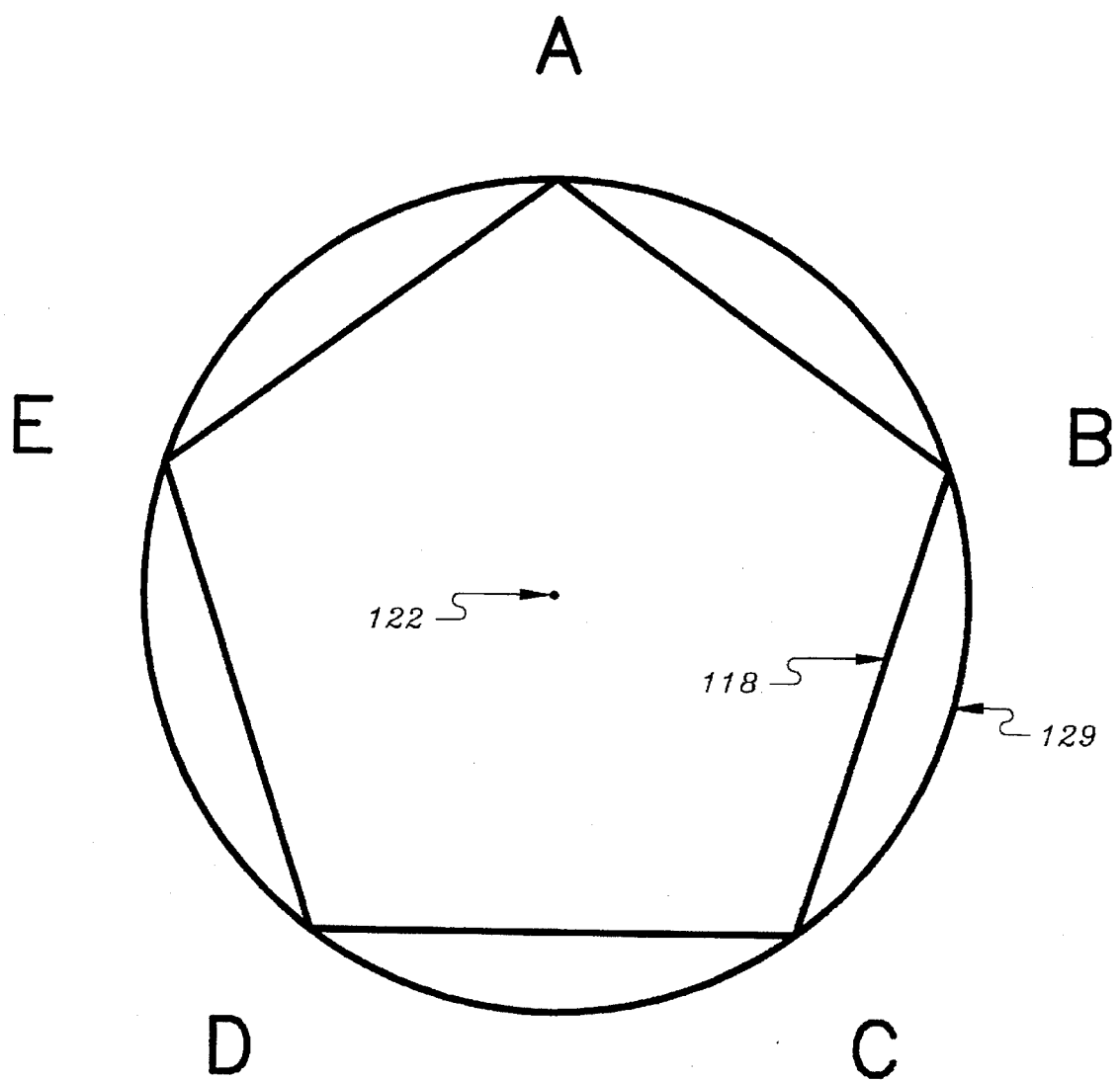
FIG. 12D shows the center of the regular base pentagon of FIG. 12B.
Figure 12E:
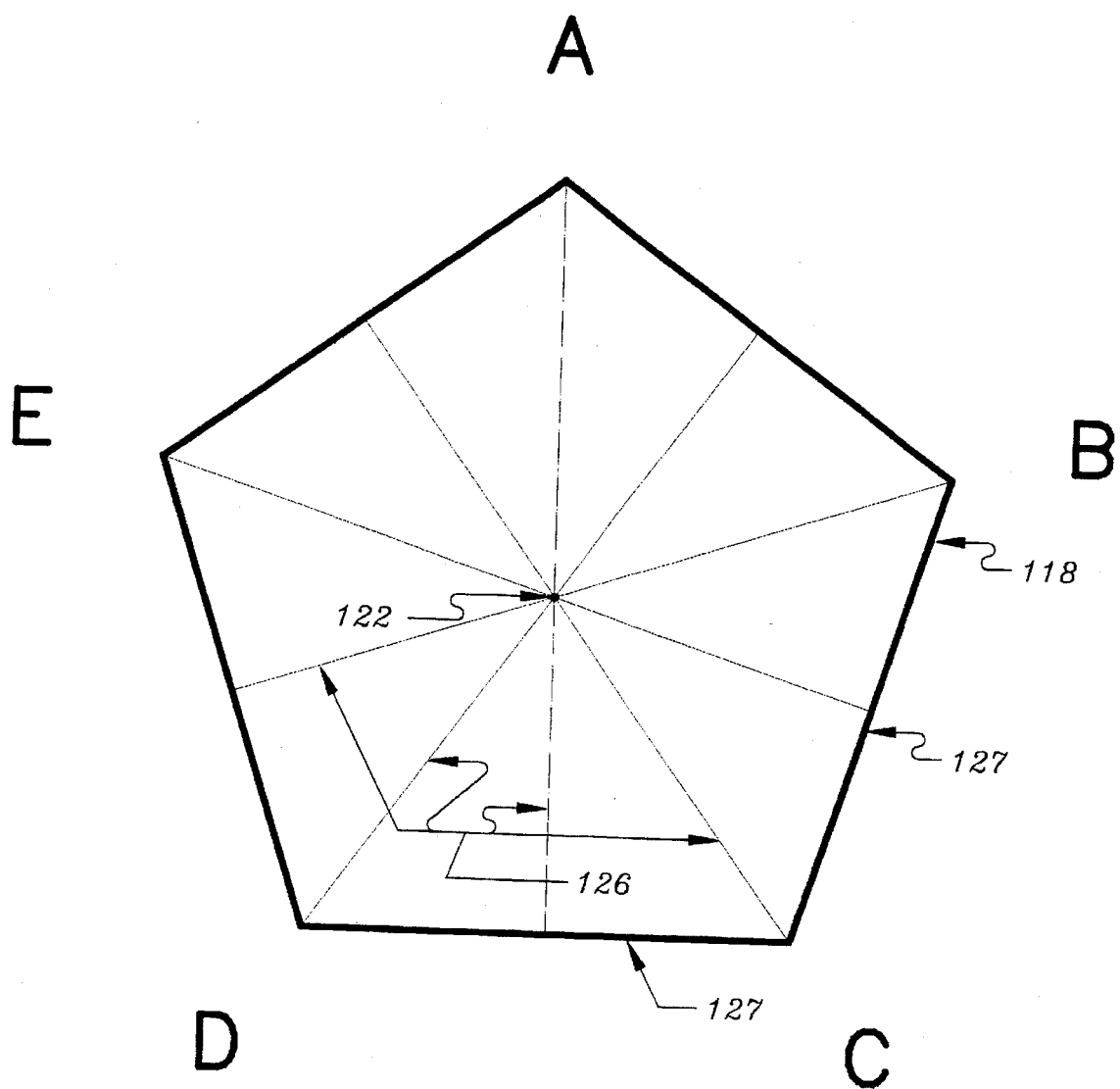
FIG. 12E shows the center of the regular base pentagon of FIG. 12B.
Figure 12F:
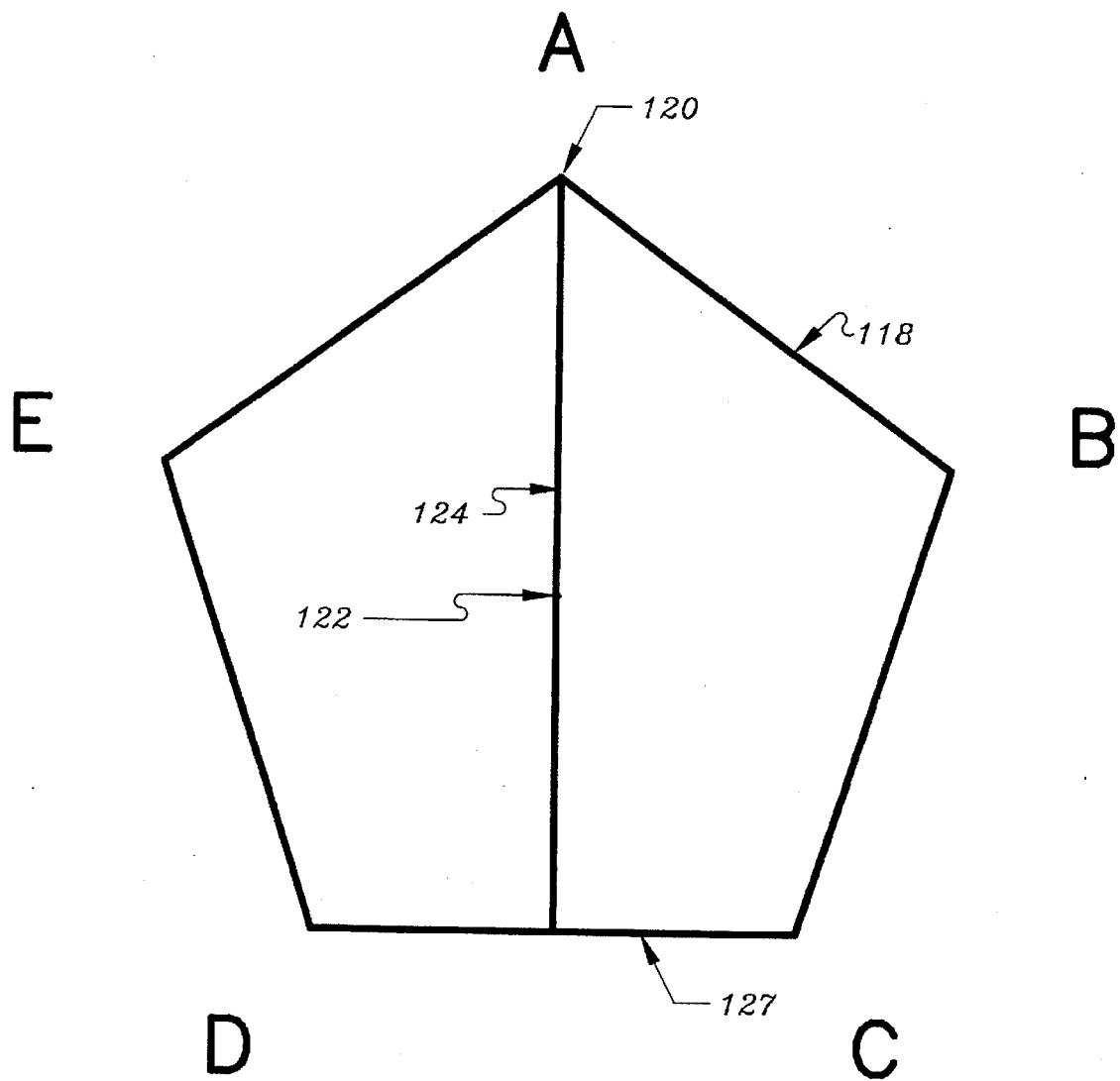
FIG. 12F shows the primary reference axis of the regular base pentagon of FIG. 12B.
Figure 12G:
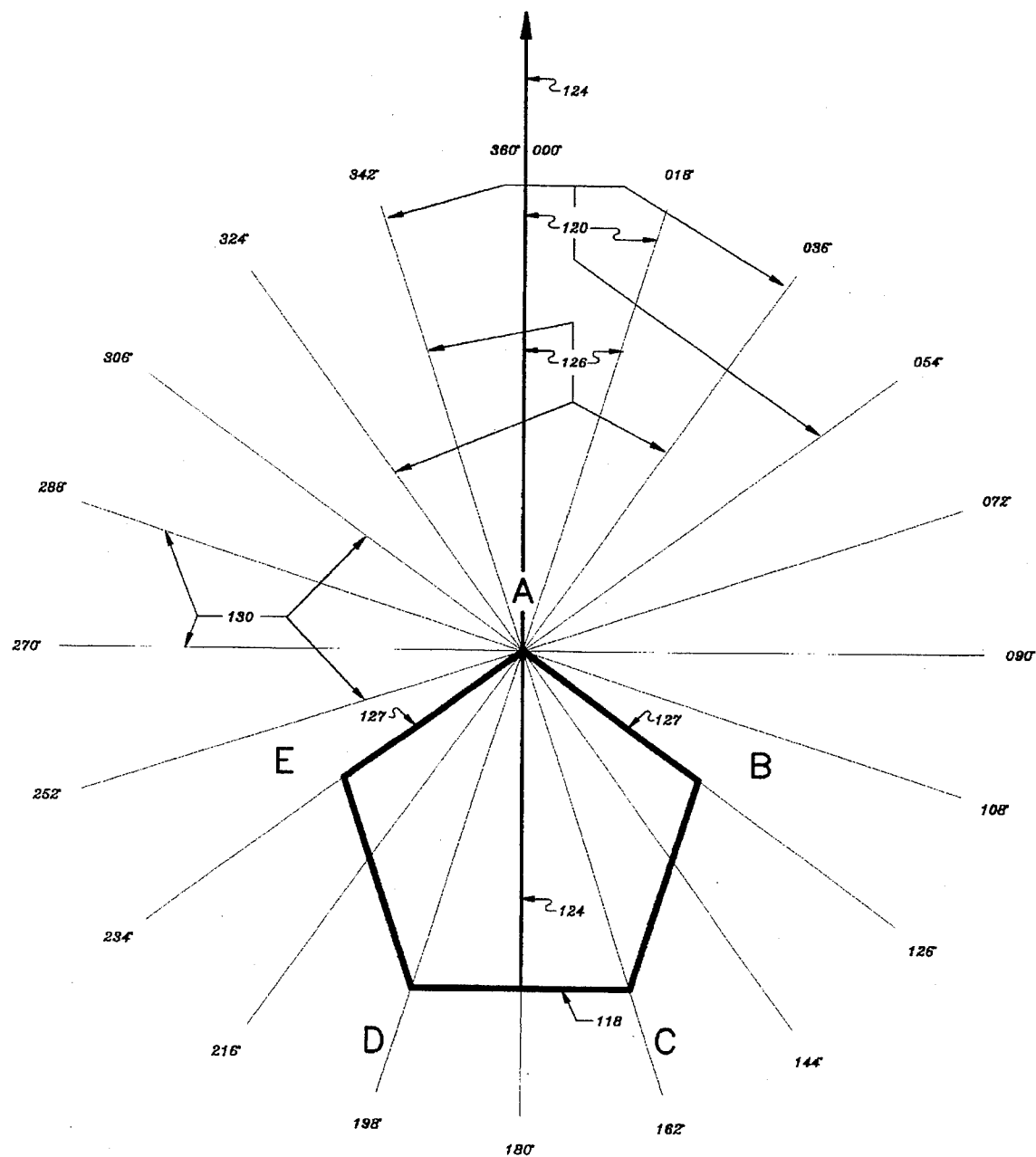
FIG. 12G shows the primary radials of vertex "A" of the regular base pentagon of FIG. 12B.
Figure 12H:
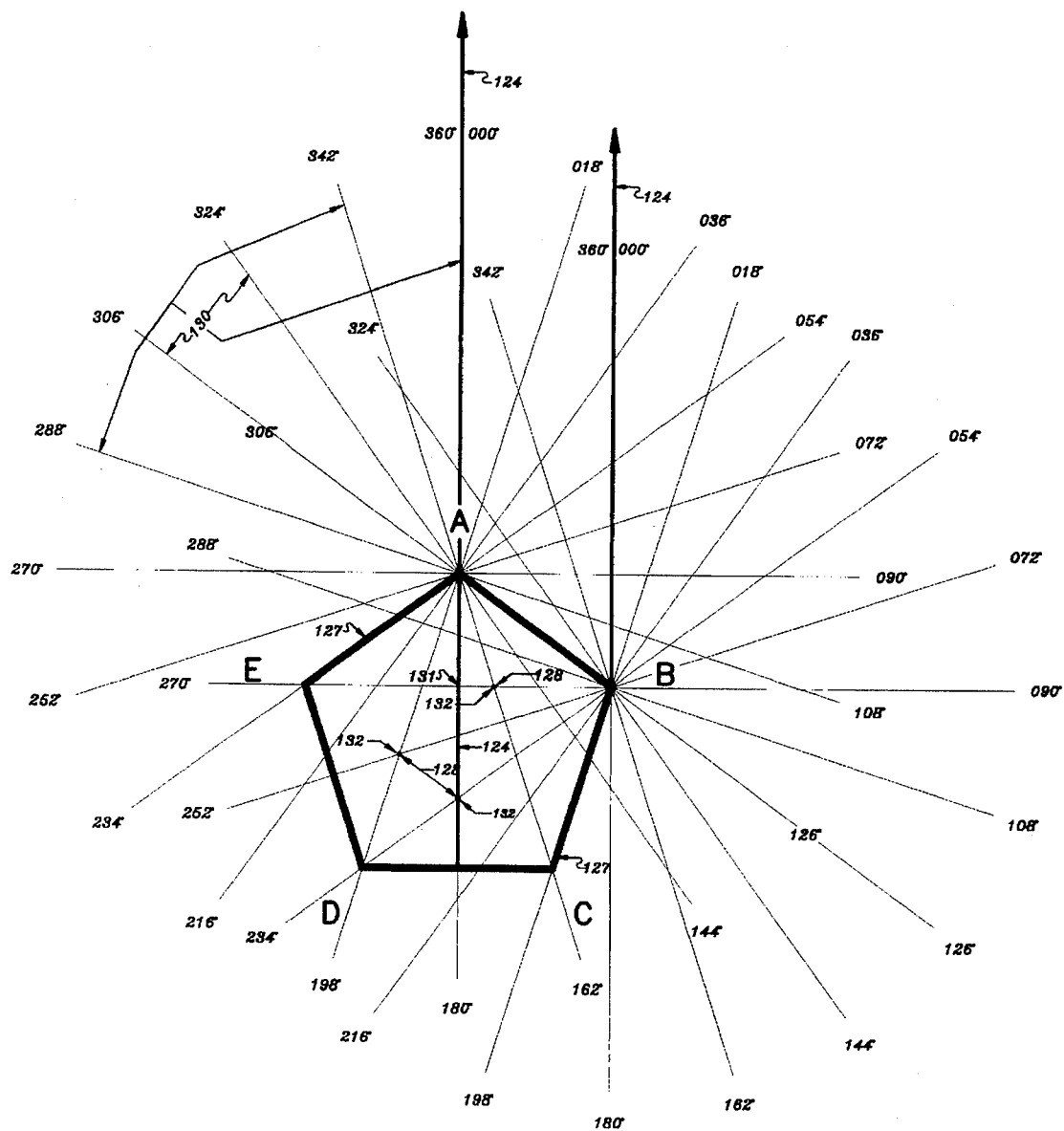
FIG. 12H shows the primary radials of vertex "A" and vertex "B" and their intersects of the regular base pentagon of FIG. 12B.

Each base pentagon system 114 (FIG. 12A) comprises: a base pentagon 118 (FIG. 12B); five vertices 120 (designated A–E and which may be identified by, e.g., "V(A)" to describe vertex A) (FIGS. 12A, 12C–12H); a center point 122 (FIGS. 12D and 12E); a primary reference axis 124 (FIG. 12F); radials 126 (FIGS. 12G and 12H); and intersect points 128 (FIG. 12H).

The center point 122 (FIG. 12D and 12E) of a pentagon system may be defined as: (1) a center of a circle 129 tangent to the vertices 120 of the pentagon 118 and circumscribing the pentagon 118; or (2) an intersect of the radials 126 extending from the vertices 120 of a pentagon and bisecting a side 127 of the pentagon 118 opposite the vertices 120. The primary reference axis 124, as shown in FIG. 12F, comprises a line bisecting the "A" vertex 120 (e.g. "V(A)") of the base pentagon 118, passing through the center 122 of the base pentagon 118 and bisecting the side 127 of the pentagon 118 opposite the "A" vertex.

Radials 126 (FIG. 12G and 12H) of the pentagon system include primary radials 130, secondary radials (not shown), and tertiary radials (not shown). Primary radials 130 are lines extending from vertices 120 of a pentagon every eighteen degrees such that two radials 126 coincide with two sides 127 of the pentagon 118 and one radial 126 is parallel to or coincident with the primary reference axis 124 (see FIGS. 12A, 12G, and 12H). Secondary radials (not shown) are lines extending from vertices 120 of a pentagon 118 which are not primary radials 130. Tertiary radials (not shown) are lines which extend from intersect points 128 (described below).

Each vertex has twenty primary radials 130 which are numbered in eighteen degree increments from zero degrees to three hundred sixty degrees starting with a radial 126 which is parallel to or coincident with the primary reference axis 124 of the base pentagon 118 and which extends in the same direction as a segment of the primary reference axis 124 which extends from the "A" vertex 120 external to the base pentagon 118 (see FIGS. 12G and 12H). Radials 126 are identified by a designating the vertex and degree from which they extend. For example, "V(X) R(120)" describes a radial 126 extending from a particular vertex 120 "X" of a pentagon system 112 at one hundred and twenty degrees relative to a radial which is parallel to or coincident with the primary reference axis 124 of the pentagon system 112. In further example, the primary reference axis 124 and any radials 126 parallel to or coincident with said axis 124 are designated as "V(X) R(0/360)" where X is the corresponding vertex 120 and 0°/360° is the degree designation.

Intersect points 128 include primary intersect points 132, secondary intersect points (not shown), and tertiary intersect points (not shown). Primary intersect points 132 (FIG. 12H) are points 128 at which a primary radial 130 intersects another primary radial 130. Secondary intersect points (not shown) are points 128 at which a secondary radial (not shown) intersects either another secondary radial (not shown) or a primary radial 130. Tertiary intersect points (not shown) are points 128 at which a tertiary radial (not shown) intersects either another tertiary radial (not shown) or a secondary radial (not shown) or a primary radial 130. Intersect points 128 are identified by designating the two radials 126 which intersect to form the intersect point 128. For example, "V(X) R(234) I V(Y) R(342)" describes an intersect point 128 defined by the intersection of a radial 126 extending from vertex "X" at two hundred thirty four degrees and a radial 126 extending from vertex "Y" at three hundred forty two degrees.

Figure 13C:
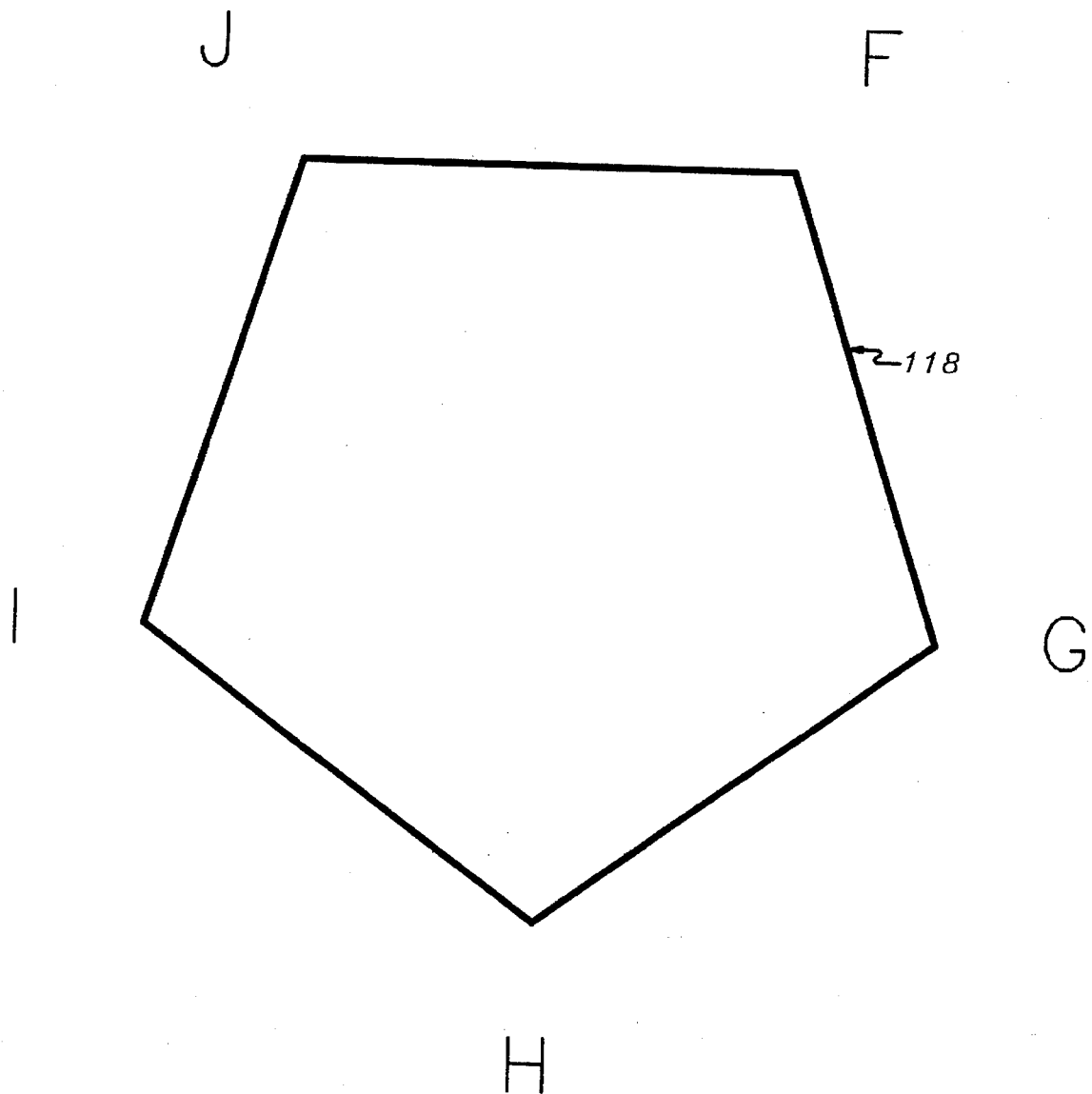
FIG. 13C shows the vertices of the inverse regular pentagon of FIG. 13B.
Figure 13D:
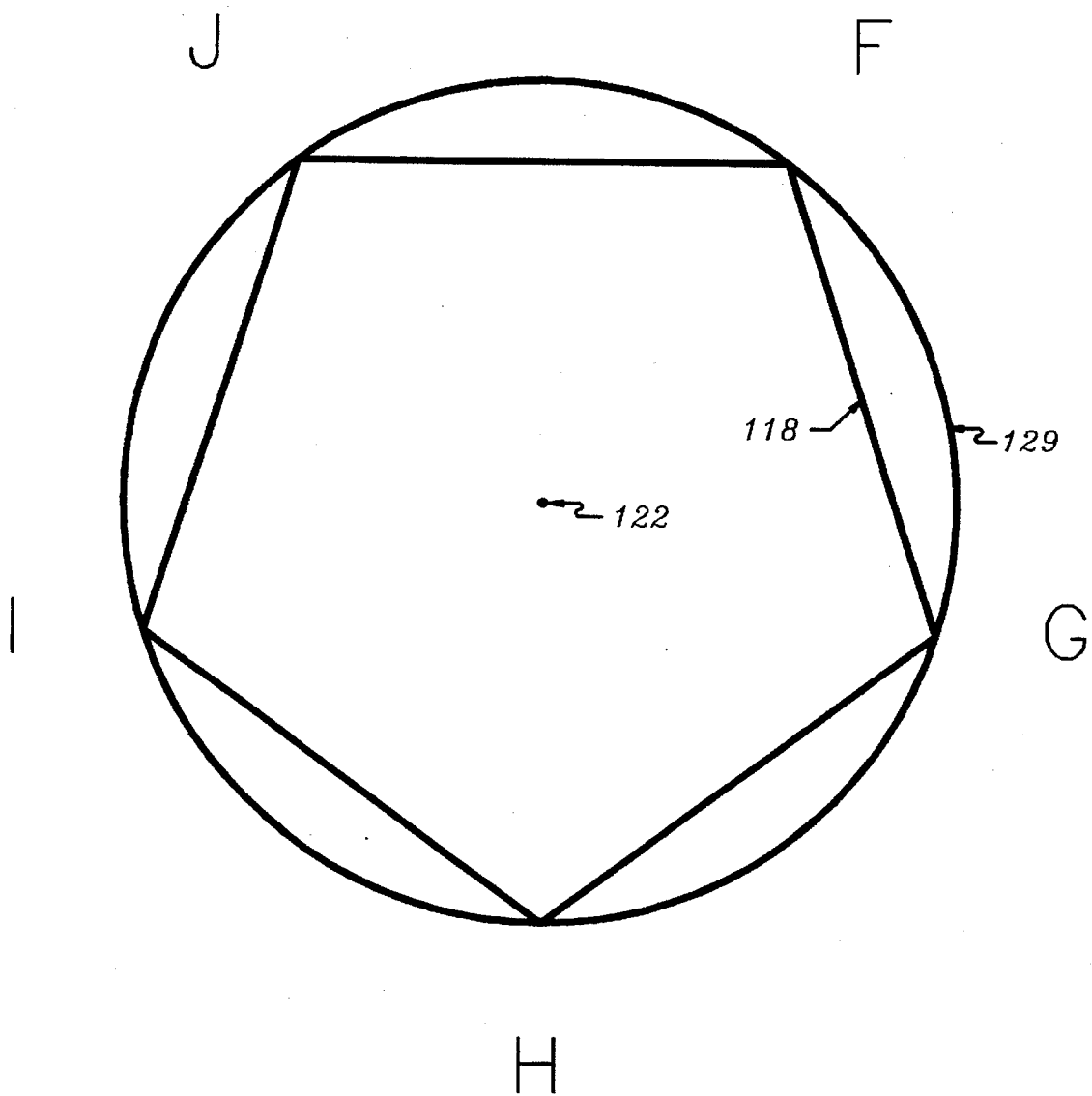
FIG. 13D shows the center of the inverse regular pentagon of FIG. 13B.
Figure 13E:
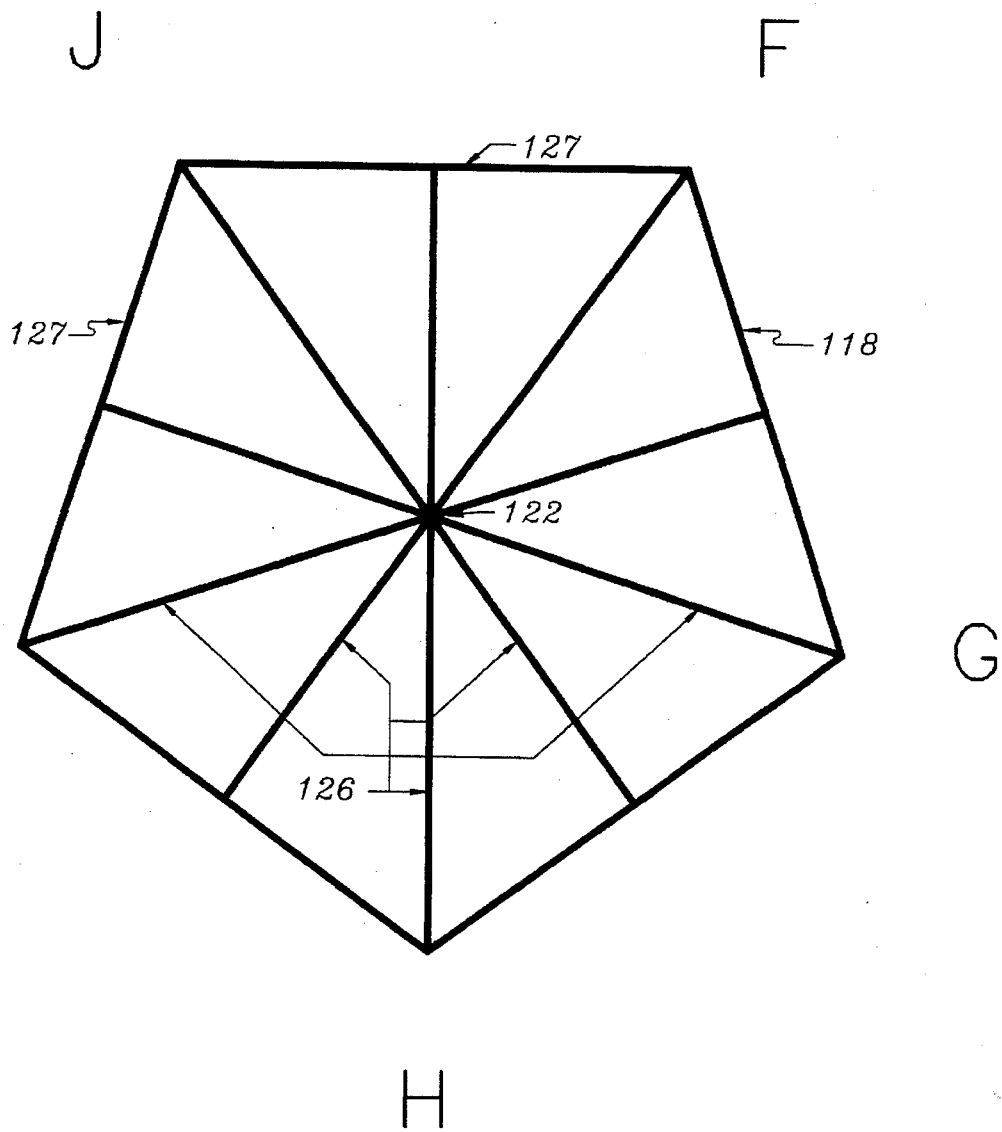
FIG. 13E shows the center of the inverse regular pentagon of FIG. 13B.
Figure 13F:
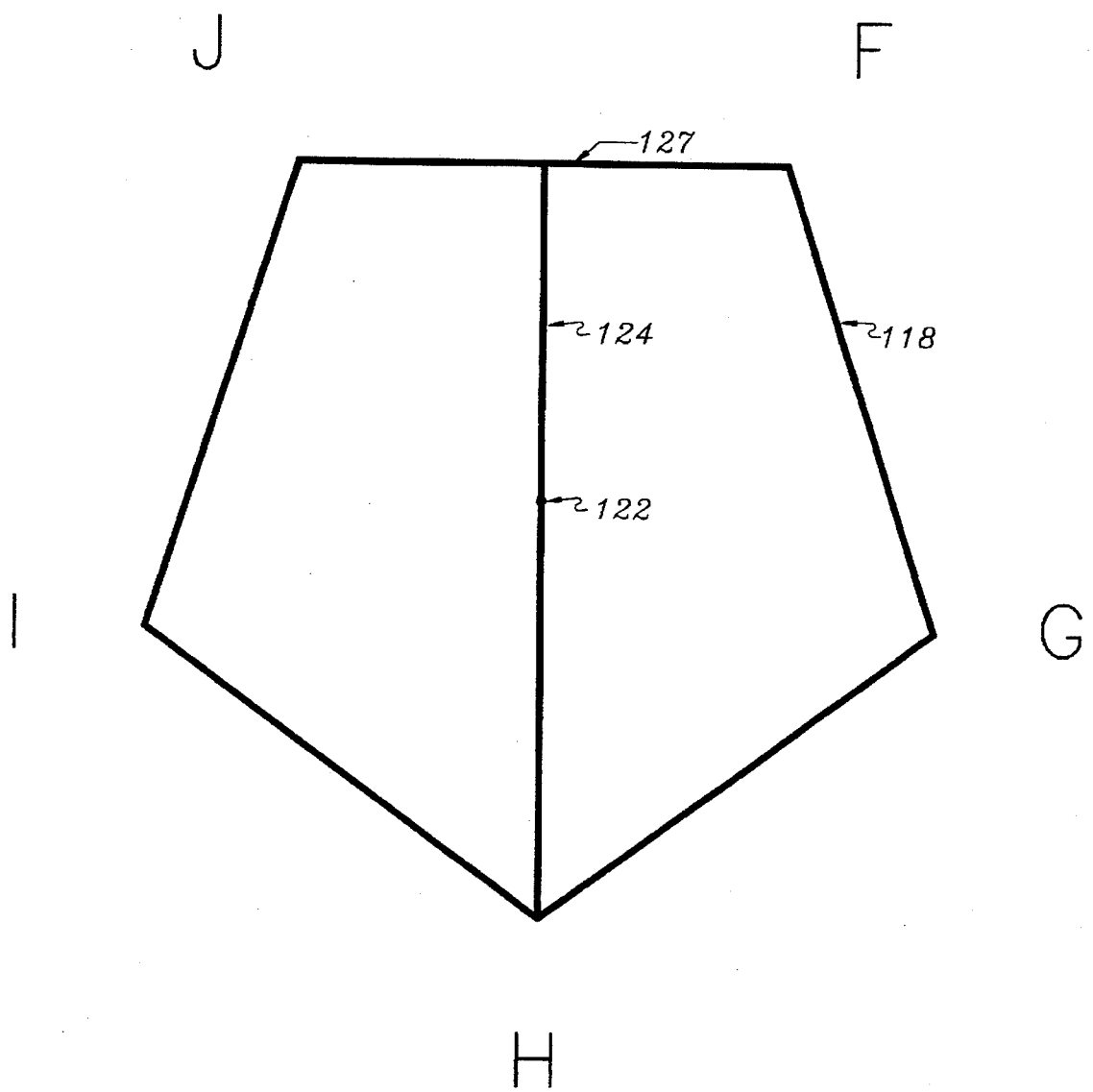
FIG. 13F shows the primary reference axis of the inverse regular pentagon of FIG. 13B.
Figure 13G:
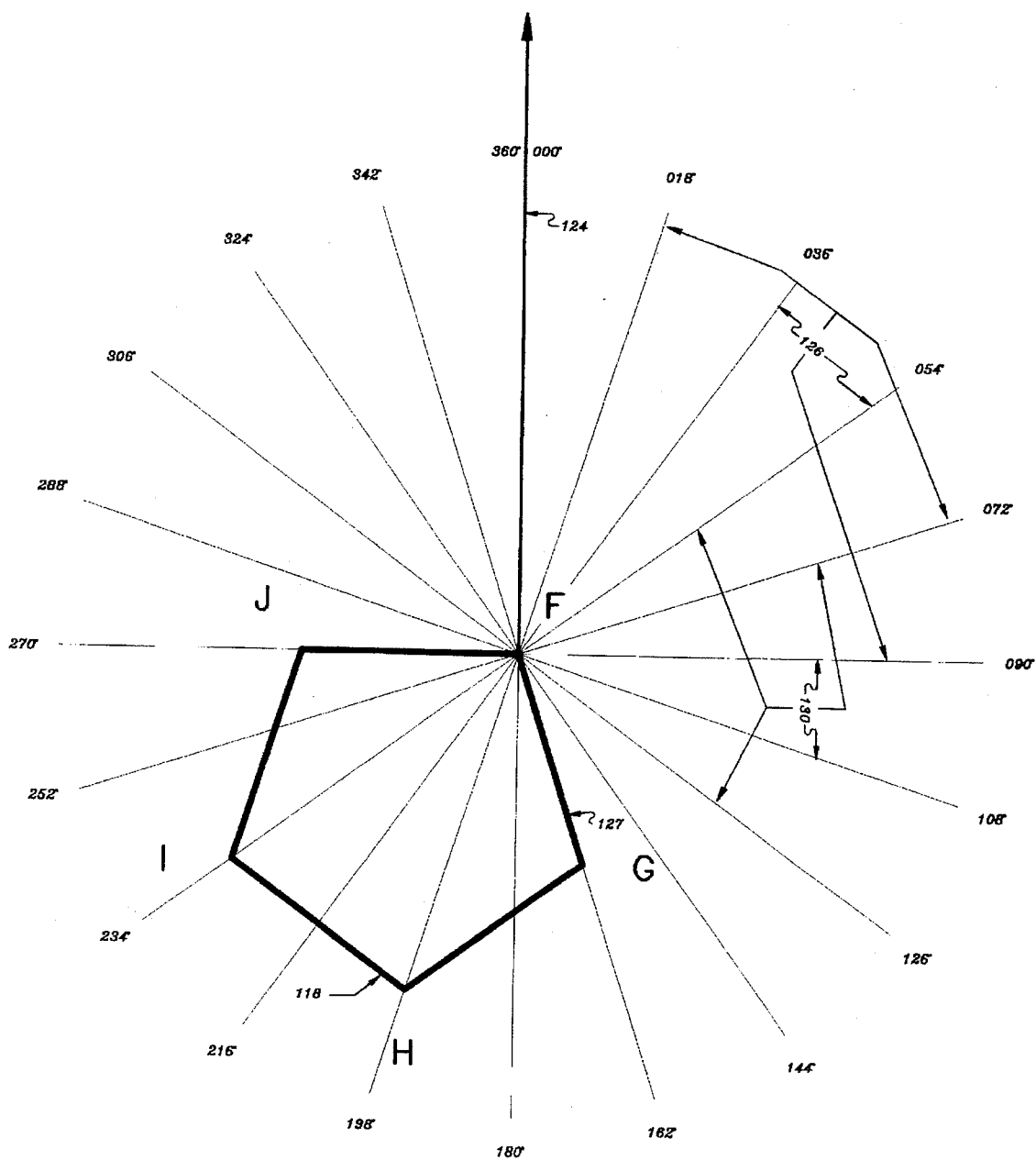
FIG. 13G shows the primary radials of vertex "F" of the inverse regular pentagon of FIG. 13B.
Figure 13H:
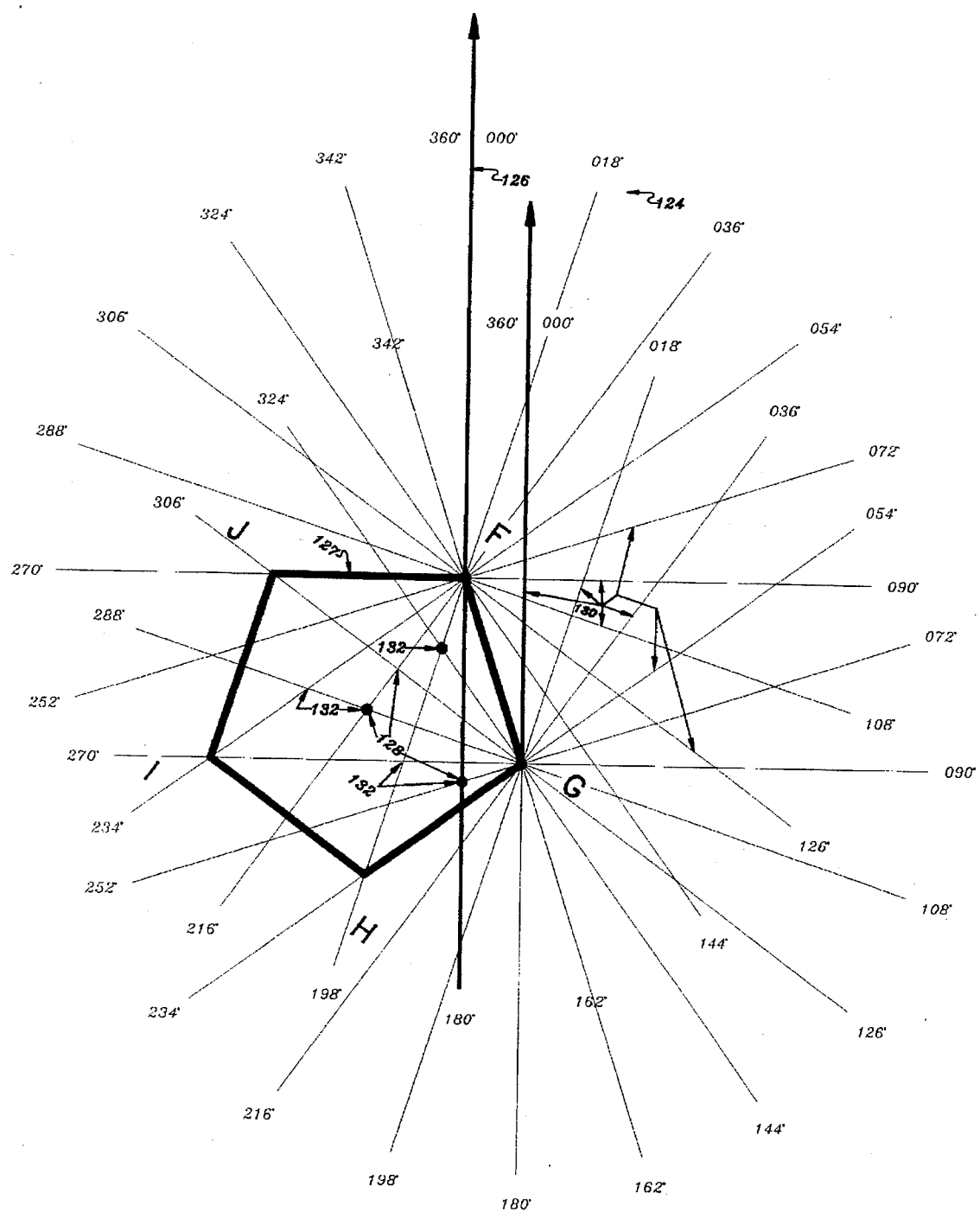
FIG. 13H shows the primary radials of vertex "F" and vertex "G" and their intersects of the inverse regular pentagon of FIG. 13B.

The inverse pentagon system 116 comprises all the features of the base pentagon system 114 described above. However, the inverse pentagon system 116 is rotated one-hundred eighty degrees with respect to the base pentagon system 114 (compare FIGS. 12A–12H and FIGS. 13A—13H). The inverse pentagon system 116 comprises a base pentagon 118 (FIG. 13B), five vertices 120 (labeled F–J) (FIG. 13C), a center point 122 (FIGS. 13D and 13E), a primary reference axis 124 (FIG. 13F), radials 126 (FIGS. 13G and 13H), and intersect points 128 (FIG. 13H). The center point 122 and the primary reference axis 124 of the inverse pentagon system 116 coincide with the center point 122 and the primary reference axis 124 of the base pentagon system 116 (see FIG. 11).

As mentioned above, the pentagon complex 112 (FIG. 11) comprises a base pentagon system 112 and an inverse pentagon system 116. Thus, the pentagon complex 112 comprises an aggregate of the features of the base pentagon 114 and inverse pentagon 116 systems described above.

A conglomeration of various pentagon complexes 112 form the basis of the overlay systems 110a–d of the present invention. Fragments of the various pentagon complexes 112 make up the overlay systems 110a–d. In describing these fragments, it is necessary to identify vertices 120, radials 126, and intersects 132. As described above, vertices 120 are identified by designations such as "V(X)" to identify vertex X and radials 126 are identified by designations such as "V(X) R(180)" to identify a radial extending from vertex X at an angle of one hundred eighty degrees. An intersect point 128 is identified by designating the radials 126 which intersect to make the point 128. The intersecting radials 126 which define a particular intersect point 128 are not necessarily radials 126 from the same pentagon complex 112. Thus, in a description of an intersect point 128, the pentagon complexes 12 from which the radials 126 defining the intersect point 128 extend should be clear. However, generally, when a particular pentagon complex 112 is being described the designation of the particular complex 112 from which the intersecting radials 126 extend is not written in every intersect point 128 description. Rather, when describing an intersect point 128 of a particular complex 112 it is assumed that the vertices 120 and radials 126 listed are of the complex 112 at issue unless some other complex 112 is designated. For example, when describing a particular pentagon complex "Z" a proper designation of an intersect point 128 may be: "V(A) R(180) I V(B) R(270)" (see 131 of FIG. 12H) meaning a point 128 at which a radial 126 extending from vertex A of complex Z at one hundred eighty degrees intersects a radial 126 extending from vertex B of complex Z at two hundred seventy degrees. However, if the description of an intersect point 128 requires using a radial 126 from a complex 112 other than the complex 112 at issue (i.e. a radial from a complex 112 other than "Z"), then the complex 112 must be designated in the intersect point 128 description. For example, "complex Z V(C) R(18) I complex Y V(H) R(90)" indicates the point at which a radial 126 extending from vertex C of complex Z at eighteen degrees intersects a radial 126 extending from vertex H of complex Y at ninety degrees. Thus, when an intersect point 128 is described without any complex 112 designations it is assumed that the vertices 120 and radials 126 listed are components of the complex 112 being described.

The overlay systems 110a–d of the present invention comprise multiple pentagon complexes 112 like the pentagon complex 112 described above. The multiple pentagon complexes 112 are all related in size and position to each other and to a matrix or reference pentagon complex 134.

The sizes of the pentagon complexes 112 are related by the following formula:

$$PC\ [subject] = PC\ [reference] \times [1/\Phi]^n \times Z$$

where

PC [subject]=the size of the target pentagon complex

PC [reference]=the size of the reference pentagon complex $\Phi = (1.618 \ldots)$ $n = 0-6$ $Z = 1;\ 2/\Phi;\ \Phi/2;\ (\Phi)^{1/3};\ (\Phi)^{2/3}$; or a combination of these multiplied together.

FIGS. 14A–14C show pentagons of different sizes as described according to this formula. FIG. 14A shows pentagons the sizes of which are defined by the above formula with n=0–6. Thus, a reference pentagon 134 is shown as the largest pentagon (and, therefore, has a size defined by n=0), the size of the next smaller pentagon 136 is defined by n=1, the size of the next smaller pentagon 138 is defined by n=2, and so on.

In addition, pentagons shown in FIG. 14B are pentagons the sizes of which are defined by the above formula where they have the same value for n but differing values for Z in Z=2/Φ and Φ/2. Thus, a reference pentagon 134 is shown as a mid-sized pentagon (Z=1), the smaller pentagon 140 is defined by Z=Φ/2, and the larger pentagon 142 is defined by Z=2/Φ.

Furthermore, FIG. 14C shows pentagons the sizes of which are also defined by the above formula (with constant "n" values), but $Z=(\Phi)^{1/3}$, $(\Phi)^{2/3}$, and $(\Phi)^{3/3}$ (i.e., $(\Phi)^{1/3}$ times $(\Phi)^{2/3}$). Thus, a reference pentagon 134 is shown as the smallest pentagon, the size of the next larger pentagon 144 is defined by $Z=(\Phi)^{1/3}$, the size of the next larger pentagon 146 is defined by $Z=(\Phi)^{2/3}$, and the size of the next larger pentagon 148 is defined by $Z=(\Phi)^{3/3}$ or $\Phi$.

Thus, all the pentagon complexes in a particular overlay system are related by a factor of phi ("Φ"), the golden proportion.

As mentioned above, each of the overlay systems 110a–d of the present invention comprise a matrix (or reference)

pentagon complex 134 and fragments of pentagon complexes 112 of varying sizes and positions. The positions of pentagon complexes 112 in a particular overlay system 110a–d may be described with respect to the matrix pentagon complex 134 of that overlay system 110a–d. For example, the position of a particular vertex 120 or intersect point 128 or radial 130 of a pentagon complex 112 may be described as coinciding with an intersect point 128 or radial 130 of the matrix pentagon complex 134 (see below for actual examples). In addition, any tilt of the pentagon complex 134 with respect to the matrix pentagon complex 134 may be described by indicating a coinciding or parallel radials 126 of the pentagon complex 112 in question and the matrix pentagon complex 134.

Because the pentagon complexes 12 which make up the overlay systems 110a–d are all related, some lines of a particular system 110a–d may be describable as fragments of more than one particular pentagon complex 112. Therefore, in the detailed descriptions below some lines are or may be described more than once. In addition, the close relation of the various complexes 112 makes it possible to describe subtle variations in certain features represented by the overlay systems 110a–d. Therefore, in the detailed description below some lines may describe such variations. Furthermore, for clarity and due to the minute detail of the overlay systems 110a–d some of the line fragments and variations described may not be indicated on the figures provided. However, these fragments are easily drawn by one skilled in the art from the detailed description given below.

As mentioned above, a detailed description of the individual points and lines that form the overlay systems will now be provided to enable one skilled in the art to practice the present invention.

I. FRONTAL REPOSE OVERLAY SYSTEM

A overlay system 110a comprising a frontal view of a face in repose (FIG. 9A) will be described by first describing a matrix complex 134 and then describing other complexes making up the particular overlay system. In describing the other pentagon complexes 112, the size of the pentagon complexes 112 (starting with those which are the smallest) will be described first, then their positions relative to complex 134, and then points, lines, and/or areas defined by the pentagon complexes 112 which outline the overlay system 110a in interest. After the smallest pentagon complexes 112 are described, additional pentagon complexes 112 will be addressed in order of increased sizes. There are seven different sizes of pentagon complexes 112 involved in the overlay system 110a comprising a frontal view of a face in repose.

A. Matrix Complex

The matrix complex 134 is, by definition, of the size n=0 and Z=1 (See FIGS. 15 and 16). Features of the overlay system 110a are defined by fragments of this complex 134 comprising: (1) a portion of a radial extending from V(A) at 126° and extending between intersect V(A) R(126) I V(F) R(270) and intersect V(A) R(126) I V(F) R(180) 101; (2) a portion of a radial extending from V(A) at 234° and extending between intersect V(A) R(234) I V(J) R(90) and intersect V(A) R(234) I V(J) R(180) 102; (3) a portion of a radial extending from V(F) at 180° and extending between intersect V(F) R(180) I V(B) R(306) and intersect V(F) R(180) I V(B) R(216) 103; (4) a portion of a radial extending from V(J) at 180° and extending between intersect V(J) R(180) I V(E) R(54) and intersect V(J) R(180) I V(E) R(144) 104; (5) a portion of a radial extending from V(F) at 252° and extending between intersect V(F) R(252) I V(A) R(126) and intersect V(F) R(252) I V(A) R(180) 105; (6) a portion of a radial extending from V(J) at 108° and extending between intersect V(J) R(108) I V(A) R(234) and intersect V(J) R(108) I V(A) R(180) 106; (7) a portion of a radial extending from V(F) at 198° and extending between intersect V(F) R(198) I V(A) R(126) and intersect V(F) R(198) I V(A) R(144) 107; (8) a portion of a radial extending from V(J) at 162° and extending between intersect V(J) R(162) I V(A) R(234) and intersect V(J) R(162) I V(A) R(216) 108; (9) a portion of a radial extending from V(A) at 144° and extending between intersect V(A) R(144) I V(F) R(198) and intersect V(A) R(144) I V(F) R(180) 109; (10) a portion of a radial extending from V(A) at 216° and extending between intersect V(A) R(216) I V(J) R(162) and intersect V(A) R(216) I V(J) R(180) 110; (11) a portion of a radial extending from V(J) at 90° and extending between intersect V(J) R(90) I V(A) R(234) and intersect V(J) R(90) I V(A) R(126) 111; (12) a portion of a radial extending from V(A) at 162° and extending between intersect V(A) R(162) I V(F) R(216) and intersect V(A) R(162) I V(F) R(252); (13) a portion of a radial extending from V(A) at 198° and extending between intersect V(A) R(198) I V(J) R(108) and intersect V(A) R(198) I V(J) R(144); and (14) a portion of a radial extending from V(B) at 270° and extending between intersect V(B) R(270) I V(A) R(162) and intersect V(B) R(270) I V(A) R(198).

B. Pentagon Complexes with n=6

There are only two pentagon complexes 12 of the size n=6 (See FIG. 29). They are iris pentagon complexes 150 and define right and left irises on the frontal repose overlay system 110a. These pentagon complexes have Z values of 1.

1. Right Iris Complex

The iris pentagon complex 150 which defines the right iris on the overlay system 110a is positioned on the matrix complex with V(E) of the iris complex 150 coinciding with intersect matrix complex V(E) R(108) I matrix complex V(F) R(234) and iris complex V(E) R(108) coinciding with matrix complex V(E) R(108). Features of the overlay system 110a are defined by fragments of this pentagon complex comprising: (1) a circle circumscribing the pentagon complex and intersecting the vertices (e.g. V(A), V(B), V(C), . . . etc.); and (2) a circle connecting the following intersects: (a) V(E) R(90) I V(F) R(234); (b) V(J) R(126) I V(B) R(270); (c) V(A) R(162) I V(G) R(306); (d) V(F) R(198) I V(C) R(342); (e) V(B) R(234) I V(H) R(18); (f) V(G) R(270) I V(D) R(54); (g) V(C) R(306) I V(I) R(90); (h) V(H) R(342) I V(E) R(126); (i) V(D) R(18) I V(J) R(162); and (j) V(I) R(54) I V(A) R(198).

2. Left Iris Complex

The iris pentagon complex 150 which defines the left iris on the overlay system 110a is positioned on the matrix complex with V(B) of the iris complex 150 coinciding with intersect matrix complex V(B) R(252) I matrix complex V(F) R(198) and iris complex V(B) R(252) coinciding with matrix complex V(B) R(252). Features of the overlay system 110a are defined by fragments of this pentagon complex which are the same as the fragments of the right iris complex described above.

C. Pentagon Complexes with n=5

There are five pentagon complexes 112 of size n=5 in the frontal repose overlay system 1110a of the present invention. Three of these pentagon complexes 112 have Z values of 1 (FIG. 26), one has a Z value of $\Phi/2$ (FIG. 27), and one has a Z value of $2/\Phi$ (FIG. 28). The pentagon complexes 112 with Z=1 are: (1) a nasal tip complex 156; (2) an internal lips complex 158; and (3) an internal naris complex 160. The pentagon complex 112 with Z=Φ/2 is an inner nasal tip halo complex 162. The pentagon complex 112 with Z=2/Φ is an outer nasal tip halo complex 164. These five pentagon complexes 156, 158, 160, 162, and 164 define various features of the frontal repose overlay system 110a.

1. Nasal Tip Complex

The nasal tip pentagon complex 156 (FIG. 26) is positioned on the matrix complex with V(A) R(180) of the complex 156 coincident with matrix complex V(A) R(180), nasal tip complex 156 V(C) intersected by matrix complex V(B) R(234), and nasal tip complex 156 V(D) intersected by matrix complex V(E) R(126). Features of the overlay system 110a are defined by fragments of this pentagon complex 155 comprising: (1) radials extending from each of V(F) , V(G) , V(I) , and V(J) , at 0°/360° up to points where the radials respectively intersect V(F) R(216), V(B) R(252), V(E) R(108), and V(J) R(144); (2) radials connecting V(F) to V(G), V(G) to V(H), V(H) to V(I), and V(I) to V(J); (3) a radial extending from V(G) at 252° and extending to the intersect V(G) R(252) I V(A) R(180); (4) a radial extending from V(I) at 108° and extending to the intersect V(I) R(108) I V(A) R(180); (5) a portion of a radial extending from matrix complex V(F) at 216° and extending between intersect matrix complex V(F) R(216) I matrix complex V(A) R(162) and intersect matrix complex V(F) R(216) I nasal tip complex V(F) R(360); and (6) a portion of a radial extending from matrix complex V(J) at 144° and extending between intersect matrix complex V(J) R(144) I matrix complex V(A) R(198) and intersect matrix complex V(J) R(144) I nasal tip complex V(J) R(360).

2. Internal Lips Complex

The internal lips pentagon complex 158 (FIG. 26) is positioned on the matrix complex with V(C) R(288) and V(D) R(72) of the internal lips complex 158 coincident with matrix complex V(C) R(288) and V(D) R(72) respectively. Features of the overlay system 110a are defined by fragments of this pentagon complex 158 comprising: (1) radials connecting V(F) to V(G), V(G) to V(C), V(C) to V(D), V(D) to V(I), and V(I) to V(J); (2) radials extending from the center point to V(B), V(E), V(F), and V(J); (3) a radial extending from V(F) at 0°/360° and extending to the intersect V(F) R(0/360) I matrix complex V(B) R(234); (4) a radial extending from V(F) at 342° and extending to the intersect V(F) R(342) I matrix complex V(B) R(234); (5) a radial extending from V(J) at 0°/360° and extending to the intersect V(J) R(0/360) I matrix complex V(E) R(126); and (6) a radial extending from V(J) at 18° and extending to the intersect V(J) R(18) I matrix complex V(E) R(126). There are two additional fragments of this pentagon complex 158 which define features of the overlay system 110a. However, to describe these two additional features a nose/mouth pentagon complex 184 must first be described. This additional pentagon complex 184 is of the size where n=3 and will be described below. Therefore, the two additional fragments of pentagon complex 158 will be described concurrent with the nose/mouth pentagon complex 184 below.

3. Internal Naris Complex

The internal naris pentagon complex 160 (FIG. 26) is positioned on the matrix complex with V(F) R(270) of the internal naris complex 160 coincident with matrix complex V(G) R(270), internal naris complex 160 V(J) R(90) coincident with matrix complex V(I) R(90), and center point of complex 160 coincident with intersect matrix complex V(B) R(234) I matrix complex V(C) R(306). Features of the overlay system 110a are defined by fragments of this pentagon complex 168 comprising: (1) a radial extending from V(C) at 0°/360° and extending to intersect V(C) R(0/360) I V(B) R(270); (2) a radial extending from V(D) at 0°/360° and extending to intersect V(D) R(0/360) I V(E) R(90); (3) a radial extending from V(F) at 234° and extending to intersect V(F) R(234) I V(J) R(126); (4) a radial extending from V(J) at 126° and extending to V(J) R(126) I V(F) R(234); (5) a radial extending from V(B) at 18° and extending to intersect point V(B) R(18) I matrix complex V(G) R(270); and (6) a radial extending from V(E) at 342° and extending to intersect point V(E) R(342) I matrix complex V(I) R(90). There are two additional fragments of this pentagon complex 160 which define features of the overlay system 110a. However, to describe these two additional fragments the inner nasal tip halo pentagon complex 162 must first be described. This pentagon complex 162 is described below and the two additional fragments of pentagon complex 160 will be described concurrently.

4. Inner Nasal Tip Halo Complex

The inner nasal tip halo pentagon complex 162 (FIG. 27) is positioned on the matrix complex with V(G) of the inner nasal tip halo complex 162 coincident with intersect matrix complex V(B) R(234) I matrix complex V(G) R(270), V(H) of the halo complex 162 coincident with intersect matrix complex V(B) R(234) I matrix complex V(C) R(306), and V(I) of the complex 162 coincident with intersect matrix complex V(C) R(306) I matrix complex V(I) R(90). Features of the overlay system 110a are defined by fragments of this pentagon complex 162 comprising: (1) radials connecting V(F) to V(G), V(G) to V(H), V(H) to V(I), and V(I) to V(J); and (2) radials extending from V(G) and V(I) at 0°/360° and extending to points where the radials respectively intersect V(F) R(90) and V(J) R(270).

Two additional fragments from the internal naris pentagon complex 160 may now be defined. The additional fragments comprise: (1) a radial extending from the internal naris complex 160 V(B) at 54° and extending to intersect internal naris complex 160 V(B) R(54) I inner nasal tip halo complex 162 V(G) R(108); and (2) a radial extending from the internal naris complex 160 V(E) at 306° and extending to intersect internal naris complex 160 V(E) R(306) I inner nasal tip halo complex 162 V(I) R(252).

5. Outer Nasal Tip Halo Complex

The outer nasal tip halo pentagon complex 164 (FIG. 28) is positioned on the matrix complex with V(H) of the outer nasal tip halo complex 164 coincident with intersect matrix complex V(B) R(234) I matrix complex V(C) R(306), V(G) R(54) of outer nasal tip halo complex 164 coincident with matrix complex V(D) R(54), and V(I) R(306) of complex 164 coincident with matrix complex V(C) R(306). Features of the overlay system 110a are defined by fragments of this pentagon complex 164 comprising radials connecting V(F) to V(G), V(G) to V(H), V(H) to V(I), and V(I) to V(J).

D. Pentagon Complexes with n=4

There are four pentagon complexes of size n=4 in the frontal repose overlay system 110a (see FIG. 25). All four of these pentagon complexes have Z values of 1. The pentagon complexes are: (1) a nasal pentagon complex 170; (2) a chin button pentagon complex 172; (3) an eye pentagon complex right 174; and (4) an eye pentagon complex left 176. Fragments of these four pentagon complexes 170, 172, 174, and 176, define various features of the frontal repose overlay system 110a.

1. Nasal Complex

The nasal pentagon complex 170 (FIG. 25) is positioned on the matrix complex with V(H) of the nasal complex 170 coincident with intersect matrix complex V(B) R(234) I matrix complex V(C) R(306), V(B) R(324) of the nasal complex 170 coincident with matrix complex V(C) R(324), and V(E) R(216) of the nasal complex 170 coincident with matrix complex V(F) R(216). Various features of the overlay system 110a are defined by fragments of this pentagon complex 170 comprising: (1) a radial extending from V(F) at 180° and extending to intersect V(F) R(180) I V(G) R(252); (2) a radial extending from V(J) at 180° and extending to intersect V(J) R(180) I V(I) R(108); (3) a radial connecting V(F) to V(G); (4) a radial connecting V(J) to V(I); (5) a portion of radial V(B) R(234) which connects the radials described in (1) and (3) above; (6) a portion of radial V(E) R(126) which connects the radials described in (2) and (4) above; (7) a radial extending from V(G) at 18° and extending to intersect V(G) R(18) I V(B) R(36); and (8) a radial extending from V(I) at 342° and extending to intersect V(I) R(342) I V(E) R(324).

In addition, two fragments of the nasal pentagon complex 170 can be described if the inner nasal tip halo pentagon complex 162 is also considered. These additional fragments comprise: (9) a radial extending from nasal complex 170 V(G) at 180° and extending to intersect nasal complex 170 V(G) R(180) I inner nasal tip halo complex 162 V(G) R(108); and (10) a radial extending from nasal complex 170 V(I) at 180° and extending to intersect nasal complex 170 V(I) R(252).

2. Chin Button Complex

The chin button pentagon complex 172 (FIG. 25) is positioned on the matrix complex with V(H) of the chin button complex 172 coincident with matrix complex V(H), V(B) of the chin complex 172 coincident with intersect matrix complex V(B) R(216) I matrix complex V(C) R(270), and V(E) of the complex 172 coincident with matrix complex V(D) R(90) I V(E) R(144). Features of the frontal repose overlay system 110a are defined by fragments of this pentagon complex 172 comprising: (1) radials connecting V(E) to V(J), V(J) to V(A), V(A) to V(F), and V(F) to V(B); (2) a radial extending from V(B) at 198° and extending to intersect V(B) R(198) I V(G) R(270); (3) a radial extending from V(E) at 162° and extending to intersect V(E) R(162) I V(I) R(90); (4) a radial extending from V(B) at 54° and extending to intersect V(B) R(54) I V(C) R(36); (5) a radial extending from V(E) at 306° and extending to intersect V(E) R(306) I V(D) R(324); (6) a portion of radial V(G) R(270) which connects the radials described in (2) and (3) above; (7) a portion of radial V(C) R(324) which connects a center point of complex 172 and the radial described in (6) above; and (8) a portion of radial V(D) R(36) which connects the center point of the complex 172 to the radial described in (6) above.

3. Right Eye Complex

The right eye pentagon complex 174 (FIG. 25) is positioned on the matrix complex with V(E) R(108) of the eye complex 174 coincident with V(E) R(108) of the matrix complex and intersect V(I) R(54) I V(J) (162) of the eye pentagon complex 174 coincident with intersect matrix complex V(I) R(54) I matrix complex V(J) R(162). Various features of the frontal repose overlay system 110a are defined by fragments of this pentagon complex 174 comprising: (1) radials connecting V(G) to V(C), V(C) to V(H), V(H) to V(D), V(D) to V(I), and V(I) to V(E); (2) a radial connecting V(B) to V(J); (3) a radial extending from V(G) at 252° and extending to intersect V(G) R(252) I V(H) R(0/360); (4) a radial extending from V(I) at 108° and extending to intersect V(I) R(108) I V(H) R(0/360); (5) a radial extending from V(G) at 270° and extending to intersect V(G) R(270) I V(E) R(162); (6) a radial extending from V(G) at 306° and extending to intersect V(G) R(306) I V(F) R(216); (7) a radial extending from V(G) at 324° and extending to intersect V(G) R(324) I V(B) R(270); (8) a radial extending from V(G) at 342° and extending to intersect V(G) R(342) I V(B) R(216); (9) a line connecting intersect V(G) R(342) I V(B) R(216) and intersect V(G) R(324) I V(B) R(270); (10) a radial extending from V(E) at 90° and extending to intersect V(E) R(90) I V(G) R(324); (11) a portion of a radial extending from V(E) at 162° and extending between intersect V(E) R(162) I V(G) R(270) and V(E) R(162) I V(I) R(36); (12) a portion of a radial extending from V(I) at 36° and extending between intersect V(I) R(36) I V(E) R(162) and intersect V(I) R(36) I V(E) R(108); (13) a line connecting intersect V(I) R(36) I V(E) R(108) and intersect V(A) R(198) I V(B) R(270); (14) a portion of a radial extending from V(E) at 144° and extending between intersect V(E) R(144) I V(F) R(234) and V(E) R(144) I V(G) R(270); (15) a portion of a radial extending from V(I) at 54° and extending between intersect V(I) R(54) I V(A) R(198) and intersect V(I) R(54) I V(E) R(144); (16) a radial extending from V(G) at 234° and extending to intersect V(G) R(234) I V(C) R(270); (17) a portion of a radial extending from V(C) at 270° and extending between intersect V(C) R(270) I V(G) R(234) and intersect V(C) R(270) I V(I) R(126); (18) a radial extending from V(I) at 126° and extending to intersect V(I) R(126) I V(C) R(270); and (19) a radial extending from V(B) at 36° and extending to intersect V(B) R(36) I matrix complex V(J) R(144).

4. Left Eye Complex

The left eye pentagon complex 176 (FIG. 25) is positioned on the matrix complex with V(B) R(252) of the eye complex coincident with V(B) R(252) of the matrix complex and intersect V(F) R(198) I V(G) R(306) of the eye complex 176 coincident with intersect V(F) R(198) I V(G) R(306) of the matrix complex. Various features of the frontal repose overlay system 110a are defined by fragments of this pentagon complex 176 comprising: (1) radials connecting V(B) to V(G), V(G) to V(C), V(C) to V(H), V(H) to V(D), and V(C) to V(I); (2) a radial connecting V(E) to V(F); (3) a radial extending from V(G) at 252° and extending to intersect V(G) R(252) I V(H) R(0/360); (4) a radial extending from V(I) at 108° and extending to intersect V(I) R(108) I V(H) R(0/360); (5) a radial extending from V(I) at 270° and extending to intersect V(I) R(270) I V(B) R(198); (6) a radial extending from V(I) at 54° and extending to intersect V(I) R(54) I V(J) R(144); (7) a radial extending from V(I) at 36° and extending to intersect V(I) R(36) I V(B) R(270); (8) a radial extending from V(I) at 18° and extending to intersect V(I) R(18) I V(E) R(144); (9) a line connecting intersect V(I) R(18) I V(E) R(144) and intersect V(I) R(36) I V(B) R(270); (10) a radial extending from V(B) at 270° and extending to intersect V(B) R(270) I V(I) R(36); (11) a portion of a radial extending from V(B) at 198° and extending between intersect V(B) R(198) I V(I) R(90) and V(B) R(198) I V(G) R(324); (12) a portion of a radial extending from V(G) at 324° and extending between intersect V(G) R(324) I V(B) R(198) and intersect V(G) R(324) I V(B) R(252); (13) a line connecting intersect V(G) R(324) I V(B) R(252) and intersect V(A) R(162) I V(B) R(270); (14) a portion of a radial extending from V(B) at 216° and extending between intersect V(B) R(216) I V(I) R(270) and intersect V(B) R(216) I V(J) R(126); (15) a portion of a radial extending from V(G) at 306° and extending between intersect V(G) R(306) I V(A) R(162) and intersect V(G) R(306) I V(B) R(216); (16) a radial extending from V(G) at 234° and extending to intersect V(G) R(234) I V(C) R(270); (17) a portion of a radial extending from V(C) at 270° and extending between intersect V(C) R(270) I V(G) R(234) and intersect V(C) R(270) I V(I) R(126); (18) a radial extending from V(I) at 126° and extending to intersect V(I) R(126) I V(C) R(270); and (19) a radial extending from V(E) at 324° and extending to intersect V(E) R(324) I matrix complex V(F) R(216).

E. Pentagon Complexes with n=3

A majority of the pentagon complexes 112 making up the frontal repose overlay system 110a of the present invention are of the size n=3. There are sixteen pentagon complexes of this size. Fourteen of these complexes have Z values of 1 (See FIG. 22). These pentagon complexes are: (1) a nose/mouth pentagon complex 184; (2) a mouth/chin pentagon complex 186; (3) a chin inferior border pentagon complex 188; (4) a chin pentagon complex 190; (5) a right side chin pentagon complex 192; (6) a left side chin pentagon complex 194; (7) a right eye/cheek pentagon complex 196; (8) a left eye/cheek pentagon complex 198; (9) a right eye brow pentagon complex 200; (10) a left eye brow pentagon complex 202; (11) a right cheek pentagon complex 204; (12) a left cheek pentagon complex 206; (13) a right side nose/mouth pentagon complex 208; and (14) a left side nose/mouth pentagon complex 210. The remaining two complexes have Z values of $(\Phi)^{1/3}$ (See FIG. 23). These pentagon complexes are: (15) a right eye brow/cheek pentagon complex 212; and (16) a left eye brow/cheek pentagon complex 214. Fragments of these sixteen pentagon complexes 184, 186, 188, 190, 192, 194, 196, 198, 200, 202, 204, 206, 208, 210, 212, and 214, define various features of the overlay system 110a of the present invention.

1. Nose/Mouth Complex

The nose/mouth pentagon complex 184 (FIG. 22) is positioned on the matrix complex with V(I) and V(F) of the nose/mouth complex 184 coincident to matrix complex radial V(B) R(234), V(G) and V(J) of the nose/mouth complex 184 coincident to matrix complex radial V(E) R(126), V(G) coincident with intersect matrix complex V(C) R(306) I matrix complex V(D) R(72), and V(I) coincident with intersect matrix complex V(C) R(288) I matrix complex V(D) R(54). Various features of the overlay system 110a are defined by fragments of this pentagon complex 184 comprising: (1) a radial extending between V(G) and V(F); (2) a radial extending between V(I) and V(J); (3) a radial extending from V(G) at 324° and extending to intersect V(G) R(324) I V(F) R(216); (4) a radial extending from V(I) at 36° and extending to intersect V(I) R(36) I V(J) R(144); (5) a radial extending from V(G) at 72° and extending to intersect V(G) R(72) I V(B) R(126); (6) a radial extending from V(I) at 288° and extending to intersect V(I) R(288) I V(E) R(234); (7) a radial extending from V(G) at 126° and extending to intersect V(G) R(126) I V(H) R(72); (8) a radial extending from V(I) at 234° and extending to intersect V(I) R(234) I V(H) R(288); (9) a radial extending from V(G) at 234° and extending to intersect V(G) R(234) I V(C) R(306); (10) a radial extending from V(I) at 126° and extending to intersect V(I) R(126) I V(D) R(54); (11) a line connecting intersect V(G) R(234) I V(C) R(306) and intersect V(I) R(126) I V(D) R(54); (12) a portion of a radial extending from V(I) at 108° and extending between intersect V(I) R(108) I V(G) R(180) and intersect V(I) R(108) I matrix complex V(H) R(18); (13) a portion of a radial extending from V(G) at 252° and extending between intersect V(G) R(252) I V(I) R(180) and V(G) R(252) I matrix complex V(H) R(312); (14) a radial extending from V(G) at 270° and extending to intersect V(G) R(270) I V(H) R(36); (15) a radial extending from V(I) at 90° and extending to intersect V(I) R(90) I V(H) R(324); (16) a portion of a radial extending from matrix complex V(G) at 270° and extending between intersect matrix complex V(G) R(270) I matrix complex V(F) R(216) and intersect matrix complex V(G) R(270) I nose/mouth complex V(I) R(324); and (17) a portion of a radial extending from matrix complex V(G) at 270° and extending between intersect matrix complex V(G) R(270) I matrix complex V(F) R(198) and intersect matrix complex V(G) R(270) I nose/mouth complex V(G) R(36).

Taking into consideration the internal lips pentagon complex 158 (described above), four additional fragments may be described as follows: (18) a radial extending from V(G) of the nose/mouth pentagon complex 184 at 288° and extending to V(F) of the internal lips pentagon complex 158; (19) a radial extending from V(I) of the nose/mouth pentagon complex 184 at 72° and extending to V(J) of the internal lips pentagon complex 158; (20) a radial extending from V(B) of the internal lips pentagon complex 158 at 108° and extending to intersect internal lips pentagon complex 158 V(B) R(108) I nose/mouth pentagon complex 184 V(G) R(270); and (21) a radial extending from V(E) at 252° and extending to intersect internal lips pentagon complex 158 V(E) R(252) I nose/mouth pentagon complex 184 V(I) R(90).

2. Mouth/Chin Complex

The mouth/chin pentagon complex 186 (FIG. 22) is positioned on the matrix complex with V(A) of the mouth/chin complex 186 coincident with intersect matrix complex V(B) R(234) I matrix complex V(E) R(126), V(C) of the mouth/chin complex 186 coincident with intersect matrix complex V(B) R(216) I V(C) R(270), and V(D) of the mouth/chin complex coincident with intersect matrix complex V(E) R(144)I V(D) R(90). Features of the overlay system 110a are defined by fragments of this pentagon complex 186 comprising: (1) a radial connecting V(G) and V(I); (2) a radial extending from V(G) at 36° and extending to intersect V(G) R(36) I V(B) R(126); and (3) a radial extending from V(I) at 324° and extending to intersect V(I) R(324) I V(E) R(234).

3. Chin Inferior Border Complex

The chin inferior border pentagon complex 188 (FIG. 22) is positioned on the matrix pentagon complex with V(A) R(180) of the border complex 188 coincident with V(A) R(180) of the matrix complex and chin complex 188 intersect V(F) R(234) I chin complex 188 V(J) R(126) coincident with intersect matrix complex V(C) R(288) I matrix complex V(D) R(72). Features of the overlay system 110a are defined by fragments of this pentagon complex comprising: (1) a radial connecting V(C) and V(D); (2) a radial extending from V(C) at 54° and extending to intersect V(C) R(54) I V(B) R(126); (3) a radial extending from V(D) at 306° and extending to intersect V(D) R(306) I V(E) R(234); (4) a radial extending from V(C) at 18° and extending to the intersect V(C) R(18) I V(G) R(252); and (5) a radial extending from V(D) at 342° and extending to the intersect V(D) R(342) I V(I) R(108).

4. Chin Complex

The chin pentagon complex 190 (FIG. 22) is positioned on the matrix complex with V(B) of the chin complex 190 coincident with intersect matrix complex V(B) R(216) I matrix complex V(C) R(288), V(E) of the chin complex 190 coincident with intersect matrix complex V(D) R(72) I matrix complex V(E) R(144), and V(A) R(180) of the chin complex coincident with V(A) R(180) of the matrix complex. Features of the frontal repose overlay system 110a are defined by fragments of this pentagon complex 190 comprising: (1) a radial connecting V(B) and V(E); (2) a radial extending from V(B) at 144° and extending to intersect V(B) R(144) I V(G) R(18); (3) a radial extending from V(E) at 216° and extending to intersect V(E) R(216) I V(I) R(342); (4) a radial extending from V(G) at 18° and extending to intersect V(G) R(18) I V(B) R(144); (5) a radial extending from V(I) at 342° and extending to intersect V(I) R(342) I V(E) R(216); (6) a portion of a radial extending from V(A) at 144° and extending between intersect V(A) R(144) I V(B) R(270) and intersect V(A) R(144) I V(B) R(198); (7) a portion of a radial extending from V(A) at 216° and extending between intersect V(A) R(216) I V(E) R(90) and intersect V(A) R(216) I V(E) R(162); (8) a portion of a radial extending from V(B) at 198° and extending between intersect V(B) R(118) I V(G) R(324) and intersect V(B) R(198) I V(G) R(234); (9) a portion of a radial extending from V(E) at 162° and extending between intersect V(E) R(162) I V(I) R(36) and intersect V(E) R(162) I V(I) R(126); (10) a portion of a radial extending from V(G) at 234° and extending between intersect V(G) R(234) I V(C) R(18) and intersect V(G) R(234) I V(C) R(342); (11) a portion of a radial extending from V(I) at 126° and extending between intersect V(I) R(126) I V(D) R(342) and intersect V(I) R(126) I V(D) R(18); (12) a portion of a radial extending from V(C) at 306° and extending between intersect V(C) R(306) I V(D) R(54) and intersect V(C) R(306) I V(D) R(72); and (13) a portion of a radial extending from V(D) at 54° and extending between intersect V(D) R(54) I V(C) R(306) and intersect V(D) R(54) I V(C) R(288).

5. Right Side Chin Complex

The right side chin pentagon complex 192 (FIG. 22) is positioned on the matrix pentagon complex with V(A) of the chin complex 192 coincident with matrix complex intersect matrix complex V(B) R(234) I matrix complex V(C) R(288) and V(B) R(180) of the chin complex 192 coincident with V(A) R(180) of the matrix complex. Features of the overlay system 110a are defined by fragments of this pentagon complex 192 including a portion of a radial extending from V(I) of the matrix pentagon complex at 324° and extending between intersect matrix complex V(I) R(324) I chin complex 192 V(B) R(198) and intersect matrix complex V(I) R(324) I chin complex 192 V(B) R(234).

6. Left Side Chin Complex

The left side chin pentagon complex 194 (FIG. 22) is positioned on the matrix pentagon complex with V(A) of the chin complex 194 coincident with intersect matrix complex V(C) R(306) I matrix complex V(D) R(72) and V(E) R(180) of the chin complex 194 coincident with V(A) R(180) of the matrix complex. Features of the overlay system 110a are defined by fragments of this pentagon complex 194 including a portion of a radial extending from V(I) of the matrix pentagon complex at 36° and extending between intersect matrix complex V(I) R(36) I chin complex V(E) R(126) and intersect matrix complex V(I) R(36) I chin complex 194 V(E) R(162).

7. Right Eye/Cheek Complex

The right eye/cheek pentagon complex 196 (FIG. 22) is positioned on the matrix pentagon complex with V(B) R(108) of the eye/cheek complex 196 coincident to V(E) R(108) of the matrix complex, V(G) R(216) of the eye/cheek complex 196 coincident to V(F) R(216) of the matrix complex, and V(J) R(288) of the eye/cheek complex 196 coincident to V(G) R(288) of the matrix complex. Features of the overlay system 110a are defined by fragments of this pentagon complex 196 comprising: (1) a radial connecting V(B) and V(C); (2) a radial extending from V(B) at 216° and extending to intersect V(B) R(216) I V(C) R(342); (3) a radial extending from V(B) at 234° and extending to intersect eye/cheek complex V(B) R(234) I matrix complex V(I) R(342); (4) a portion of a radial extending from V(B) at 252° and extending between intersect V(B) R(252) I V(I) R(18) and intersect V(B) R(252) I V(I) R(0/360); (5) a portion of a radial extending from V(E) at 108° and extending between intersect V(E) R(108) I V(I) R(0/360) and intersect V(E) R(108) I V(I) R(342); (6) a radial extending from V(E) at 54° and extending to intersect V(E) R(54) I V(J) R(198); (7) a radial connecting V(E) and V(I); (8) a radial connecting V(I) and V(D); (9) a radial connecting V(J) and V(A); (10) a radial extending from V(A) at 126° and extending to intersect V(A) R(126) I V(F) R(162); (11) a portion of a radial extending from V(F) at 162° and extending between intersect V(F) R(162) I V(B) R(306) and intersect V(F) R(162) I V(B) R(270); (12) a portion of a radial extending from V(B) at 270° and extending between intersect V(B) R(270) I V(F) R(162) and intersect V(B) R(270) I V(F) R(180); (13) a portion of a radial extending from V(J) at 144° and extending between intersect V(J) R(114) I V(I) R(36) and intersect eye/cheek complex 196 V(J) R(144) I matrix complex V(I) R(54); and (14) a portion of a radial extending from matrix complex V(I) at 54° and extending between intersect matrix complex V(I) R(54) I eye/cheek complex 196 V(J) R(144) and intersect matrix complex V(I) R(54) I eye/cheek complex 196 V(J) R(126). An additional feature may be described by taking into account the chin button complex 172 described above, this additional feature comprises: (15) a radial extending from eye/cheek complex 196 V(E) at 162° and extending to intersect eye/cheek complex 196 V(E) R(162) I chin button complex 172 V(E) R(306). When considering this complex in conjunction with the nose/mouth pentagon complex described above, additional fragments may be described comprising: (16) a radial extending from nose/mouth complex V(I) at 324° and extending to intersect nose/mouth complex V(I) R(324) I eye/cheek complex V(D).

8. Left Eye/Cheek Complex

The left eye/cheek pentagon complex 198 (FIG. 22) is positioned on the matrix pentagon complex with V(E) R(252) of the eye/cheek complex 198 coincident to V(B) R(252) of the matrix complex, V(I) R(144) of the eye/cheek complex 198 coincident to V(J) R(144) of the matrix complex, and V(F) R(72) of the eye/cheek complex 198 coincident to V(I) R(72) of the matrix complex. Features of the overlay system 110a are defined by fragments of this pentagon complex 198 comprising: (1) a radial connecting V(E) and V(D); (2) a radial extending from V(E) at 144° and extending to intersect V(E) R(144) I V(D) R(18); (3) a radial extending from V(E) at 126° and extending to intersect eye/cheek complex 198 V(E) R(126) I matrix complex V(G) R(18); (4) a portion of a radial extending from V(E) at 108° and extending between intersect V(E) R(108) I V(G) R(342) and intersect V(E) R(108) I V(G) R(0/360); (5) a portion of a radial extending from V(B) at 252° and extending between intersect V(B) R(252) I V(G) R(0/360) and intersect V(B) R(252) I V(G) R(18); (6) a radial extending from V(B) at 306° and extending to intersect V(B) R(306) I V(F) R(162); (7) a radial connecting V(B) and V(G); (8) a radial connecting V(G) and V(C); (9) a radial connecting V(F) and V(A); (10) a radial extending from V(A) at 234° and extending to intersect V(A) R(234) I V(J) R(198); (11) a portion of a radial extending from V(J) at 198° and extending between intersect V(J) R(198) I V(E) R(54) and intersect V(J) R(198)

I V(E) R(90); (12) a portion of a radial extending from V(E) at 90° and extending between intersect V(E) R(90) I V(J) R(198) and intersect V(E) R(90) I V(J) R(180); (13) a portion of a radial extending from V(F) at 216° and extending between intersect V(F) R(216) I V(G) R(324) and intersect eye/cheek complex 198 V(F) R(216) I matrix complex V(G) R(306); and (14) a portion of a radial extending from matrix complex V(G) at 306° and extending between intersect matrix complex V(G) R(306) I eye/cheek complex 198 V(F) R(216) and intersect matrix complex V(G) R(306) I eye/cheek complex 198 V(F) R(234). An additional feature may be described by taking into account the chin button complex 172 described above, this additional feature comprises: (15) a radial extending from eye/cheek complex 198 V(B) at 198° and extending to intersect eye/cheek complex 198 V(B) R(198) I chin button complex 172 V(B) R(54). When considering this complex in conjunction with the nose/mouth pentagon complex described above, additional fragments may be described comprising: (16) a radial extending from nose/mouth complex V(G) at 36° and extending to intersect nose/mouth complex V(G) R(36) I eye/cheek complex V(C).

9. Right Eye Brow Complex

The right eye brow pentagon complex 200 (FIG. 22) is positioned on the matrix pentagon complex with radial V(E) R(108) coincident with matrix complex V(E) R(108) and matrix complex V(F) R(234) intersecting eye brow complex 200 V(A) R(144) I eye brow complex 200 V(B) R(288). Various features of the overlay system 110a are defined by fragments of this pentagon complex 200 comprising: (1) a radial extending from V(G) at 324° and extending to intersect V(G) R(324) I V(B) R(252); (2) a radial extending from V(J) at 234° and extending to intersect V(J) R(234) I matrix complex V(J) R(180); (3) a radial extending from V(J) at 108° and extending to intersect V(J) R(108) I V(F) R(112); (4) a radial connecting intersect matrix complex V(A) R(216) I matrix complex V(J) R(162) and intersect matrix complex V(A) R(198) I matrix complex V(B) R(270); (5) a point at intersect V(E) R(216) I V(I) R(270); and (6) a point at intersect V(I) R(198) I V(D) R(252).

10. Left Eye Brow Complex

The left eye brow pentagon complex 202 (FIG. 22) is positioned on the matrix pentagon complex with radial V(B) R(252) coincident with matrix complex V(B) R(252) and matrix complex V(J) R(126) intersecting eye brow complex 202 V(A) R(216) I eye brow complex 202 V(E) R(72). Various features of the overlay system 110a are defined by fragments of this pentagon complex comprising: (1) a radial extending from V(I) at 36° and extending to intersect V(I) R(36) I V(E) R(108); (2) a radial extending from V(F) at 126° and extending to intersect V(F) R(126) I matrix complex V(F) R(180); (3) a radial extending from V(F) at 252° and extending to intersect V(F) R(252) I V(J) R(198); (4) a radial connecting intersect matrix complex V(A) R(144) I matrix complex V(F) R(198) and intersect matrix complex V(A) R(162) I matrix complex V(E) R(90); (5) a point at intersect V(B) R(144) I V(G) R(90); and (6) a point at intersect V(G) R(162) I V(C) R(108).

11. Right Cheek Complex

The right cheek pentagon complex 204 (FIG. 22) is positioned on the matrix pentagon complex with V(A) of the cheek complex 204 coincident with intersect matrix complex V(A) R(198) I matrix complex V(B) R(252) and V(I) of the cheek complex 204 coincident with intersect matrix complex V(C) R(288) I matrix complex V(D) R(0/360). Features of the overlay system 110a are defined by fragments of this pentagon complex 204 comprising: (1) a radial connecting V(B) and V(C) of the cheek complex 204; (2) a radial connecting V(E) and V(D) of the cheek complex 204; and (3) a radial extending from V(D) at 144° and extending to intersect cheek complex 204 V(D) R(144) I matrix complex V(H) R(306).

12. Left Cheek Complex

The left cheek pentagon complex 206 (FIG. 22) is positioned on the matrix complex with V(A) of the cheek complex 206 coincident with intersect matrix complex V(A) R(162) I matrix complex V(E) R(108) and V(G) of the cheek complex 206 coincident with intersect matrix complex V(D) R(72) I matrix complex V(C) R(0/360). Features of the overlay system 110a are defined by fragments of this pentagon complex 206 comprising: (1) a radial connecting V(D) and V(E) of the cheek complex 206; (2) a radial connecting V(B) and V(C) of the cheek complex 206; and (3) a radial extending from V(C) at 216° and extending to intersect cheek complex 206 V(C) R(216) I matrix complex V(H) R(180).

13. Right Side Nose/Mouth Complex

The right side nose/mouth pentagon complex 208 (FIG. 22) is positioned on the matrix pentagon complex with V(F) of the nose/mouth complex 208 coincident with V(C) R(306) of the matrix complex and nose/mouth complex 208 V(I) R(198) coincident with matrix complex V(A) R(198). Features of the overlay system 110a are defined by fragments of this pentagon complex 208 comprising: (1) a radial extending from V(J) at 144° and extending to intersect V(J) R(144) I V(F) R(198); and (2) a portion of a radial extending from V(C) at 306° and extending between intersect V(C) R(306) I V(A) R(198) and intersect V(C) R(306) I V(I) R(342).

14. Left Side Nose/Mouth Complex

The left side nose/mouth pentagon complex 210 G. 22) is positioned on the matrix pentagon complex with V(J) of the nose/mouth complex 210 coincident with V(D) R(54) of the matrix complex and nose/mouth complex 210 V(G) R(162) coincident with matrix complex V(A) R(162). Features of the overlay system 110a are defined by fragments of this pentagon complex 210 comprising: (1) a radial extending from V(F) at 216° and extending to intersect V(F) R(216) I V(J) R(162); and (2) a portion of a radial extending from V(D) at 54° and extending between intersect V(D) R(54) I V(A) R(162) and intersect V(D) R(54) I V(G) R(18).

15. Right Eye Brow/Cheek Complex

The right eye brow/cheek pentagon complex 212 (FIG. 23) is positioned on the matrix pentagon complex with an 18° clockwise rotation with V(E) of the brow/cheek complex coincident to intersect matrix complex V(E) R(108) I matrix complex V(I) R(36) and brow/cheek complex 212 V(E) R(162) coincident to matrix complex V(D) R(0/360). Features of the overlay system 110a are defined by fragments of this pentagon complex 212 comprising: (1) radials connecting V(H) to V(I), V(I) to V(E), V(E) to V(J), and V(J) to V(F); (2) a radial connecting V(H) to V(D); (3) a radial extending from V(I) at 144° and extending to intersect V(I) R(144) I V(H) R(252); (4) a radial extending from V(E) at 126° and extending to intersect V(E) R(126) I V(A) R(198); (5) a radial extending from V(E) at 108° and extending to intersect V(E) R(108) I V(A) R(198); (6) a radial extending from V(E) at 72° and extending to intersect V(E) R(72) I V(A) R(180); (7) a portion of a radial extending from V(J) at 108° and extending between intersect V(J) R(108) I V(A) R(180) and intersect V(J) R(108) I V(F) R(162); (8) a radial extending from V(E) at 54° and extending to intersect V(E) R(54) I V(J) R(144); and (9) a portion of a radial extending from matrix complex V(E) at 144° and extending between intersect matrix complex V(E) R(144) I matrix complex V(I) R(108) and intersect matrix complex V(E) R(144) I eye brow/cheek complex V(D) R(144). Additional fragments of the complex 212 may be described by taking into account the right eye complex 174 described above. The additional fragments comprise: (10) a portion of a radial extending from V(I) of the brow/cheek complex 212 at 72° and extending between intersect brow/cheek complex 212 V(I) R(72) I brow/cheek complex 212 V(A) R(198) and intersect brow/cheek complex 212 V(I) R(72) I eye complex 174 V(D) R(342); and (11) a radial extending from eye complex V(B) at 288° and extending to intersect eye complex V(B) R(288) I eye brow/cheek complex V(E) R(54).

Furthermore, when considering this complex in conjunction with the right cheek pentagon complex described above, additional fragments may be described comprising: (12) a portion of a radial extending from matrix complex V(J) at 180° and extending between intersect matrix complex V(J) R(180) I eye brow/cheek complex V(D) and intersect matrix complex V(J) R(180) I cheek complex V(E).

16. Left Eye Brow/Cheek Complex

The left eye brow/cheek pentagon complex 214 (FIG. 23) is positioned on the matrix pentagon complex with an 18° clockwise rotation with V(F) of the brow/cheek complex coincident to intersect matrix complex V(A) R(144) I matrix complex V(F) R(180) and brow/cheek complex (F) R(126) coincident to matrix complex V(A) R(144). Features of the overlay system 110a are defined by fragments of this pentagon complex comprising: (1) radials connecting V(C) to V(B), V(B) to V(F), V(F) to V(A), and V(A) to V(E); (2) a radial connecting V(C) to V(G); (3) a radial extending from V(B) at 180° and extending to intersect V(B) R(180) I V(C) R(72); (4) a radial extending from V(C) at 0°/360° and extending to intersect V(C) R(0/360) I V(B) R(252); (5) a radial extending from V(F) at 270° and extending to intersect V(F) R(270) I V(A) R(180); (6) a radial extending from V(F) at 252° and extending to intersect V(F) R(252) I V(A) R(216); (7) a radial extending from V(F) at 216° and extending to intersect V(F) R(216) I V(J) R(126); (8) a radial extending from V(F) at 198° and extending to intersect V(F) R(198) I V(J) R(126); (9) a radial extending from V(I) at 144° and extending to intersect V(I) R(144) I V(H) R(252); (10) a radial extending from V(I) at 126° and extending to intersect V(I) R(126) I V(D) R(54); (11) a radial extending from V(I) at 108° and extending to intersect V(I) R(108) I V(D) R(54); (12) a portion of a radial extending from V(I) at 36° and extending between intersect V(I) R(36) I V(E) R(162) and intersect V(I) R(36) I V(E) R(72); (13) a portion of a radial extending from matrix complex V(B) at 216° and extending between intersect matrix complex V(B) R(216) I matrix complex V(G) R(252) and intersect matrix complex V(B) R(216) I eye brow/cheek complex V(B) R(180). Additional features may be described by taking into account the left eye complex described above. The additional features comprise: (14) a portion of a radial extending from V(I) of the brow/cheek complex at 90° and extending between intersect brow/cheek complex V(I) R(90) I brow/cheek complex V(E) R(126) and intersect brow/cheek complex V(I) R(90) I eye complex V(D) R(54); and (15) a radial extending from eye complex V(E) at 72° and extending to intersect eye complex V(E) R(72) I eye brow/cheek complex V(F) R(270).

Furthermore, when considering this complex in conjunction with the left cheek pentagon complex described above, additional fragments may be described comprising: (16) a portion of a radial extending from matrix complex V(F) at 180° and extending between intersect matrix complex V(F) R(180) I eye brow/cheek complex V(G) and intersect matrix complex V(F) R(180) I cheek complex V(B).

F. Pentagon Complexes with n=2

Only one of the pentagon complexes 112 making up the frontal repose overlay system 110a is of the size n=2 and Z=1 (See FIG. 18). This pentagon complex is a frontal repose smile pentagon complex 220.

1. Repose Smile Complex

The repose smile pentagon complex 220 (FIG. 18) is positioned on the matrix pentagon complex with V(B) of the repose smile complex 220 coincident with matrix pentagon complex intersect matrix complex V(B) R(216) I matrix complex V(C) R(324) and V(E) of the repose smile complex 220 coincident with matrix pentagon complex intersect matrix complex V(E) R(144) I matrix complex V(D) R(36). Fragments of this pentagon complex 220 define features of the frontal repose overlay system 110a comprising: (1) a radial connecting V(J) and V(E); and (2) a radial connecting V(F) and V(B). Additional fragments of this pentagon complex 220 may be used to define a more prominent lower jaw for use in an overlay system 110 to be used for analyzing male facial configurations as mentioned above.

G. Pentagon Complexes with n=1

Only one of the pentagon complexes 112 making up the frontal repose overlay system 110a is of the size n=1 and Z=1 (See FIG. 17). This pentagon complex is an internal facial pentagon complex 222.

1. Internal Facial Complex

The internal facial pentagon complex 222 (FIG. 17) is positioned on the matrix pentagon complex with V(A) R(180) of the internal facial complex 222 coincident with V(A) R(180) of the matrix complex and V(H) of the internal facial complex is coincident with V(H) of the matrix complex. Fragments of this pentagon complex 222 define features of the frontal repose overlay system 110a. All of the features defined by the complex 222 have been defined above in various smaller pentagon complexes.

II. LATERAIL REPOSE OVERLY SYSTEM

A overlay system 110b comprising a lateral view of a face in repose (FIG. 9B) will be described by following the same procedure as used above to describe the frontal repose overlay system 110a: describing the matrix complex 134 first, then the smallest pentagon complexes, and within a particular size of complex describing its position with respect to a matrix pentagon complex 134 and then describing points, lines, and/or areas defined by the complex being described which outline the overlay system 110b. As in the overlay system 110a, there are seven different sizes of pentagon complexes involved in the overlay system 110b comprising a lateral view of a face in repose.

A. Pentagon Complexes with n=0

There is only one pentagon complex of the size n=0 included in the lateral repose overlay system 110b (See FIG. 16). This pentagon complex has a Z value of 1 and is called a lateral matrix pentagon complex 134b (See FIG. 16).

1. Lateral Matrix Complex

Features of the lateral repose overlay system 110b are defined by fragments of the lateral matrix pentagon complex 134b comprising: (1) a portion of a radial extending from V(A) at 234° and extending between intersect V(A) R(234) I V(J) R(90) and intersect V(A) R(234) I V(J) R(126); (2) a line connecting intersect V(A) R(234) I V(J) R(126) and intersect V(J) R(144) I V(A). R(216); (3) a portion of a radial extending from V(A) at 216° and extending between intersect V(A) R(216) I V(J) R(144) and intersect V(A) R(216) I V(J) R(162); (4) a line connecting intersect V(J) R(162) I V(A) R(216) and intersect V(E) R(90) I V(J) R(180); (5) a line connecting intersect V(E) R(90) I V(J) R(180) and intersect V(A) R(216) I V(E) R(126); (6) a line extending from intersect V(E) R(126) I V(A) R(216) at 270° and extending to the intersect of that line and V(E) R(162); (7) a radial extending from V(E) at 162° and extending to intersect V(E) R(162) I V(I) R(108); (8) a portion of a radial extending from V(E) at 144° and extending between intersect V(E) R(144) I V(J) R(198) and intersect V(E) R(144) I V(I) R(108); (9) a portion of a radial extending from V(E) at 126° and extending between intersect V(E) R(126) I V(I) R(36) and intersect V(E) R(126) I V(H) R(342); (10) a portion of a radial extending from V(E) at 108° and extending between intersect V(E) R(108) and the line described in (4) above and intersect V(E) R(108) I V(H) R(342); (11) a portion of a radial extending from V(J) at 162° and extending between intersect V(J) R(162) I V(I) R(54) and intersect V(J) R(162) I V(I) R(90); (12) a portion of a radial extending from V(D) at 36° and extending between intersect V(D) R(36) I V(H) R(324) and intersect V(D) R(36) I V(H) R(342); (13) a portion of a radial extending from V(I) at 126° and extending between intersect V(I) R(126) I V(D) R(342) and intersect V(I) R(116) I V(D) R(54); (14) a radial extending from V(I) at 180° and extending to intersect V(I) R(180) I V(D) R(306); (15) a radial extending from V(D) at 306° and extending to intersect V(D) R(306) I V(I) R(180); (16) a portion of a radial extending from V(F) at 351° and extending between intersect V(F) R(351) I V(B) R(270) and intersect V(F) R(351) I V(F) R(270); (17) a radial extending from V(D) at 288° and extending to intersect V(D) R(288) I V(E) R(166.5); (18) a line extending between intersect V(D) R(288) I V(E) R(166.5) and intersect V(D) R(270) I V(E) R(171); and (19) a line extending between intersect V(D) R(270) I V(E) R(171) and intersect V(G) R(252) I V(E) R(180). Additional fragments of this pentagon complex may be defined if this complex is taken into consideration in conjunction with a nose/mouth pentagon complex which is described below.

B. Pentagon Complexes with n=6

There is only one pentagon complex of the size n=6. It has a Z value of 1 (See FIG. 29). It is a right iris pentagon complex 150b.

1. Lateral Iris Complex

The iris pentagon complex 150b (see FIG. 29) is positioned on the matrix pentagon complex 134b with V(B) R(144) of the iris pentagon complex coincident with V(J) R(144) of the matrix pentagon complex and V(D) of the iris pentagon complex coincident with V(E) R(108) of the matrix pentagon complex. Features of the overlay system 110b are defined by fragments of this pentagon complex comprising: (1) a radial extending from V(J) at 144° and extending to intersect V(J) R(144) I V(A) R(180); and (2) a radial extending from V(D) at 36° and extending to intersect V(D) R(36) I V(A) R(180).

C. Pentagon Complexes with n=5

The overlay system 110b includes two pentagon complexes of the size n=5. Both of these pentagon complexes have Z values of 1 (see FIG. 26). One is a lateral internal lips pentagon complex 158b and the other is a lateral internal naris pentagon complex 160b. These pentagon complexes define various features on the lateral repose overlay system 110b.

1. Lateral Internal Lips Complex

The lateral internal lips pentagon complex 158b (FIG. 26) is positioned on the matrix pentagon complex 134b as is the internal lips complex 158 of the frontal repose overlay system 110a described above. Features of the overlay system 110b are defined by fragments of this pentagon complex 158b comprising: (1) a radial extending from V(J) at 198° and extending to intersect V(J) R(198) I V(E) R(108); (2) a radial extending from V(I) at 324° and extending to intersect V(I) R(324) I V(E) R(252); (3) a radial extending from V(I) at 198° and extending to intersect V(I) R(198) I V(D) R(270); and (4) a portion of a radial extending from V(D) at 270° and extending between intersect V(D) R(270) I V(I) R(198) and intersect V(D) R(270) I V(I) R(234).

A variation on the overlay system 110b is defined by fragments of this pentagon complex 158b comprising: (1) a line extending from intersect V(J) R(0/360) I V(A) R(88) and intersect V(A) R(234) I V(J) R(90); and (2) a line extending between intersect V(A) R(234) I V(J) R(90) and intersect V(A) R(216) I V(E) R(108).

2. Lateral Internal Naris Complex

The lateral internal naris pentagon complex 160b (FIG. 26) is positioned on the matrix pentagon complex 134b as is the internal naris pentagon complex 160 of the frontal repose overlay system 110a described above. Features of the overlay system 110b are defined by fragments of this pentagon complex 160b comprising: (1) a radial extending from V(E) at 54° and extending to intersect V(E) R(54) I V(J) R(90); (2) a radial extending from V(E) at 288° and extending to intersect V(E) R(288) I V(J) R(252); (3) a radial extending from V(B) at 36° and extending to intersect V(B) R(36) I V(F) R(108); (4) a radial extending from V(B) at 252° and extending to intersect V(B) R(252) I V(D) R(0/360); (5) a radial extending from V(D) at 0°/360° and extending to intersect V(D) R(0/360) I V(C) R(270); (6) a radial extending from V(D) at 180° and extending to intersect V(D) R(180) I V(H) R(270); (7) a portion of a radial extending from V(J) at 90° and extending between intersect V(J) R(90) I V(A) R(234) and intersect V(J) R(90) I V(A) R(126); (8) a portion of a radial extending from V(A) at 126° and extending between intersect V(A) R(126) I V(F) R(270) and intersect V(A) (126) I V(F) R(216); and (9) a portion of a radial extending from V(F) at 216° and extending between intersect V(F) R(216) I V(A) R(126) and intersect V(F) R(216) I V(A) R(144).

D. Pentagon Complexes with n=4

The overlay system 110b includes four pentagon complexes of the size n=4. These pentagon complexes have Z values of 1 (FIG. 25) and are: (1) a lateral nasal pentagon complex (2) a lateral chin button pentagon complex 172b; (3) a lateral eye pentagon complex 174b; and (4) a lateral teeth/lip eversion pentagon complex 224b.

1. Lateral Nasal Complex

The lateral nasal pentagon complex 170b (FIG. 25) is positioned on the matrix pentagon complex 170 as is the nasal pentagon complex of the frontal repose overlay system 110a described above. Features of the overlay system 110b are defined by various fragments of this pentagon complex 170b comprising: (1) radials connecting V(G) to V(C) and V(C) to V(H); (2) a radial extending from V(D) at 54° and extending to intersect V(D) R(54) I V(H) R(342); (3) a radial extending from V(D) at 306° and extending to intersect V(D) R(306) I V(I) R(162); (4) a radial extending from V(I) at 162° and extending to intersect V(I) R(162) I V(D) R(306); (5) a radial extending from V(I) at 18° and extending to intersect V(I) R(18) I V(E) R(54); (6) a radial extending from V(I) at 36° and extending to intersect V(I) R(36) I V(E) R(108); (7) a line extending from V(G) and extending to intersect V(A) R(36) I V(F) R(324); (8) a portion of a radial extending from V(E) at 180° and extending between intersect V(E) R(108) I V(I) R(36) and intersect V(E) R(108) I V(I) R(72); (9) a portion of a radial extending from V(J) at 144° and extending between intersect V(J) R(144) I V(B) R(252) and intersect V(J) R(144) I V(B) R(234); (10) a portion of a radial extending from V(H) at 36° and extending between intersect V(H) R(36) I V(C) R(288) and intersect V(H) R(36) I V(C) R(236); (11) a portion of a radial extending from V(C) at 306° and extending between intersect V(C) R(306) I V(H) R(36) and intersect V(C) R(306) I V(H) R(18); (12) a line extending between intersect V(H) R(18) I V(C) R(306) and intersect V(H) R(342) I V(D) R(54); (13) a radial extending from V(G) at 198° and extending to intersect V(G) R(198) I V(C) R(54); and (14) a radial extending from V(C) at 54° and extending to intersect V(C) R(54) I V(G) R(198).

2. Lateral Chin Button Complex

The lateral chin button pentagon complex 172b (FIG. 25) is positioned on the matrix pentagon complex 134b as is the chin button complex 172 of the frontal repose overlay system 110a described above. Features of the overlay system 110b are defined by fragments of this pentagon complex 172b comprising: (1) a portion of a radial extending from V(E) at 342° and extending between intersect V(E) R(342) I V(J) R(288) and intersect V(E) R(342) I V(J) R(234); (2) a portion of a radial extending from V(E) at 216° and extending between intersect V(E) R(216) I V(I) R(324) and intersect V(E) R(216) I V(I) R(270); (3) a portion of a radial extending from V (I) at 270° and extending between intersect V(I) R(270) I V(E) R(216) and intersect V(I) R(270) I V(D) R(288); and (4) a line extending between intersect V(J) R(234) I V(E) R(342) and intersect V(E) R(216) I V(I) R(270).

3. Lateral Eye Complex

The lateral eye pentagon complex 174b (FIG. 25) is positioned on the matrix pentagon complex 134b with V(B) R(180) of the eye complex 174b coincident with V(A) R(180) of the matrix complex 134b and V(C) R(252) of the eye complex 174b coincident with V(B) R(252) of the matrix complex 134b. Features of the overlay system 110b are defined by fragments of this pentagon complex 174b comprising: (1) a radial connecting V(D) to V(I); (2) a radial extending from V(D) at 54° and extending to intersect V(D) R(54) I V(C) R(306); (3) a radial extending from V(I) at 324° and extending to intersect V(I) R(324) I V(E) R(216); (4) a radial extending from V(E) at 216° and extending to intersect V(E) R(216) I V(I) R(324); (5) a radial extending from V(E) at 72° and extending to intersect V(E) R(72) I V(A) R(180); (6) a portion of a radial extending from V(H) at 324° and extending between intersect V(H) R(324) I V(B) R(234) and intersect V(H) R(324) I V(I) R(36); (7) a portion of a radial extending from V(E) at 90° and extending between intersect V(E) R(90) I V(J) R(162) and intersect V(E) R(90) I V(J) R(144); (8) a portion of a radial extending from V(E) at 90° and extending between intersect V(E) R(90) I V(A) R(180) and intersect V(E) R(90) I V(A) R(162); (9) a portion of a radial extending from V(J) at 144° and extending between intersect V(J) R(144) I V(F) R(234)

and intersect V(J) R(144) I V(F) R(216); (10) a portion of a radial extending from V(F) at 216° and extending between intersect V(F) R(216) I V(A) R(180) and intersect V(F) R(216) I V(A) R(162); and (11) a portion of a radial extending from matrix complex V(G) at 288° and extending between intersect matrix complex V(G) R(288) I eye complex V(H) R(18) and intersect matrix complex V(G) R(288) I eye complex V(H) R(0/360).

4. Lateral Teeth/Lip Eversion Complex

The lateral teeth/lip eversion pentagon complex 224b (FIG. 25) is positioned on the matrix pentagon complex 134b with V(A) R(180) of the eversion complex 224b coincident with V(A) R(180) of the matrix complex 134b and V(G) R(252) of the eversion complex 224b coincident with V(G) R(252) of the matrix complex 134b. A variation of features of the overlay system 110b are defined by fragments of this pentagon complex 224b comprising: (1) a portion of a radial extending from V(A) at 198° and extending between intersect V(A) R(198) I V(E) R(126) and intersect V(A) R(198) I V(E) R(90); (2) a portion of a radial extending from V(E) at 90° and extending between intersect V(E) R(90) I V(J) R(162) and intersect V(E) R(90) I V(J) R(144); and (3) a portion of a radial extending from V(J) at 144° and extending between intersect V(J) R(144) I V(F) R(252) and intersect V(J) R(144) I V(F) R(234).

E. Pentagon Complexes with n=3

Nine pentagon complexes of the size n=3 are included in the lateral repose overlay system 110b (See FIG. 22). These nine pentagon complexes have Z values of 1 and include: (1) a lateral nose/mouth pentagon complex 184b; (2) a lateral mouth/chin pentagon complex 186b; (3) a lateral chin inferior border pentagon complex 188b; (4) a lateral chin pentagon complex 190b; (5) a lateral side chin pentagon complex 192b; (6) a lateral side nose/mouth pentagon complex 208b; (7) a lateral eye/cheek pentagon complex 196b; (8) a lateral eyebrow pentagon complex 200b; and (9) a lateral internal ear pentagon complex 226b.

1. Lateral Nose/Mouth Complex

The lateral nose/mouth pentagon complex 184b (FIG. 22) is positioned on the matrix pentagon complex 134b as is the nose/mouth pentagon complex 184 of the frontal repose overlay system 110a described above. Features of the overlay system 110b are defined by fragments of this pentagon complex 184b comprising: (1) a radial connecting V(J) and V(I); (2) a radial extending from V(I) at 36° and extending to intersect V(I) R(36) I V(J) R(108); (3) a radial extending from V(I) at 126° and extending to intersect V(I) R(126) I V(D) R(0/360); (4) a portion of a radial extending from V(E) at 144° and extending between intersect V(E) R(144) I V(I) R(90) and intersect V(E) R(144) I V(I) R(108); (5) a line extending from intersect V(D) R(36) I V(H) R(324) and intersect V(D) R(54) I V(H) R(306); (6) a radial extending from V(J) at 180° and extending to intersect V(J) R(180) I V(E) R(54); (7) a line extending between intersect V(A) R(234) I V(E) R(54) and intersect V(A) R(216) I V(E) R(72); (8) a portion of a radial extending along V(A) at 198° and extending between intersect V(A) R(198) I V(I) R(54) and intersect V(A) R(198) I V(E) R(90); (9) a line extending from intersect V(A) R(198) I V(E) R(90) and intersect V(J) R(126) I V(A) R(180); (10) a line extending from intersect V(A) R(180) I V(J) R(126) and intersect V(A) R(144) I V(J) R(108); (11) a line extending from intersect V(J) R(108) I V(A) R(144) and V(A) R(126) I V(F) R(198); (12) a radial extending from V(F) at 198° and extending to intersect V(F) R(198) I V(A) R(126); (13) a radial extending from V(F) at 336° and extending to intersect V(F) R(336) I V(J) R(18); and (14) a portion of a radial extending from V(J) at 18° and extending between intersect V(J) R(18) I V(F) R(336) and intersect nose/mouth complex V(J) R(18) I matrix complex V(B) R(270). When considering this complex in conjunction with the matrix pentagon complex described above, additional fragments may be described comprising: (15) a portion of a radial extending from matrix complex V(F) at 270° and extending between intersect matrix complex V(F) R(270) I nose/mouth complex V(F) R(351) and intersect matrix complex V(F) R(270) I matrix complex V(A) R(234).

2. Lateral Mouth/Chin Complex

The lateral mouth/chin pentagon complex 186*b* (FIG. 22) is positioned on the matrix pentagon complex 134*b* as is the mouth/chin pentagon complex 186 of the frontal repose overlay system 110*a* described above. Features of the lateral repose overlay system 110*b* are defined by fragments of this pentagon complex 186*b* comprising: (1) a radial extending from V(E) at 234° and extending to intersect V(E) R(234) I V(I) R(306); (2) a radial extending from V(E) at 198° and extending to intersect V(E) R(198) I V(I) R(324); (3) a radial extending from V(E) at 126° and extending to intersect V(E) R(126) I V(J) R(180); (4) a radial extending from V(E) at 90° and extending to intersect V(E) R(90) I V(J) R(144) and (5) a radial extending from V(E) at 72° and extending to intersect V(E) R(72) I V(J) R(126).

3. Lateral Chin Inferior Border Complex

The lateral chin inferior border pentagon 188*b* (FIG. 22) complex is positioned on the matrix pentagon complex 134*b* as is the chin inferior border pentagon 188 of the frontal repose overlay system 110*a* described above. Features of the lateral repose overlay system 110*b* are defined by fragments of this pentagon complex 188*b* comprising: (1) a portion of a radial extending from V(J) at 144° and extending between intersect V(J) R(144) I V(A) R(234) and intersect V(J) R(144) I V(A) R(216); (2) a portion of a radial extending from V(J) at 180° and extending between intersect V(J) R(180) I V(E) R(72) and intersect V(J) R(180) I V(E) R(90); and (3) a portion of a radial extending from V(E) at 90° and extending between intersect V(E) R(90) I V(J) R(180) and intersect V(E) R(90) I V(J) R(162).

4. Lateral Chin Complex

The lateral chin pentagon complex 190*b* (FIG. 22) is positioned on the matrix pentagon complex 134*b* as is the chin pentagon complex 190 of the frontal repose overlay system 110*a* described above. Features of the lateral repose overlay system 110*b* are defined by fragments of this pentagon complex 190*b* comprising: (1) a point at intersect V(J) R(198) I V(E) R(90); (2) a point at intersect V(E) R(144) I V(I) R(54); (3) a point at intersect V(I) R(180) I V(D) R(306); and (4) a point at intersect V(I) R(216) I V(D) R(288).

5. Lateral Side Chin Complex

The lateral side chin pentagon complex 192*b* (FIG. 22) is positioned on the matrix pentagon complex 134*b* as is the side chin pentagon complex 192 of the frontal repose overlay system 110*a* described above. Features of the lateral repose overlay system 110*b* are defined by fragments of this pentagon complex 192*b* comprising: (1) a radial extending from V(I) at 288° and extending to intersect V(I) R(288) I V(E) R(234); (2) a radial extending from V(I) at 180° and extending to intersect V(I) R(108) I V(D) R(36); (3) a radial extending from V(A) at 72° and extending to intersect V(A) R(72) I V(B) R(342); (4) a radial extending from V(A) at 90° and extending to intersect V(A) R(90) I V(F) R(0/360); (5) a radial extending from V(A) at 126° and extending to intersect V(A) R(126) I V(F) R(252); (6) a radial extending from V(A) at 198° and extending to intersect V(A) R(198) I V(F) R(252); (7) a radial extending from V(A) at 234° and extending to intersect V(A) R(234) I V(J) R(144); (8) a radial extending from V(F) at 324° and extending to intersect V(F) R(324) I V(A) R(90); and (9) a radial extending from V(F) at 198° and extending to intersect V(F) R(198) I V(A) R(126). Variations of these features are defined by fragments comprising: (10) a radial extending from V(A) at 72° and extending to intersect V(A) R(72) I V(F) R(18); and (11) a radial extending from V(A) at 90° and extending to intersect V(A) R(90) I V(F) R(18). When considering this complex in conjunction with the internal lips pentagon complex described above, additional fragments may be described comprising: (12) a portion of a radial extending from V(F) at 225° and extending between intersect V(F) R(225) I V(C) R(342) and intersect V(F) R(225) I internal lips complex V(C) R(270), 6. Lateral Side Nose/Mouth Complex The lateral side nose/mouth pentagon complex 208*b* (FIG. 22) is positioned on the matrix pentagon complex 134*b* as is the side nose/mouth complex 208 of the frontal repose overlay system 110*a* described above. Features of the lateral repose overlay system 110*b* are defined by fragments of this pentagon complex 208*b* comprising: (1) a radial extending from V(F) at 180° and extending to intersect V(F) R(180) I V(A) R(126); (2) a radial extending from V(F) at 198° and extending to intersect V(F) R(198) I V(G) R(270); (3) a radial extending from V(G) at 270° and extending to intersect V(G) R(270) I V(F) R(198); (4) a radial extending from V(B) at 72° and extending to intersect V(B) R(72) I V(F) R(126); and (5) a radial extending from V(C) at 0°/360° and extending to intersect V(C) R(0/360) I V(G) R(234), 7. Lateral Eye/Cheek Complex The lateral eye/cheek pentagon complex 196*b* (FIG. 22) is positioned on the matrix pentagon complex 134*b* with V(I) of the eye/cheek pentagon complex 196*b* coincident with intersect matrix complex 134*b* V(A) R(198) I matrix complex 134*b* V(C) R(306) and V(F) R(180) of the eye/cheek pentagon complex 196*b* coincident with matrix complex 134*b* V(A) R(180). Features of the overlay system 110*b* are defined by fragments of this pentagon complex 196*b* comprising: (1) a radial extending from V(H) at 18° and extending to intersect V(H) R(18) I V(C) R(306); (2) a radial extending from V(F) at 18° and extending to intersect V(F) R(18) I V(B) R(342); (3) a radial extending from V(A) at 90° and extending to intersect V(A) R(90) I V(F) R(324); (4) a radial extending from V(A) at 270° and extending to intersect V(A) R(270) I V(J) R(306); (5) a radial extending from V(A) to V(J); (6) a portion of a radial extending from V(F) at 270° and extending between intersect V(F) R(270) I V(A) R(162) and intersect V(F) R(270) I V(A) R(234); (7) a portion of a radial extending from V(A) at 234° and extending between intersect V(A) R(234) I V(J) R(90) and intersect V(A) R(234) I matrix complex V(E) R(108); (8) a portion of a radial extending from matrix complex V(E) at 180° and extending between intersect matrix complex V(E) R(108) I eye/cheek complex V(A) R(234) and intersect matrix complex V(E) R(108) I eye/check complex V(G) R(306); (9) a portion of a radial extending from V(J) at 144° and extending between intersect V(J) R(144) I V(A) R(234) and intersect V(J) R(144) I V(F) R(234); (10) a portion of a radial extending from V(F) at 234° and extending between intersect V(F) R(234) I V(J) R(126) and intersect V(F) R(234) I V(J) R(162); and (11) a portion of a radial extending from V(A) at 180° and extending between intersect V(A) R(180) I V(J) R(126) and intersect V(A) R(180) I V(J) R(144).

8. Lateral Eye Brow Complex

The lateral eye brow pentagon complex 200b is positioned on the matrix pentagon complex 134b with V(F) R(180) of the eye brow complex 200b coincident with V(A) R(180) of the matrix complex 134b and intersect eye brow complex 200b V(C) R(0/360) I eye brow complex 200b V(D) R(72) coincident with intersect matrix complex 134b V(D) R(36) I matrix complex 134b V(E) R(108). Features of the overlay system 110b are defined by fragments of this pentagon complex 200b comprising: (1) radials connecting V(F) to V(A) and V(A) to V(J); (2) a radial extending from V(F) at 162° and extending to intersect V(F) R(162) I V(A) R(126); (3) a radial extending from V(H) at 0°/360° and extending to intersect V(H) R(0/360) I V(G) R(270); (4) a portion of a radial extending along V(H) at 324° and extending between intersect V(H) R(324) I V(I) R(108) and intersect V(H) R(324) I V(I) R(36); (5) a portion of a radial extending along V (I) at 36° and extending between intersect V(I) R(36) I V(E) R(144) and intersect V(I) R(36) I V(E) R(108); (6) a portion of a radial extending along V(I) at 54° and extending between intersect V(I) R(54) I V(D) R(0/360) and intersect V(I) R(54) I V(D) R(18); (7) a portion of a radial extending along V(A) at 144° and extending between intersect V(A) R(144) I V(F) R(180) and intersect V(A) R(144) I V(F) R(252); (8) a portion of a radial extending along V(F) at 252° and extending between intersect V(F) R(252) I V(A) R(144) and intersect V(F) R(252) I V(J) R(198); (9) a portion of a radial extending along V(A) at 126° and extending between intersect V(A) R(126) I V(F) R(162) and intersect V(A) R(126) I V(F) R(270); (10) a portion of a radial extending along V(F) at 270° and extending between intersect V(F) R(270) I V(A) R(126) and intersect V(F) R(270) I V(A) R(198); (11) a portion of a line extending from intersect V(A) R(180) I V(F) R(234) at 270° and extending between the intersect of this line and V(E) R(72) and the intersect of this line and V(J) R(216); (12) a portion of a radial extending from V(E) at 60° and extending between intersect V(E) R(60) I V(A) R(198) and intersect V(E) R(60) and the line described in (11) above; and (13) a portion of a radial extending from V(J) at 216° and extending to the line described in (11) above.

9. Lateral Internal Ear Complex

The lateral internal ear pentagon complex 226b is positioned on the matrix pentagon complex 134b with V(A) of the ear complex 226b coincident with V(E) of the matrix complex 134b and V(A) R(180) of the ear complex 226b coincident with V(E) R(180) of the matrix complex 134b. Features of the lateral repose overlay system 110b are defined by fragments of this pentagon complex 226b comprising: (1) radials connecting V(J) to V(E), V(E) to V(I), and V(I) to V(D); (2) a radial extending from V(D) at 180° and extending to intersect ear complex V(D) R(108) I matrix complex V(I) R(342); (3) a radial extending from V(H) at 0°/360° and extending to intersect V(H) R(0/360) I V(C) R(288); (4) a radial extending from V(H) at 180° and extending to intersect V(H) R(180) I V(C) R(234); (5) a radial extending from V(A) at 306° and extending to intersect V(A) R(306) I V(J) R(18); (6) a radial extending from V(A) at 180° and extending to intersect V(A) R(180) I V(J) R(126); (7) a portion of a radial extending from V(F) at 234° and extending between intersect V(F) R(234) I V(J) R(126) and intersect V(F) R(234) I V(J) R(180); (8) a portion of a radial extending from V(J) at 180° and extending between intersect V(J) R(180) I V(I) R(54) and intersect V(J) R(180) I V(I) R(36); (9) a portion of a radial extending from V(I) at 36° and extending between intersect V(I) R(36) I V(E) R(108) and intersect V(I) R(36) I V(E) R(72); (10) a radial extending from V(E) at 72° and extending to intersect V(E) R(72) I V(A) R(216); (11) a portion of a radial extending from V(J) at 198° and extending between intersect V(J) R(198) I V(E) R(72) and intersect V(J) R(198) I V(E) R(162); (12) a portion of a radial extending from V(E) at 162° and extending between intersect V(E) R(162) I V(I) R(18) and intersect V(E) R(162) I V(I) R(90); (13) a portion of a radial extending from V(I) at 90° and extending between intersect V(I) R(90) I V(E) R(162) and intersect V(I) R(90) I V(E) R(144); (14) a portion of a radial extending from V(E) at 144° and extending between intersect V(E) R(144) I V(I) R(90) and intersect V(E) R(144) I V(I) R(108); (15) a portion of a radial extending from V(I) at 180° and extending between intersect V(I) R(108) I V(H) R(324) and intersect V(I) R(108) I V(H) R(342); (16) a portion of a radial extending from V(H) at 342° and extending between intersect V(H) R(342) I V(I) R(108) and intersect V(H) R(342) I V(I) R(90); (17) a portion of a radial extending from V(D) at 36° and extending between intersect V(D) R(36) I V(J) R(162) and intersect V(D) R(36) I V(J) R(144); (18) a portion of a radial extending from V(G) at 288° and extending between intersect V(G) R(288) I V(J) R(144) and intersect V(G) R(288) I V(J) R(162); (19) a portion of a radial extending from V(C) at 324° and extending between intersect V(C) R(324) I V(F) R(216) and intersect V(C) R(324) I V(F) R(234); and (20) a portion of a radial extending from V(A) at 180° and between intersect V(A) R(180) I V(G) R(270) and intersect V(A) R(180) I V(G) R(297),

F. Pentagon Complexes with n=2

There are two pentagon complexes of the size n=2 (See FIG. 18) included in the lateral repose overlay system 110b. These pentagon complexes have Z values of 1 and are: (1) a lateral smile pentagon complex 220b; and (2) a lateral ear pentagon complex 228b.

1. Lateral Smile Complex

The lateral smile pentagon complex 220b (FIG. 18) is positioned on the matrix pentagon complex 134b as is the smile pentagon complex 220 of the frontal repose overlay system 110a described above. Features of the lateral repose overlay system are defined by fragments of this pentagon complex 220b comprising: (1) a radial extending from matrix complex V(D) at 180° and extending to intersect matrix complex V(D) R(108) I smile complex V(I) R(162); (2) a portion of a radial extending from V(A) at 216° and extending between intersect V(A) R(216) I V(J) R(108) and intersect V(A) R(216) I V(J) R(180); (3) a portion of a radial extending from V(F) at 252° and extending between intersect V(F) R(252) I V(A) R(144) and intersect V(F) R(252) I V(A) R(180); (4) a point at intersect V(A) R(198) I V(E) R(126); and (5) a point at intersect V(D) R(36) I V(H) R(306).

2. Lateral Ear Complex

The lateral ear pentagon complex 228b is positioned on the matrix pentagon complex 134b with V(H) of the ear complex 228b coincident with V(I) of the matrix complex 134b and V(H) R(0/360) of the ear complex 228b coincident with V(I) R(0/360) of the matrix complex 134b. Features of the lateral repose overlay system 110b are defined by fragments of this pentagon complex 228b comprising: (1) a portion of a radial extending from matrix complex V(D) at 342° and extending between intersect matrix complex V(D) R(342) I ear complex V(E) R(108) intersect matrix complex V(D) R(342) I ear complex V(E) R(72); (2) a portion of a radial extending from matrix complex V(C) at 306° and extending between intersect matrix complex V(C) R(306) I ear complex V(A) R(180) intersect matrix complex V(C) R(306) I ear complex V(A) R(234); (3) a radial extending from V(J) at 90° and extending to intersect V(J) R(90) I V(A) R(234); (4) a radial connecting V(J) and V(E); (5) a radial extending from V(J) at 234° and extending to intersect V(J) R(234) I V(E) R(18); (6) a radial extending from V(E) at 18° and extending to intersect V(E) R(18) I V(J) R(234); (7) a radial extending from V(E) at 162° and extending to intersect V(E) R(162) I V(I) R(126); (8) a portion of a radial extending from V(I) at 126° and extending between intersect V(I) R(126) I V(D) R(342) and intersect V(I) R(126) I V(D) R(90); (9) a portion of a radial extending from V(D) at 90° and extending between intersect V(D) R(90) I V(H) R(306) and intersect V(D) R(90) I V(H) R(0/360); (10) a portion of a radial extending from V(I) at 180° and extending between intersect V(I) R(108) I V(H) R(324) and intersect V(I) R(108) I V(H) R(342); (11) a portion of a radial extending from V(H) at 324° and extending between intersect V(H) R(324) I V(D) R(36) and intersect V(H) R(324) I V(D) R(0/360); (12) a portion of a radial extending from V(D) at 0°/360° and extending between intersect V(D) R(0/360) I V(I) R(72) and intersect V(D) R(0/360) I V(I) R(36); (13) a portion of a radial extending from V(I) at 36° and extending between intersect V(I) R(36) I V(J) R(180) and intersect V(I) R(36) I V(J) R(144); (14) a portion of a radial extending from V(E) at 72° and extending between intersect V(E) R(72) I V(J) R(144) and intersect V(E) R(72) I V(J) R(126); (15) a portion of a radial extending from V(A) at 198° and extending between intersect V(A) R(198) I V(J) R(126) and intersect V(A) R(198) I V(J) R(144); (16) a portion of a radial extending from V(J) at 126° and extending between intersect V(J) R(126) I V(A) R(198) and intersect V(J) R(126) I V(A) R(234); (17) a portion of a radial extending from V(A) at 234° and extending between intersect V(A) R(234) I V(J) R(126) and intersect V(A) R(234) I V(J) R(198); and (18) a portion of a radial extending from V(J) at 198° and extending between intersect V(J) R(198) I V(E) R(54) and intersect V(J) R(198) I V(E) R(162).

III. FRONTAL SMILING OVERLAY SYSTEM

A overlay system 110c comprising a frontal view of a face in a smiling configuration (FIG. 10A) will be described by following the same procedure as used above to describe overlay system 110a and overlay system 110b. As in the overlay systems 110a and 110b, there are seven different sizes of pentagon complexes 112 involved in the overlay system 110c comprising a frontal view of a face in a smiling configuration. Several features of the face in a smiling configuration are identical to those features of the face in a repose configuration. Thus, several of the features which make up the overlay system 110c have been described above and will not be re-described here.

A. Pentagon Complexes with n=0

The frontal smiling overlay system 110c includes only one pentagon complex of the size n=0. This pentagon complex has a Z value of 1 and is called a frontal smiling matrix pentagon complex 134c (See FIG. 16).

1. Frontal Smiling Matrix Complex

Features of the frontal smiling overlay system 110c are defined by fragments of the frontal smiling matrix pentagon complex 134c (See FIG. 16) comprising: (1) a portion of a radial extending from V(F) at 180° and extending between intersect V(F) R(180) I V(A) R(126) and intersect V(F) R(180) I V(G) R(288); (2) a portion of a radial extending from V(J) at 180° and extending between intersect V(J) R(180) I V(A) R(234) and intersect V(J) R(180) I V(I) R(72); (3) a portion of a radial extending from V(A) at 126° and extending between intersect V(A) R(126) I V(F) R(180) and intersect V(A) R(126) I V(F) R(270); (4) a portion of a radial extending from V(A) at 234° and extending between intersect V(A) R(234) I V(J) R(180) and intersect V(A) R(234) I V(J) R(90); (5) a portion of a radial extending from V(F) at 198° and extending between intersect V(F) R(198) I V(A) R(126) and intersect V(F) R(198) I V(A) R(144); (6) a portion of a radial extending from V(J) at 162° and extending between intersect V(J) R(162) I V(A) R(234) and intersect V(J) R(162) I V(A) R(216); (7) a portion of a radial extending from V(A) at 144° and extending between intersect V(A) R(144) I V(F) R(198) and intersect V(A) R(144) I V(F) R(180); (8) a portion of a radial extending from V(A) at 216° and extending between intersect V(A) R(216) I V(J) R(162) and intersect V(A) R(216) I V(J) R(180); (9) a portion of a radial extending from V(F) at 252° and extending between intersect V(F) R(252) I V(A) R(126) and intersect V(F) R(252) I V(A) R(180); (10) a portion of a radial extending from V(J) at 180° and extending between intersect V(J) R(108) I V(A) R(234) and intersect V(J) R(108) I V(A) R(180); and (11) a portion of a radial extending from V(F) at 270° and extending between intersect V(F) R(270) I V(A) R(126) and intersect V(F) R(270) I V(A) R(234).

B. Pentagon Complexes with n=6

The pentagon complexes 150c with n=6 (See FIG. 29) comprising the overlay system 110c are identical to and describe features identical to the iris pentagon complexes 150 described above in connection with overlay system 110a and the features described thereby. These pentagon complexes 150 will not be re-described here.

C. Pentagon Complexes with n=5

There are five pentagon complexes of size n=5 in the frontal smiling overlay system 110c. Three of these pentagon complexes have Z values of 1 (FIG. 26), one has a Z value of Φ/2 (FIG. 27), and one has a Z value of 2/Φ (FIG. 28). The pentagon complexes with Z=1 are: (1) a smiling nasal tip complex (2) a smiling internal lips complex 158c; and (3) a smiling internal naris complex 160c. The complex with Z=Φ/2 is a smiling inner nasal tip halo complex 162c and the complex with Z=2/Φ is a smiling outer nasal tip halo complex 164c. Fragments of these five pentagon complexes define features of the frontal smiling overlay system 110c.

1. Smiling Nasal Tip Complex

The smiling nasal tip complex 156c (FIG. 26) is in the same position on the matrix complex 134c as is the nasal tip complex 156 of the frontal repose overlay system 110a described above. Features of the frontal smiling overlay system 110c are defined by fragments of this pentagon complex 156c comprising: (1) radials connecting V(F) to V(G), V(G) to V(H), V(H) to V(I), and V(I) to V(J); (2) a radial extending from V(F) at 0°/360° and extending to intersect nasal tip complex V(F) R(0/360) I matrix complex V(F) R(216); (3) a radial extending from V(J) at 0°/360° and extending to intersect nasal tip complex V(J) R(0/360) I matrix complex V(J) R(144); (4) a radial extending from V(G) at 252° and extending to intersect V(G) R(252) I V(A) R(180); (5) a radial extending from V(I) at 180° and extending to intersect V(I) R(108) I V(A) R(180); (6) a radial extending from V(G) at 72° and extending to intersect nasal tip complex V(G) R(72) I matrix complex V(B)

R(234); and (7) a radial extending from V(I) at 288° and extending to intersect nasal tip complex V(I) R(288) I matrix complex V(E) R(126).

2. Smiling Internal Lips Complex

The smiling internal lips complex 158c (FIG. 26) is in the same position on the matrix complex 134c as is the internal lips complex 158 of the frontal repose overlay system 110a described above, Features of the frontal smiling overlay system 110c are defined by fragments of this pentagon complex 158c comprising: (1) a radial extending from V(A) at 180° and extending to intersect V(A) R(180) I V(B) R(252); (2) a radial extending from intersect V(A) R(198) I V(J) R(162) to intersect V(A) R(162) I V(F) R(198); (3) a radial extending from V(B) at 198° and extending to intersect V(B) R(198) I V(G) R(342); (4) a radial extending from V(B) at 0°/360° and extending to intersect V(B) R(0/360) I V(A) R(108); (5) a radial extending from V(E) at 162° and extending to intersect V(E) R(162) I V(I) R(18); (6) a radial extending from V(E) at 0°/360° and extending to intersect V(E) R(0/360) I V(A) R(252); (7) a radial extending from intersect V(A) R(90) I V(G) R(18) through V(A) and to intersect V(A) R(270) I V(I) R(342); (8) a radial extending from intersect V(H) R(90) I V(C) R(234) through V(H) and to intersect V(H) R(270) I V(D) R(126); (9) a portion of a radial extending from the center point of the complex at 270° and extending between radial V(B) R(198) and radial V(E) R(162); (10) a radial extending from V(A) at 180° and extending to the center point of the complex; (11) a radial extending from V(B) at 198° and extending to intersect V(B) R(198) I V(G) R(342); (12) a radial extending from V(E) at 162° and extending to intersect V(E) R(162) I V(I) R(18); (13) a radial extending from V(B) at 0°/360° and extending to intersect V(B) R(0/360) I V(F) R(90); and (14) a radial extending from V(E) at 0°/360° and extending to intersect V(E) R(0/360) I V(J) R(270).

3. Smiling Internal Naris Complex

The smiling internal naris complex 160c (FIG. 26) is positioned on the matrix complex 134c as is the internal naris complex 160 of the frontal repose overlay system 110a described above. Features of the frontal smiling overlay system 110c are defined by fragments of this pentagon complex 160c comprising: (1) a radial extending from V(C) to V(H) and from V(H) to V(D); (2) a radial extending from V(H) at 180° and extending to intersect V(H) R(180) I V(C) R(216); (3) a portion of a radial extending from V(G) at 180° and extending between intersect V(G) R(180) I V(C) R(126) and intersect V(G) R(180) I V(C) R(162); (4) a portion of a radial extending from V(I) at 180° and extending between intersect V(I) R(180) I V(D) R(234) and intersect V(I) R(180) I V(D) R(198); (5) a radial extending from V(G) at 252° and extending to intersect V(G) R(252) I V(A) R(180): (6) a radial extending from V(I) at 180° and extending to intersect V(I) R(108) I V(A) R(180); (7) a radial extending from V(F) at 234° and extending to intersect V(F) R(234) I V(A) R(180): (8) a radial extending from V(J) at 126° and extending to intersect V(J) R(126) I V(A) R(180); (9) a portion of a radial extending along V(F) at 180° and extending between intersect V(F) R(108) I V(G) R(0/360) and intersect V(F) R(108) I V(G) R(36); (10) a portion of a radial extending along V(J) at 252° and extending between intersect V(J) R(252) I V(I) R(0/360) and intersect V(J) R(252) I V(I) R(324); (11) a portion of a radial extending from V(C) at 36° and extending between intersect V(C) R(36) I V(F) R(108) and intersect V(C) R(36) I V(F) R(72); and (12) a portion of a radial extending from V(D) at 324° and extending between intersect V(D) R(324) I V(J) R(252) and intersect V(D) R(324) I V(J) R(288).

4. Smiling Inner Nasal Tip Halo Complex

The smiling inner nasal tip halo complex 162c (FIG. 27) is positioned on the matrix complex 134c as is the inner nasal tip halo complex 162 of the frontal repose overlay system 110a described above. Features of the frontal smiling overlay system 110c are defined by fragments of this pentagon complex 162c comprising radials connecting V(B) to V(G), V(G) to V(H), V(H) to V(I), and V(I) to V(E).

5. Smiling Outer Nasal Tip Halo Complex

The smiling outer nasal tip halo complex 164c (FIG. 28) is positioned on the matrix complex 134c as is the outer nasal tip halo complex 164 of the frontal repose overlay system 110a described above. Features of the frontal smiling overlay system 110c are defined by fragments of this pentagon complex 164c comprising: (1) radials connecting V(F) to V(G), and V(I) to V(J); (2) a radial extending from V(F) at 0°/360° and extending to intersect nasal tip halo complex V(F) R(0/360) I matrix complex V(B) R(252); (3) a radial extending from V(J) at 0°/360° and extending to intersect nasal tip halo complex V(J) R(0/360) I matrix complex V(E) R(108); (4) a radial extending from V(G) at 234° and extending to intersect V(G) R(234) I matrix complex V(G) R(270); and (5) a radial extending from V(I) at 126° and extending to intersect V(I) R(126) I matrix complex (I) R(90).

D. Pentagon Complexes with n=4

There are five pentagon complexes of size n=4 (see FIG. 25) in the frontal smiling overlay system 110c. All five of these pentagon complexes have Z values of 1 and are: (1) a smiling nasal complex 170c; (2) a chin button complex 172c; (3) a smiling right eye complex 174c; (4) a smiling left eye complex 176c; and (5) a smiling teeth/lip eversion complex 224c. Fragments of these five pentagon complexes define various features of the frontal smiling overlay system 110c.

1. Smiling Nasal Complex

The smiling nasal complex 170c (FIG. 25) is positioned on the matrix complex 134c as is the nasal complex 170 of the frontal repose overlay system 110a described above. Features of the frontal smiling overlay system 110c are defined by fragments of this pentagon complex 170c comprising: (1) a radial extending from V(B) at 144° and extending to intersect V(B) R(144) I V(G) R(54); (2) a radial extending from V(E) at 216° and extending to intersect V(E) R(216) I V(I) R(306); (3) a radial extending from V(B) at 288° and extending to intersect V(B) R(288) I V(F) R(162); (4) a radial extending from V(E) at 72° and extending to intersect V(E) R(72) I V(J) R(198); (5) a line extending between intersect V(B) R(288) I V(F) R(162) and intersect V(B) R(270) I V(F) R(180); and (6) a line extending between intersect V(E) R(72) I V(J) R(198) and intersect V(E) R(90) I V(J) R(180).

2. Smiling Chin Button Complex

The smiling chin button complex 172c (FIG. 25) is positioned on the matrix complex 134c as is the chin button complex 172 of the frontal repose overlay system 110a described above. Features of the frontal smiling overlay system 110c are defined by fragments of this pentagon complex 172c comprising: (1) a radial connecting V(G) and V(I); (2) a radial connecting V(B) and V(E); (3) a radial extending from V(G) at 54° and extending to intersect V(G) R(54) I V(B) R(72); (4) a radial extending from V(I) at 306° and extending to intersect V(I) R(306) I V(E) R(288); (5) a radial extending from V(B) at 18° and extending to intersect V(B) R(18) I V(F) R(36); and (6) a radial extending from V(E) at 342° and extending to intersect V(E) R(342) I V(J) R(324).

3. Smiling Right Eye Complex

The smiling right eye complex 174c (FIG. 25) is positioned on the matrix complex 134c as is the right eye complex 174 of the frontal repose overlay system 110a described above. In addition, the fragments of the smiling right eye complex 174c which define features of the overlay system 110c are identical to the fragments of the right eye complex 174 which define features of the overlay system 110a described above.

4. Smiling Left Eye Complex

The smiling left eye complex 176c (FIG. 25) is positioned on the matrix complex 134c as is the left eye complex 176 of the frontal repose overlay system 110a described above. In addition, the fragments of the smiling left eye complex 176c which define features of the overlay system 110c are identical to the fragments of the left eye complex 176 which define features of the overlay system 110a described above.

5. Smiling Teeth/Lip Eversion Complex

The smiling teeth/lip eversion pentagon complex 224c (FIG. 25) is positioned on the matrix pentagon complex 134c with V(A) of the eversion complex 224c coincident with intersect matrix complex 134c V(B) R(234) I matrix complex 134c V(E) R(126) and V(G) of the eversion complex 224c coincident with intersect matrix complex 134 V(D) R(72) I matrix complex 134c V(F) R(198). Features of the overlay system 110c are defined by fragments of this pentagon complex 224c comprising: (1) a radial connecting V(B) and V(E); (2) a radial extending from V(F) at 252° and extending to intersect V(F) R(252) I V(A) R(180); (3) a radial extending from V(J) at 180° and extending to intersect V(J) R(108) I V(A) R(180); (4) a radial extending from V(C) at 54° and extending to intersect V(C) R(54) I V(G) R(72); (5) a radial extending from V(D) at 306° and extending to intersect V(D) R(306) I V(I) R(288); (6) a portion of a radial extending from V(G) at 270° and extending between intersect V(G) R(270) I V(B) R(198) and intersect V(G) R(270) I V(E) R(162); (7) a portion of a radial extending from V(A) at 144° and extending between intersect V(A) R(144) I V(B) R(270) and intersect V(A) R(144) I V(B) R(252); (8) a portion of a radial extending from V(A) at 216° and extending between intersect V(A) R(216) I V(E) R(90) and intersect V(A) R(216) I V(E) R(108); (9) a portion of a radial extending from V(F) at 180° and extending between intersect V(F) R(180) I V(B) R(252) and intersect V(F) R(180) I V(J) R(126); (10) a portion of a radial extending from V(J) at 180° and extending between intersect V(J) R(180) I V(E) R(108) and intersect V(J) R(180) I V(F) R(234); and (11) a radial between V(C) and V(D).

Two additional features of the overlay system 110c are defined by parallel fragments of this pentagon complex 224c comprising: (12) two fragments that are parallel to the fragments described in (2) and (3) above and that extend between intersect V(B) R(270) I V(F) R(216) and intersect V(E) R(90) I V(J) R(144); and (13) two fragments that are parallel to the fragments described in (2) and (3) above and that extend between intersect V(F) R(198) I V(G) R(306) and intersect V(J) R(162) I V(I) R(54).

There are three additional fragments of the eversion pentagon complex 224c which define features of the overlay system 110c, however, a smiling nose/mouth complex 184c must also be considered to fully describe these additional fragments. The smiling nose/mouth complex 184c is described below and, therefore, these additional fragments of the eversion pentagon complex 224c will also be described below.

E. Pentagon Complexes with n=3

There are sixteen pentagon complexes of size n=3 in the frontal smiling overlay system 110c. Fourteen of these pentagon complexes have Z values of 1 (see FIG. 22) and two have Z values of $(\Phi)^{1/3}$. (See FIG. 22) The pentagon complexes with Z=1 include: (1) a smiling nose/mouth complex 184c; (2) a smiling mouth/chin complex 186c; (3) a smiling chin inferior border complex 188c; (4) a smiling chin complex 190c; (5) a smiling right side chin complex 192c; (6) a smiling left side chin complex 194c; (7) a smiling right eye/cheek complex 196c; (8) a smiling left eye/cheek complex 198c; (9) a smiling right eye brow complex 200c; (10) a smiling left eye brow complex 202c; (11) a smiling right cheek complex 204c; (12) a smiling left cheek complex 206c; (13) a smiling right nose/mouth complex 208c; and (14) a smiling left nose/mouth complex 210c. The two complexes with $Z=(\Phi)^{1/3}$ include: (15) a smiling right eye brow/cheek complex 212c; and (16) a smiling left eye brow/cheek complex 214c. Fragments of these sixteen pentagon complexes define various features of the frontal smiling overlay system 110c of the present invention.

1. Smiling Nose/Mouth Complex

The smiling nose/mouth complex 184c (FIG. 22) of the frontal smiling overlay system 110c is positioned on the matrix complex 134c as is the nose/mouth complex 184 of the frontal repose overlay system 110a described above. Features of the frontal smiling overlay system 110c are defined by fragments of this pentagon complex 184c comprising: (1) a radial connecting V(B) and V(E); (2) a portion of a radial extending from V(A) at 180° and extending between intersect V(A) R(180) I V(B) R(252) and intersect V(A) R(180) I V(B) R(234); (3) a portion of a radial extending from V(F) at 180° and extending between intersect V(F) R(180) I V(G) R(288) and intersect V(F) R(180) I V(G) R(306); (4) a portion of a radial extending from V(J) at 180° and extending between intersect V(J) R(180) I V(I) R(54) and intersect V(J) R(180) I V(I) R(72); (5) a portion of a radial extending from V(H) at 36° and extending between intersect V(H) R(36) I V(G) R(270) and intersect V(H) R(36) I V(G) R(288); (6) a portion of a radial extending from V(H) at 324° and extending between intersect V(H) R(324) I V(I) R(90) and intersect V(H) R(324) I V(I) R(72); (7) a portion of a radial extending from V(F) at 162° and extending between intersect V(F) R(162) I V(B) R(198) and intersect V(F) R(162) I V(B) R(216); (8) a portion of a radial extending from V(J) at 198° and extending between intersect V(J) R(198) I V(E) R(162) and intersect V(J) R(198) I V(E) R(144); (9) a portion of a radial extending from V(B) at 198° and extending between intersect V(B) R(198) I V(G) R(342) and intersect V(B) R(198) I V(G) R(306); (10) a portion of a radial extending from V(E) at 162° and extending between intersect V(E) R(162) I V(I) R(18) and intersect V(E) R(162) I V(I) R(54); (11) a line connecting intersect V(B) R(198) I V(G) R(342) and intersect V(E) R(162) I V(I) R(18); (12) a line connecting intersect V(B) R(216) I V(G) R(342) and intersect V(B) R(252) I V(G) R(288); (13) a line connecting intersect V(E) R(144) I V(I) R(18) and intersect V(E) R(108) I V(I) R(72); (14) a radial extending from V(C) and extending to intersect V(B) R(216) I V(G) R(324); (15) a portion of the radial described in (14) above extending between its intersect with V(G) R(288) and its intersect with V(G) R(324); (16) a radial extending from V(D) and extending to intersect V(E) R(144) I V(I) R(36); (17) a portion of the radial described in (16) above extending between its intersect with V(I) R(72) and its intersect with V(I) R(36); (18) a portion of a radial extending from V(G) at 288° and extending between intersect V(G) R(288) I V(F) R(180) and intersect V(G) R(288) and the radial described in (14) above; (19) a portion of a radial extending from V(I) at 72° and extending between intersect V(I) R(72) I V(J) R(180) and intersect V(I) R(72) and the radial described in (16) above; (20) a portion of a radial extending from V(G) at 306° and extending between intersect V(G) R(306) I V(B) R(198) and intersect V(G) R(306) and the radial described in (14) above; and (21) a portion of a radial extending from V(I) at 54° and extending between intersect V(I) R(54) I V(E) R(162) and intersect V(I) R(54) and the radial described in (16) above.

When considering this complex 184c in conjunction with the internal lips pentagon complex 158c described above, additional fragments may be described comprising: (22) a portion of a radial extending from V(G) at 270° and extending between intersect V(G) R(270) I V(B) R(216) and intersect V(G) R(270) I internal lips complex V(B) R(198); and (23) a portion of a radial extending from V(I) at 90° and extending between intersect V(I) R(90) I V(E) R(144) and intersect V(I) R(90) I internal lips complex V(E) R(162).

2. Smiling Mouth/Chin Complex

The smiling mouth/chin complex 186c (FIG. 22) of the frontal smiling overlay system 110c is positioned on the matrix complex 134c as is the mouth/chin complex 186c of the frontal repose overlay system 110a described above. Features of the frontal smiling overlay system 110c are defined by fragments of this pentagon complex 186c comprising: (1) radials connecting V(B) to V(C), V(C) to V(D), and V(D) to V(E); (2) a radial extending from V(B) at 234° and extending to intersect V(B) R(234) I V(A) R(162); and (3) a radial extending from V(E) at 126° and extending to intersect V(E) R(126) I V(A) R(198).

3. Smiling Chin Inferior Border Complex

The smiling chin inferior border complex 188c (FIG. 22) of the frontal smiling overlay system 110c is positioned on the matrix complex 134c as is the chin inferior border complex 188 of the frontal repose overlay system 110a described above. Features of the frontal smiling overlay system 110c are defined by fragments of this pentagon complex 188c comprising: (1) a radial connecting V(C) to V(D); (2) a radial extending from V(C) at 54° and extending to intersect V(C) R(54) I V(B) R(126); (3) a radial extending from V(D) at 306° and extending to intersect V(D) R(306) I V(E) R(234); and (4) a line extending between intersect V(B) R(234) I V(G) R(324) and intersect V(E) R(126) I V(I) R(36).

4. Smiling Chin Complex

The smiling chin complex 190c (FIG. 22) of the frontal smiling overlay system 110c is positioned on the matrix complex 134c as is the chin complex 190 of the frontal repose overlay system 110a described above. Features of the frontal smiling overlay system 110c are defined by fragments of this pentagon complex 190c comprising: (1) a radial extending from V(G) at 234° and extending to intersect V(G) R(234) I V(C) R(0/360); and (2) a radial extending from V(I) at 126° and extending to intersect V(I) R(126) I V(C) R(0/360).

5. Smiling Right Side Chin Complex

The smiling right side chin complex 192c of the frontal smiling overlay system 110c is positioned on the matrix complex 134c as is the right side chin complex 192 of the frontal repose overlay system 110a described above. Features of the frontal smiling overlay system 110c are defined by fragments of this pentagon complex 192c comprising: (1) a radial extending from V(A) at 126° and extending to intersect V(A) R(126) I V(F) R(180); and (2) a radial extending from V(A) at 162° and extending to intersect V(A) R(162) I V(B) R(234).

6. Smiling Left Side Chin Complex

The smiling left side chin complex 194c (FIG. 22) of the frontal smiling overlay system 110c is positioned on the matrix complex 134c as is the left side chin complex 196 of the frontal repose overlay system 110a described above. Features of the frontal smiling overlay system 110c are defined by fragments of this pentagon complex 196c comprising: (1) a radial extending from V(A) at 234° and extending to intersect V(A) R(234) I V(J) R(180); and (2) a radial extending from V(A) at 198° and extending to intersect V(A) R(198) I V(E) R(126).

7. Smiling Right Eye/Cheek Complex

The smiling right eye/cheek complex of the frontal smiling overlay system 110c is positioned on the matrix complex as is the right eye/cheek complex of the frontal repose overlay system described above. Features of the frontal smiling overlay system 110c are defined by fragments of this pentagon complex comprising: (1) radials connecting V(B) to V(C), V(C) to V(H), V(H) to V(D), V(D) to V(I), and V(I) to V(E); (2) radials connecting V(J) to V(A) and V(A) to V(F); (3) a radial connecting V(D) to V(E); (4) a radial extending from V(E) at 54° and extending to intersect V(E) R(54) I V(J) R(198); (5) a radial extending from V(B) at 216° and extending to intersect V(B) R(216) I V(C) R(0/360); (6) a radial extending from V(B) at 234° and extending to intersect V(B) R(234) I V(C) R(342); (7) a radial extending from V(C) at 0°/360° and extending to intersect V(C) R(0/360) I V(B) R(216); (8) a radial extending from V(C) at 342° and extending to intersect V(C) R(342) I V(B) R(234); (9) a portion of a radial extending from V(B) at 252° and extending between intersect V(B) R(252) I V(F) R(198) and intersect V(B) R(252) I V(A) R(180); (10) a portion of a radial extending from V(E) at 180° and extending between intersect V(E) R(108) I V(J) R(162) and intersect V(E) R(108) I V(A) R(180); (11) a portion of a radial extending from V(B) at 270° and extending between intersect V(B) R(270) I V(F) R(180) and intersect V(B) R(270) I V(F) R(162); (12) a portion of a radial extending from V(F) at 162° and extending between intersect V(F) R(162) I V(B) R(270) and intersect V(F) R(162) I V(B) R(306); (13) a portion of a radial extending from V(B) at 306° and extending between intersect V(B) R(306) I V(F) R(162) and intersect V(B) R(306) I V(F) R(270); (14) a portion of a radial extending from V(F) at 270° and extending between intersect V(F) R(270) I V(B) R(306) and intersect V(F) R(270) I V(A) R(234); (15) a portion of a radial extending from V(A) at 234° and extending between intersect V(A) R(234) I V(F) R(270) and intersect V(A) R(234) I V(J) R(144); (16) a portion of a radial extending from V(F) at 180° and extending between intersect V(F) R(180) I V(B) R(306) and intersect V(F) R(180) I V(B) R(288); (17) a portion of a radial extending from V(J) at 144° and extending between intersect V(J) R(144) I V(F) R(252) and intersect eye/cheek complex V(J) R(144) I matrix complex V(F) R(234); (18) a portion of a radial extending from matrix complex V(F) at 234° and extending between intersect matrix complex V(F) R(234) I eye/cheek complex V(J) R(144) and intersect matrix complex V(F) R(234) I eye/cheek complex V(J) R(126); and (19) a radial extending from V(C) at 162° and extending to intersect V(C) R(162) I matrix complex V(G) R(270).

8. Smiling Left Eye/Cheek Complex

The smiling left eye/cheek complex 198c (FIG. 22) of the frontal smiling overlay system 110c is positioned on the matrix complex 134c as is the left eye/cheek complex 198 of the frontal repose overlay system 110a described above.

Features of the frontal smiling overlay system 110c are defined by fragments of this pentagon complex 198c comprising: (1) radials connecting V(B) to V(G), V(G) to V(C), V(C) to V(H), V(H) to V(D), and V(D) to V(E); (2) radials connecting V(J) to V(A) and V(A) to V(F); (3) a radial connecting V(B) to V(C); (4) a radial extending from V(B) at 306° and extending to intersect V(B) R(306) I V(F) R(162); (5) a radial extending from V(E) at 144° and extending to intersect V(E) R(144) I V(D) R(0/360); (6) a radial extending from V(D) at 0°/360° and extending to intersect V(D) R(0/360) I V(E) R(144); (7) a radial extending from V(E) at 126° and extending to intersect V(E) R(126) I V(D) R(18); (8) a radial extending from V(D) at 18° and extending to intersect V(D) R(18) I V(E) R(126); (9) a portion of a radial extending from V(E) at 180° and extending between intersect V(E) R(108) I V(J) R(162) and intersect V(E) R(108) I V(A) R(180); (10) a portion of a radial extending from V(B) at 252° and extending between intersect V(B) R(252) I V(F) R(198) and intersect V(B) R(252) I V(A) R(180); (11) a portion of a radial extending from V(B) at 306° and extending between intersect V(B) R(306) I V(F) R(216) and intersect V(B) R(306) I V(F) R(270); (12) a portion of a radial extending from V(F) at 270° and extending between intersect V(F) R(270) I V(A) R(126) and intersect V(F) R(270) I V(A) R(234); (13) a portion of a radial extending from V(A) at 234° and extending between intersect V(A) R(234) I V(J) R(90) and intersect V(A) R(234) I V(J) R(198); (14) a portion of a radial extending from V(J) at 198° and extending between intersect V(J) R(198) I V(E) R(54) and intersect V(J) R(198) I V(E) R(90); (15) a portion of a radial extending from V(E) at 90° and extending between intersect V(E) R(90) I V(J) R(198) and intersect V(E) R(90) I V(J) R(180); (16) a portion of a radial extending from V(J) at 180° and extending between intersect V(J) R(180) I V(E) R(54) and intersect V(J) R(180) I V(E) R(72); (17) a portion of a radial extending from V(F) at 216° and extending between intersect V(F) R(216) I V(J) R(108) and intersect eye/cheek complex V(F) R(216) I matrix complex V(J) R(126); (18) a portion of a radial extending from matrix complex V(J) at 126° and extending between intersect matrix complex V(J) R(126) I eye/cheek complex V(F) R(216) and intersect matrix complex V(J) R(126) I eye/cheek complex V(F) R(234); and (19) a radial extending from V(D) at 198° and extending to intersect V(D) R(198) I matrix complex V(I) R(90).

9. Smiling Right Eye Brow Complex

The smiling right eye brow complex 200c (FIG. 22) of the frontal smiling overlay system 110c is positioned on the matrix complex 134c as is the right eye brow complex 200 of the frontal repose overlay system 110a described above. Features of the frontal smiling overlay system 110c are defined by fragments of this pentagon complex 200c comprising: (1) a radial connecting V(G) to V(C); (2) a radial extending from V(G) at 198° and extending to intersect V(G) R(198) I V(C) R(180); (3) a radial extending from V(G) at 234° and extending to intersect V(G) R(234) I V(C) R(288); (4) a radial extending from V(C) at 180° and extending to intersect V(C) R(180) I V(G) R(198); (5) a radial extending from V(I) at 162° and extending to intersect V(I) R(162) I V(H) R(234); (6) a radial extending from V(I) at 180° and extending to intersect V(I) R(180) I V(D) R(252); (7) a radial extending from V(I) at 54° and extending to intersect V(I) R(54) I V(E) R(144); (8) a radial extending from V(J) at 234° and extending to intersect V(J) R(234) I V(E) R(288); (9) a radial extending from V(J) at 180° and extending to intersect V(J) R(108) I V(F) R(162); (10) a radial extending from eye brow complex V(A) at 180° and extending to intersect eye brow complex V(A) R(108) I matrix complex V(A) R(198); (11) a radial extending from eye brow complex V(A) at 288° and extending to intersect eye brow complex V(A) R(288) I matrix complex V(A) R(216); (12) a portion of a radial extending from V(G) at 306° and extending between intersect V(G) R(306) I V(A) R(162) and intersect V(G) R(306) I V(B) R(216); (13) a portion of a radial extending from V(G) at 270° and extending between intersect V(G) R(270) I V(C) R(18) and intersect V(G) R(270) I V(C) R(0/360); (14) a portion of a radial extending from V(G) at 252° and extending between intersect V(G) R(252) I V(H) R(36) and intersect V(G) R(252) I V(H) R(0/360); (15) a portion of a radial extending from V(I) at 180° and extending between intersect V(I) R(108) I V(H) R(324) and intersect V(I) R(108) I V(H) R(0/360); and (16) a portion of a radial extending from V(I) at 54° and extending between intersect V(I) R(54) I V(E) R(126) and intersect V(I) R(54) I V(A) R(19S).

10. Smiling Left Eye Brow Complex

The smiling left eye brow complex 202c (FIG. 22) of the frontal smiling overlay system 110c is positioned on the matrix complex 134c as is the left eye brow complex 202 of the frontal repose overlay system 110a described above. Features of the frontal smiling overlay system 110c are defined by different fragments of this pentagon complex 202c comprising: (1) a radial connecting V(I) to V(D); (2) a radial extending from V(I) at 162° and extending to intersect V(I) R(162) I V(D) R(180); (3) a radial extending from V(I) at 126° and extending to intersect V(I) R(126) I V(D) R(72); (4) a radial extending from V(D) at 180° and extending to intersect V(D) R(180) I V(I) R(162); (5) a radial extending from V(G) at 198° and extending to intersect V(G) R(198) I V(H) R(126); (6) a radial extending from V(G) at 180° and extending to intersect V(G) R(180) I V(C) R(108); (7) a radial extending from V(G) at 306° and extending to intersect V(G) R(306) I V(B) R(216); (8) a radial extending from V(F) at 126° and extending to intersect V(F) R(126) I V(B) R(72); (9) a radial extending from V(F) at 252° and extending to intersect V(F) R(252) I V(J) R(198); (10) a radial extending from eye brow complex V(A) at 252° and extending to intersect eye brow complex V(A) R(252) I matrix complex V(A) R(162); (11) a radial extending from eye brow complex V(A) at 72° and extending to intersect eye brow complex V(A) R(72) I matrix complex V(A) R(144); (12) a portion of a radial extending from V(I) at 54° and extending between intersect V(I) R(54) I V(A) R(198) and intersect V(I) R(54) I V(E) R(144); (13) a portion of a radial extending from V(I) at 90° and extending between intersect V(I) R(90) I V(D) R(342) and intersect V(I) R(90) I V(D) R(0/360); (14) a portion of a radial extending from V(I) at 180° and extending between intersect V(I) R(108) I V(H) R(324) and intersect V(I) R(108) I V(H) R(0/360); (15) a portion of a radial extending from V(G) at 252° and extending between intersect V(G) R(252) I V(H) R(36) and intersect V(G) R(252) I V(H) R(0/360); and (16) a portion of a radial extending from V(G) at 306° and extending between intersect V(G) R(306) I V(B) R(234) and intersect V(G) R(306) I V(A) R(162).

11. Smiling Right Cheek Complex

The smiling right cheek complex 204c (FIG. 22) of the frontal smiling overlay system 110c is positioned on the matrix complex 134c as is the right cheek complex 204 of the frontal repose overlay system 110a described above. Features of the frontal smiling overlay system 110c are defined by fragments of this pentagon complex 204c comprising: (1) a radial connecting V(D) to V(E); (2) a radial extending from V(D) at 144° and extending to intersect V(D) R(144) I V(H) R(180); (3) a radial extending from V(C) at 324° and extending to intersect V(C) R(324) I V(G) R(270); (4) a radial extending from V(G) at 270° and extending to intersect V(G) R(270) I V(C) R(324); and (5) a point at intersect V(A) R(198) I V(B) R(252).

12. Smiling Left Cheek Complex

The smiling left cheek complex 206c (FIG. 22) of the frontal smiling overlay system 110a is positioned on the matrix complex 134c as is the left cheek complex 206 of the frontal repose overlay system 110a described above. Features of the frontal smiling overlay system 110c are defined by fragments of this pentagon complex 206c comprising: (1) a radial connecting V(B) to V(C); (2) a radial extending from V(C) at 216° and extending to intersect V(C) R(216) I V(H) R(180); (3) a radial extending from V(D) at 36° and extending to intersect V(D) R(36) I V(I) R(90); (4) a radial extending from V(I) at 90° and extending to intersect V(I) R(90) I V(D) R(36); and (5) a point at intersect V(A) R(162) I V(E) R(108).

13. Smiling Right Nose/Mouth Complex

The smiling right nose/mouth complex 208 (FIG. 22) of the frontal smiling overlay system 110c is in the same position on the matrix complex 134c as is the right nose/mouth complex 208 of the frontal repose overlay system 110a described above. Features of the frontal smiling overlay system 110c are defined by fragments of this pentagon complex 208c comprising: (1) a radial connecting V(D) to V(I); (2) a radial extending from V(D) at 144° and extending to intersect V(D) R(144) I V(H) R(234); (3) a radial extending from V(I) at 342° and extending to intersect V(I) R(342) I V(J) R(270); (4) a radial extending from V(H) at 162° and extending to intersect V(H) R(162) I V(D) R(126); (5) a radial extending from V(H) at 342° and extending to intersect V(H) R(342) I V(E) R(90); (6) a radial extending from V(F) at 126° and extending to intersect V(F) R(126) I V(B) R(72); (7) a portion of a radial extending from nose/mouth complex V(C) at 324° and extending between intersect nose/mouth complex V(C) R(324) I nose/mouth complex V(D) R(54) and intersect nose/mouth complex V(C) R(324) I matrix complex V(D) R(36); (8) a portion of a radial extending from V(C) at 342° and extending between intersect V(C) R(342) I V(G) R(288) and intersect V(C) R(342) I V(F) R(198); (9) a portion of a radial extending from V(F) at 198° and extending between intersect V(F) R(198) I V(G) R(306) and intersect V(F) R(198) I V(C) R(342); (10) a portion of a radial extending from V(C) at 0°/360° and extending between intersect V(C) R(0/360) I V(G) R(288) and intersect V(C) R(0/360) I V(G) R(306); and (11) a portion of a radial extending from V(B) at 198° and extending between intersect V(B) R(198) I V(G) R(342) and intersect V(B) R(198) I V(G) R(324).

14. Smiling Left Nose/Mouth Complex

The smiling left nose/mouth complex 210c (FIG. 22) of the frontal smiling overlay system 110c is positioned on the matrix complex 134c as is the left nose/mouth complex 210 of the frontal repose overlay system 110a described above. Features of the frontal smiling overlay system 110c are defined by fragments of this pentagon complex 210c comprising: (1) a radial connecting V(C) to V(G); (2) a radial extending from V(C) at 216° and extending to intersect V(C) R(216) I V(H) R(126); (3) a radial extending from V(G) at 18° and extending to intersect V(G) R(18) I V(F) R(90); (4) a radial extending from V(H) at 198° and extending to intersect V(H) R(198) I V(C) R(234); (5) a radial extending from V(H) at 18° and extending to intersect V(H) R(18) I V(B) R(270); (6) a radial extending from V(J) at 234° and extending to intersect V(J) R(234) I V(E) R(288); (7) a portion of a radial extending from nose/mouth complex V(D) at 36° and extending between intersect nose/mouth complex V(D) R(36) I nose/mouth complex V(C) R(306) and intersect nose/mouth V(D) R(36) I matrix complex V(C) R(324); (8) a portion of a radial extending from V(D) at 18° and extending between intersect V(D) R(18) I V(I) R(72) and intersect V(D) R(18) I V(J) R(162); (9) a portion of a radial extending from V(J) at 162° and extending between intersect V(J) R(162) I V(I) R(54) and intersect V(J) R(162) I V(D) R(18); (10) a portion of a radial extending from V(D) at 0°/360° and extending between intersect V(D) R(0/360) I V(I) R(72) and intersect V(D) R(0/360) I V(I) R(54); and (11) a portion of a radial extending from V(E) at 162° and extending between intersect V(E) R(162) I V(I) R(18) and intersect V(E) R(162) I V(I) R(36).

15. Smiling Right Eye Brow/Cheek Complex

The smiling right eye brow/cheek complex 212c (FIG. 23) of the frontal smiling overlay system 110c is positioned on the matrix complex 134c as is the right eye brow/cheek complex 212 of the frontal repose overlay system 110a described above. Features of the frontal smiling overlay system 110c are defined by fragments of this pentagon complex 212c comprising: (1) radials connecting V(H) to V(D), V(D) to V(I), V(I) to V(E), V(E) to V(J), and V(J) to V(F); (2) a radial connecting V(B) to V(G); (3) a radial extending from V(B) at 216° and extending to intersect V(B) R(216) I V(G) R(288); (4) a radial extending from V(B) at 198° and extending to intersect V(B) R(198) I V(G) R(324); (5) a radial extending from V(G) at 180° and extending to intersect V(G) R(180) I V(C) R(72); (6) a radial extending from V(H) at 306° and extending to intersect V(H) R(306) I V(D) R(18); (7) a radial extending from V(H) at 324° and extending to intersect V(H) R(324) I V(D) R(0/360); (8) a radial extending from eye brow/cheek complex V(D) at 144° and extending to intersect eye brow/cheek complex V(D) R(144) I matrix complex V(E) R(144); (9) a radial extending from V(E) at 126° and extending to intersect V(E) R(126) I V(I) R(72); (10) a radial extending from V(E) at 180° and extending to intersect V(E) R(108) I V(A) R(198); (11) a radial extending from V(E) at 72° and extending to intersect V(E) R(72) I V(A) R(180); (12) a radial extending from V(E) at 54° and extending to intersect V(E) R(54) I V(J) R(144); (13) a portion of a radial extending from V(B) at 234° and extending between intersect V(B) R(234) I V(J) R(126) and intersect V(B) R(234) I matrix complex V(J) R(162); (14) a portion of a radial extending from V(J) at 180° and extending between intersect V(J) R(108) I V(F) R(252) and intersect V(J) R(108) I V(F) R(162); and (15) a portion of a radial extending from V(B) at 252° and extending between intersect V(B) R(252) I V(E) R(117) and intersect V(B) R(252) I V(E) R(126).

16. Smiling Left Eye Brow/Cheek Complex

The smiling left eye brow/cheek complex 214c (FIG. 23) of the frontal smiling overlay system 110c is positioned on the matrix complex 134c as is the left eye brow/cheek complex 214 of the frontal repose overlay system 110a described above. Features of the frontal smiling overlay system 110c are defined by fragments of this pentagon complex 144c comprising: (1) radials connecting V(C) to V(G), V(G) to V(B), V(B) to V(F), V(F) to V(A), and V(A) to V(E); (2) a radial connecting V(D) to V(I); (3) a radial extending from V(D) at 144° and extending to intersect V(D) R(144) I V(H) R(252); (4) a radial extending from V(I) at 126° and extending to intersect V(I) R(126) I V(D) R(18); (5) a radial extending from V(I) at 180° and extending to intersect V(I) R(108) I V(D) R(36); (6) a radial extending from V(G) at 180° and extending to intersect V(G) R(180) I V(C) R(72); (7) a radial extending from V(C) at 18° and extending to intersect V(C) R(18) I V(G) R(270); (8) a radial extending from V(C) at 0°/360° and extending to intersect V(C) R(0/360) I V(B) R(252); (9) a radial extending from V(F) at 198° and extending to intersect V(F) R(198) I V(B) R(252); (10) a radial extending from V(F) at 216° and extending to intersect V(F) R(216) I V(G) R(306); (11) a radial extending from V(F) at 252° and extending to intersect V(F) R(252) I V(J) R(144); (12) a radial extending from V(F) at 270° and extending to intersect V(F) R(270) I V(A) R(198); (13) a portion of a radial extending from V(I) at 90° and extending between intersect V(I) R(90) I V(A) R(198) and intersect V(I) R(90) I V(E) R(126); (14) a portion of a radial extending from V(A) at 216° and extending between intersect V(A) R(216) I V(E) R(72) and intersect V(A) R(216) I V(E) R(162); and (15) a portion of a radial extending from V(B) at 252° and extending between intersect V(B) R(252) I V(F) R(207) and intersect V(B) R(252) I V(F) R(207).

E. Pentagon Complexes with n=2

There are four pentagon complexes of size n=2 in the frontal smiling overlay system 110c. One of these pentagon complexes has a Z value of 1 (see FIG. 18) and is a smiling smile pentagon complex 220c, one has a Z value of $(2/\Phi) \times (\Phi^{1/3})$ (see FIG. 21) and is a smiling external dimple pentagon complex 230c, one has a Z value of $2/\Phi$ (FIG. 20) and is a smiling dimple pentagon complex 232c, and the last one has a Z value of $\Phi/2$ (FIG. 19) and is a smiling internal smile pentagon complex 234c. Fragments of these four complexes define various features of the frontal smiling overlay system 110c of the present invention.

1. Smiling smile complex

The smiling smile pentagon complex 220c (FIG. 18) is positioned on the matrix pentagon complex 134c with V(A) R(180) of the smile complex 220c coincident with V(A) R(180) of the matrix complex 134c and V(F) R(234) of the smile complex coincident with V(B) R(234) of the matrix complex 134c. Features of the frontal smiling overlay system 110c are defined by fragments of this complex 220c comprising: (1) radials connecting V(D) to V(E), V(E) to V(J), V(J) to V(A), V(A) to V(F), V(F) to V(B), and V(B) to V(C); (2) a radial connecting V(B) to intersect V(C) R(288) I V(H) R(54); (3) a radial connecting V(E) to intersect V(D) R(72) I V(H) R(306); (4) a radial extending from V(B) at 72° and extending to intersect V(B) R(72) I V(G) R(18); (5) a radial extending from V(E) at 288° and extending to intersect V(E) R(288) I V(I) R(342); (6) a radial extending from V(B) at 306° and extending to intersect V(B) R(306) I V(F) R(180); (7) a radial extending from V(E) at 54° and extending to intersect V(E) R(54) I V(J) R(180); and (8) a portion of a radial extending from V(B) at 270° and extending between intersect V(B) R(270) I V(F) R(162) and intersect V(B) R(270) I V(J) R(198).

2. Smiling External Dimple Complex

The smiling external dimple pentagon complex 230c (FIG. 21) is positioned on the matrix pentagon complex 134c with V(H) of the dimple complex 230c coincident with V(H) of the matrix complex 134c and V(A) R(180) of the dimple complex 230c coincident with V(A) R(180) of the matrix complex 134c. Features of the frontal smiling overlay system 110c are defined by fragments of this complex 230c comprising: (1) a radial extending from V(B) at 198° and extending to intersect dimple complex V(B) R(198) I matrix complex V(G) R(252); (2) a radial extending from V(B) at 216° and extending to intersect V(B) R(216) I V(F) R(162); (3) a radial extending from V(E) at 162° and extending to intersect dimple complex V(E) R(162) I matrix complex V(I) R(108); (4) a radial extending from V(E) at 144° and extending to intersect V(E) R(144) I V(J) R(198); (5) a portion of a radial extending from V(H) at 54° and extending between intersect V(H) R(54) I V(C) R(18) and intersect V(H) R(54) I V(C) R(270); (6) a portion of a radial extending from V(C) at 270° and extending between intersect V(C) R(270) I V(H) R(54) and intersect V(C) R(270) I V(H) R(306); and (7) a portion of a radial extending from V(H) at 306° and extending between intersect V(H) R(306) I V(D) R(90) and intersect V(H) R(306) I V(D) R(342).

3. Smiling Dimple Complex

The smiling dimple pentagon complex 232c (FIG. 20) is positioned on the matrix pentagon complex 134c with V(H) of the dimple complex 232c coincident with V(H) of the matrix complex 134c and V(A) R(180) of the dimple complex 232c coincident with V(A) R(180) of the matrix complex 134c. Features of the frontal smiling overlay system 110c are defined by fragments of this complex 232c comprising: (1) a radial extending from V(B) at 252° and extending to intersect V(B) R(252) I V(F) R(162); (2) a radial extending from V(E) at 180° and extending to intersect V(E) R(108) I V(J) R(198); (3) a radial extending from V(B) at 198° and extending to intersect V(B) R(198) I V(F) R(162); (4) a radial extending from V(E) at 162° and extending to intersect V(E) R(162) I V(J) R(198); (5) a line connecting V(B) and intersect V(G) R(234) I V(C) R(324); (6) a line connecting V(E) and intersect V(I) R(126) I V(D) R(36); (7) a portion of a radial extending from V(B) at 234° and extending between intersect V(B) R(234) I V(C) R(324) and intersect dimple complex V(B) R(234) I matrix complex V(C) R(306); (8) a portion of a radial extending from V(E) at 126° and extending between intersect V(E) R(126) I V(D) R(36) and intersect dimple complex V(E) R(126) I matrix complex V(D) R(54); and (9) a portion of a radial extending from V(B) at 270° and extending between intersect V(B) R(270) I V(A) R(144) and intersect V(B) R(270) I V(A) R(216).

4. Smiling Internal Smile Complex

The smiling internal smile pentagon complex 234c (FIG. 19) is positioned on the matrix pentagon complex 134c with V(A) R(180) of the smile complex 234c coincident to V(A) R(180) of the matrix complex 134c and matrix complex 134c V(B) R(234) coincident to intersect smile complex 134c V(A) R(126) I smile complex 134c V(E) R(72). Features of the frontal smiling overlay system 110c are defined by fragments of this complex 234c comprising: (1) a radial extending from V(B) at 288° and extending to intersect V(B) R(288) I V(F) R(198); (2) a radial extending from V(E) at 72° and extending to intersect V(E) R(72) I V(J) R(162); (3) a radial extending from V(B) at 270° and extending to intersect V(B) R(270) I V(F) R(198); (4) a radial extending from V(E) at 90° and extending to intersect V(E) R(90) I V(J) R(162); (5) a radial extending from V(B) at 234° and extending to intersect V(B) R(234) I V(A) R(162); (6) a radial extending from V(E) at 126° and extending to intersect V(E) R(126) I V(A) R(198); (7) a radial extending from V(B) at 216° and extending to intersect V(B) R(216) I matrix complex V(C) R(306); (8) a radial extending from V(E) at 144° and extending to intersect V(E) R(144) I matrix complex V(D) R(54); (9) a line extending between intersect V(B) R(234) I V(A) R(162) and intersect V(E) R(126) I V(A) R(198); (10) a point at intersect V(G) R(270) I matrix complex V(H) R(18); and (11) a point at intersect V(I) R(90) I matrix complex V(H) R(342).

IV. Lateral Smiling Overlay System

A lateral smiling overlay system 110d will be described in the same manner as the overlay systems 110a, 110b, and 110c were described above.

A. Pentagon Complexes with n=0

The lateral smiling overlay system 110d includes only one pentagon complex of the size n=0. This pentagon complex has a Z value of 1 (see FIG. 16) and is called a lateral smiling matrix pentagon complex 134d.

1. Lateral Smiling Matrix Complex

Features of the lateral smiling overlay system 110d are defined by fragments of the lateral smiling matrix pentagon complex 134d comprising: (1) a radial extending from V(D) at 306° and extending to intersect V(D) R(306) I V(I) R(180); (2) a radial extending from V(I) at 180° and extending to intersect V(I) R(180) I V(D) R(306); (3) a radial extending from V(E) at 162° and extending to intersect V(E) R(162) I V(I) R(108); (4) a portion of a radial extending from V(I) at 126° and extending between intersect V(I) R(126) I V(D) R(342) and intersect V(I) R(126) I V(D) R(54); (5) a portion of a radial extending from V(E) at 144° and extending between intersect V(E) R(144) I V(I) R(18) and intersect V(E) R(144) I V(D) R(18); (6) a portion of a radial extending from V(E) at 126° and, extending between intersect V(E) R(126) I V(I) R(36) and intersect V(E) R(126) I V(D) R(18); (7) a line extending from intersect V(E) R(126) I V(I) R(36) through intersect V(E) R(144) I V(I) R(18) and extending to the line described in (3) above; (8) a line extending from intersect V(E) R(126) I V(I) R(36) to intersect V(E) R(90) I V(J) R(180); (9) a portion of a radial extending from V(E) at 180° and extending between intersect V(E) R(108) I V(I) R(54) and the line described in (8) above; (10) a line extending between intersect V(J) R(180) I V(E) R(90) and intersect V(J) R(162) I V(A) R(216); (11) a portion of a radial extending from V(A) at 216° and extending between intersect V(A) R(216) I V(J) R(162) and intersect V(A) R(216) I V(J) R(144); (12) a line extending between intersect V(A) R(216) I V(J) R(144) and intersect V(A) R(234) I V(J) R(126); (13) a portion of a radial extending from V(A) at 234° and extending between intersect V(A) R(234) I V(J) R(126) and intersect V(A) R(234) I V(J) R(90); (14) a point at intersect V(F) R(252) I V(A) R(180); (15) a radial extending from V(D) at 288° and extending to intersect V(D) R(288) I V(E) R(166.5); (16) a line extending between intersect V(D) R(288) I V(E) R(166.5) and intersect V(D) R(270) I V(E) R(171); and (17) a line extending between intersect V(D) R(270) I V(E) R(171) and intersect V(G) R(252) I V(E) R(180).

B. Pentagon Complexes with n=6

The overlay system 110d has one pentagon complex with n=6 (see FIG. 29). This pentagon complex 112 is a lateral smiling iris pentagon complex 150d and is the same size as the iris pentagon complex 150 of the lateral repose overlay system 110b described above.

1. Smiling Iris Complex

The smiling iris pentagon complex 150d (FIG. 29) is positioned on the matrix complex 134d as is the iris pentagon complex 150 of the lateral repose overlay system 110b described above. Features of the lateral smiling overlay system 110c are defined by fragments of this iris pentagon complex 150d which are the same as the fragments of the iris pentagon complex 150 of the lateral repose overlay system 110b described above.

C. Pentagon Complexes with n=5

The lateral smiling overlay system 110d includes one pentagon complex of the size n=5. This pentagon complex is a lateral smiling internal naris pentagon complex 160d and has a Z value of 1 (see FIG. 26).

1. Lateral Smiling Internal Naris Complex

The lateral smiling internal naris pentagon complex 160d is positioned on the matrix complex 134d as is the internal naris pentagon complex 160 of the frontal repose overlay system 110a described above. Features of the lateral smiling overlay system 110d are defined by fragments of this pentagon complex 160d comprising: (1) a radial extending from V(F) at 324° and extending to intersect V(F) R(324) I V(A) R(36); (2) a portion of a radial extending from V(J) at 180° and extending between intersect V(J) R(180) I V(E) R(54) and intersect V(J) R(180) I V(I) R(90); and (3) points at intersects: (a) V(B) R(0/360) I V(F) R(90); (b) V(A) R(216) I V(J) R(108); and (c) V(I) R(180) I V(D) R(288).

D. Pentagon Complexes with n=4

The lateral smiling overlay system 110d includes four pentagon complexes of the size n=4. These pentagon complexes are: (1) a lateral smiling nasal pentagon complex 170d; (2) a lateral smiling chin button pentagon complex 172d; (3) a lateral smiling eye pentagon complex 174d; and (4) a lateral smiling teeth/lip eversion pentagon complex 224d. All four of these pentagon complexes have Z values of 1 (see FIG. 25).

1. Lateral Smiling Nasal Complex

The lateral smiling nasal pentagon complex 170d (FIG. 25) is positioned on the matrix pentagon complex 134d as is the nasal pentagon complex 170 of the frontal repose overlay system 110a described above. Features of the lateral smiling overlay system 110d are defined by fragments of this pentagon complex 170d comprising: (1) a radial extending from V(I) at 234° and extending to intersect V(I) R(234) I V(D) R(270); (2) a radial extending from V(I) at 126° and extending to intersect V(I) R(126) I V(D) R(342); (3) a radial extending from V(I) at 18° and extending to intersect V(I) R(18) I V(E) R(54); (4) a radial extending from V(G) at 216° and extending to intersect V(G) R(216) I matrix complex V(G) R(270); (5) a portion of a radial extending from V(J) at 144° and extending between intersect V(J) R(144) I V(A) R(198) and intersect V(J) R(144) I V(G) R(252); (6) a portion of a radial extending from V(G) at 270° and extending between intersect V(G) R(270) I V(F) R(198) and intersect V(G) R(270) I V(A) R(198); (7) a portion of a radial extending from V(G) at 252° and extending between intersect V(G) R(252) I V(C) R(324) and intersect V(G) R(252) I V(C) R(306); (8) a portion of a radial extending from V(G) at 252° and extending between intersect V(G) R(252) I V(H) R(0/360) and intersect V(G) R(252) I V(H) R(306); (9) a line connecting intersect V(J) R(198) I V(E) R(72) and intersect V(J) R(162) I V(A) R(216); (10) a line connecting intersect V(J) R(162) I V(A) R(216) and intersect V(A) R(198) I V(B) R(270); (11) a portion of a radial extending from V(D) at 72° and extending between intersect V(D) R(72) I V(I) R(126) and intersect V(D) R(72) I V(I) R(108); (12) a line extending between intersect V(I) R(108) I V(D) R(72) and intersect V(G) R(234) I V(C) R(324); (13) a line extending between intersect V(G) R(234) I V(C) R(324) and intersect nasal complex V(C) R(36) I matrix complex V(G) R(270); and (14) a radial extending from V(G) at 216° and extending to intersect V(G) R(216) I matrix complex V(G) R(270).

2. Lateral Smiling Chin Button Complex

The lateral smiling chin button pentagon complex 172d (FIG. 25) is positioned on the matrix pentagon complex 134d as is the chin button pentagon complex 172 of the frontal repose overlay system 110a described above. Features of the lateral smiling overlay system 110d are defined by fragments of this pentagon complex 172d comprising: (1) a portion of a radial extending from V(I) at 270° and extending between intersect V(I) R(270) I V(J) R(216) and intersect V(I) R(270) I V(J) R(234); (2) a portion of a radial extending from V(J) at 216° and extending between intersect V(J) R(216) I V(I) R(270) and intersect V(J) R(216) I V(I) R(324); (3) a portion of a radial extending from V(E) at 324° and extending between intersect V(E) R(324) I V(J) R(234) and intersect V(E) R(324) I V(A) R(270); and (4) a line connecting intersect V(E) R(324) I V(J) R(234) and intersect V(I) R(324) I V(E) R(216).

3. Lateral Smiling Eye Complex

The lateral smiling eye pentagon complex 174d (FIG. 25) is positioned on the matrix pentagon complex 134d as is the eye pentagon complex 174 of the frontal repose overlay system 110a described above. Features of the lateral smiling overlay system 110d are defined by fragments of this pentagon complex 174d comprising: (1) a radial extending from V(E) at 72° and extending to intersect V(E) R(72) I V(A) R(180); (2) a radial extending from V(E) at 216° and extending to intersect V(E) R(216) I V(I) R(324); (3) a radial extending from V(D) at 324° and extending to intersect V(D) R(324) I V(E) R(216); (4) a radial extending from V(D) at 54° and extending to intersect V(D) R(54) I V(H) R(0/360); (5) a portion of a radial extending from V(B) at 270° and extending between intersect V(B) R(270) I V(A) R(162) and intersect V(B) R(270) I V(A) R(180); (6) a portion of a radial extending from V(H) at 324° and extending between intersect V(H) R(324) I V(D) R(54) and intersect V(H) R(324) I V(I) R(36); (7) a portion of a radial extending from matrix complex V(E) at 180° and extending between intersect matrix complex V(E) R(108) I eye complex V(H) R(0/360) and intersect matrix complex V(E) R(108) I eye complex V(H) R(18); (8) a portion of a radial extending from V(E) at 90° and extending between intersect V(E) R(90) I V(J) R(162) and intersect V(E) R(90) I V(J) R(144); (9) a portion of a radial extending from V(J) at 144° and extending between intersect V(J) R(144) I V(F) R(234) and intersect V(J) R(144) I V(F) R(216); and (10) a portion of a radial extending from V(F) at 216° and extending between intersect V(F) R(216) I V(C) R(324) and intersect V(F) R(216) I V(C) R(306).

4. Lateral Smiling Teeth/Lip Eversion Complex

The lateral smiling teeth/lip eversion pentagon complex 224d (FIG. 25) is positioned on the matrix pentagon complex 134d as is the teeth/lip eversion pentagon complex 224b of the lateral repose overlay system 110b described above. Features of the lateral smiling overlay system 110d are defined by fragments of this pentagon complex 224d comprising: (1) a radial extending from V(E) at 0°/360° and extending to intersect V(E) R(0/360) I V(J) R(234); (2) a portion of a radial extending from V(D) at 270° and extending between intersect V(D) R(270) I V(I) R(216) and intersect V(D) R(270) I V(I) R(198); (3) a portion of a radial extending from V (I) at 288° and extending between intersect V(I) R(288) I V(E) R(198) and intersect V(I) R(288) I V(E) R(252); (4) a portion of a radial extending from V(A) at 234° and extending between intersect V(A) R(234) I V(J) R(108) and intersect V(A) R(234) I V(J) R(198); and (5) a point at intersect V(A) R(306) I V(J) R(18).

E. Pentagon Complexes with n=3

The lateral smiling overlay system 110d includes nine pentagon complexes of the size n=3. These pentagon complexes are: (1) a lateral smiling nose/mouth pentagon complex 184d; (2) a lateral smiling mouth/chin pentagon complex 186d; (3) a lateral smiling chin inferior border pentagon complex 188d; (4) a lateral smiling chin pentagon complex 190d; (5) a lateral smiling side chin pentagon complex 192d; (6) a lateral smiling side nose/mouth pentagon complex 208d; (7) a lateral smiling eye/cheek pentagon complex 196d; (8) a lateral smiling eye brow pentagon complex 200d; and (9) a lateral smiling internal ear pentagon complex 226d. All nine of these pentagon complexes have a Z value of 1 (see FIG. 22).

1. Lateral Smiling Nose/Mouth Complex

The lateral smiling nose/mouth pentagon complex 184d (FIG. 22) is positioned on the matrix pentagon complex 134d as is the nose/mouth pentagon complex 184 of the frontal repose overlay system 110a described above. Features of the lateral smiling overlay system 110d are defined by fragments of this pentagon complex 184d comprising: (1) a portion of a radial extending from V(D) at 0°/360° and extending between intersect V(D) R(0/360) I V(I) R(126) and intersect V(D) R(0/360) I V(I) R(108); (2) a radial extending from V(I) at 180° and extending to intersect V(I) R(108) I V(D) R(0/360); (3) a radial extending from V(I) at 288° and extending to intersect V(I) R(288) I V(E) R(198); (4) a radial extending from V(I) at 18° and extending to intersect V(I) R(18) I V(E) R(162); (5) a portion of a radial extending from V(D) at 0°/360° and extending between intersect V(D) R(0/360) I V(I) R(90) and intersect V(D) R(0/360) I V(E) R(126); (6) a radial extending from V(E) at 90° and extending to intersect V(E) R(90) I V(A) R(198); (7) a portion of a radial extending from V(I) at 54° and extending between intersect V(I) R(54) I V(J) R(162) and intersect V(I) R(54) I V(A) R(198); (8) a portion of a radial extending from V(A) at 198° and extending between intersect V(A) R(198) I V(I) R(54) and intersect V(A) R(198) I V(E) R(90); (9) a line connecting intersect V(A) R(198) I V(E) R(90) and intersect V(F) R(252) I V(J) R(126); (10) a portion of a radial extending from V(E) at 72° and extending between intersect V(E) R(72) I V(J) R(126) and intersect V(E) R(72) I V(J) R(108); (11) a line connecting intersect V(A) R(180) I V(J) R(108) and intersect V(A) R(144) I V(F) R(234); (12) a line connecting intersect V(A) R(144) I V(F) R(234) and intersect V(A) R(126) I V(F) R(216); (13) a radial extending from V(F) at 216° and extending to intersect V(F) R(216) I V(A) R(126); (14) a portion of a radial extending from V(F) at 306° and extending between intersect V(F) R(306) I V(J) R(0/360) and intersect V(F) R(306) I matrix complex V(F) R(234); (15) a radial extending from V(J) at 0°/360° and extending to intersect V(J) R(0/360) I V(F) R(306); (16) a radial extending from V(J) at 18° and extending to intersect V(J) R(18) I V(A) R(306); (17) a radial extending from V(J) at 234° and extending to intersect V(J) R(234) I R(324); (18) a portion of a radial extending from matrix complex V(D) at 36° and extending between intersect matrix complex V(D) R(36) I nose/mouth complex V(E) R(270) and intersect matrix complex V(D) R(36) I nose/mouth complex V(E) R(324); (19) a line connecting intersect V(J) R(18) I V(A) R(306) and intersect V(J) R(0/360) I V(F) R(306); (20) a radial extending from V(J) at 126° and extending to intersect V(J) R(126) I V(A) R(234); (21) a portion of a radial extending from V(A) at 234° and extending between intersect V(A) R(234) I V(J) R(126) and intersect V(A) R(234) I V(J) R(90); (22) a portion of a radial extending from V(J) at 90° and extending between intersect V(J) R(90) I V(A) R(234) and intersect V(J) R(90) I V(A) R(144); (23) a portion of a radial extending from V(A) at 144° and extending between intersect V(A) R(144) I V(F) R(270) and intersect V(A) R(144) I V(F) R(252); (24) a portion of a radial extending from V(F)

at 252° and extending between intersect V(F) R(252) I V(A) R(144) and intersect V(F) R(252) I V(A) R(162); (25) a radial extending from V(F) at 236° and extending to intersect V(F) R(236) I V(J) R(18); (26) a portion of a radial extending from V(J) at 18° and extending between intersect V(J) R(18) I V(F) R(336) and intersect V(J) R(18) I matrix complex V(B) R(270); (27) a portion of a radial extending from V(F) at 351° and extending between intersect V(F) R(351) I matrix complex V(B) R(270) and intersect V(F) R(351) I matrix complex V(F) R(270); (28) a portion of a radial extending from matrix complex V(F) at 270° and extending between intersect matrix complex V(F) R(270) I nose/mouth complex V(F) R(351) and intersect matrix complex V(F) R(270) I matrix complex V(A) R(234).

Additional fragments may be described when this pentagon complex 184d is considered in conjunction with a lateral smiling smiling pentagon complex 236d (which is described below).

2. Lateral Smiling Mouth/Chin Complex

The lateral smiling mouth/chin pentagon complex 186d (FIG. 22) is positioned on the matrix pentagon complex 134d as is the mouth/chin pentagon complex 186 of the frontal repose overlay system 110a described above. Features of the lateral smiling overlay system 110d are defined by fragments of this pentagon complex 186d comprising: (1) a radial extending from V(J) at 198° and extending to intersect V(J) R(198) I V(E) R(90); and (2) a portion of a radial extending from V(J) at 180° and extending between intersect V(J) R(180) I V(E) R(108) and intersect V(J) R(180) V(E) R(126).

3. Lateral Smiling Chin Inferior Border Complex

The lateral smiling chin inferior border pentagon complex 188d (FIG. 22) is positioned on the matrix pentagon complex 134d as is the chin inferior border pentagon complex 188 of the frontal repose overlay system 110a described above. Features of the lateral smiling overlay system 110d are defined by fragments of this pentagon complex 188d comprising: (1) a radial extending from V(J) at 216° and extending to intersect V(J) R(216) I matrix complex V(C) R(288); (2) a portion of a radial extending from V(I) at 18° and extending between intersect V(I) R(18) I V(E) R(162) and intersect V(I) R(18) I V(E) R(90); and (3) a portion of a radial extending from V(D) at 270° and extending between intersect V(D) R(270) I V(I) R(198) and intersect V(D) R(270) I V(I) R(216).

4. Lateral Smiling Chin Complex

The lateral smiling chin pentagon complex 190d (FIG. 22) is positioned on the matrix pentagon complex 134d as is the chin pentagon complex 190 of the frontal repose overlay system 110a described above. Features of the lateral smiling overlay system 110d are defined by fragments of this pentagon complex 190d comprising: (1) a radial extending from V(J) at 180° and extending to intersect V(J) R(180) I V(A) R(234); (2) a portion of a radial extending from V(A) at 234° and extending between intersect V(A) R(234) I V(J) R(180) and intersect V(A) R(234) I V(J) R(198); and (3) a radial extending from V(E) at 144° and extending to intersect V(E) R(144) I V(I) R(54).

5. Lateral Smiling Side Chin Complex

The lateral smiling side chin pentagon complex 192d (FIG. 22) is positioned on the matrix pentagon complex 134d as is the side chin pentagon complex 192 of the frontal repose overlay system 110a described above. Features of the lateral smiling overlay system 110d are defined by fragments of this pentagon complex 192d comprising: (1) a radial extending from V(I) at 180° and extending to intersect V(I) R(108) I V(D) R(36); and (2) a portion of a radial extending from V(C) at 324° and extending between intersect V(C) R(324) I V(D) R(18) and intersect V(C) R(324) I matrix complex V(D) R(90).

6. Lateral Smiling Side Nose/Mouth Complex

The lateral smiling side nose/mouth pentagon complex 208d (FIG. 22) is positioned on the matrix pentagon complex 134d as is the side nose/mouth pentagon complex 208 of the frontal repose overlay system 110a described above. Features of the lateral smiling overlay system 110d are defined by fragments of this pentagon complex 208d comprising: (1) a radial extending from V(H) at 342° and extending to intersect V(H) R(342) I V(I) R(90); (2) a portion of a radial extending from V(D) at 0°/360° and extending between intersect V(D) R(0/360) I V(I) R(72) and intersect V(D) R(0/360) I V(I) R(36); (3) a portion of a radial extending from V(I) at 36° and extending between intersect V(I) R(36) I V(E) R(108) and intersect V(I) R(36) I V(E) R(72); (4) a portion of a radial extending from V(C) at 306° and extending between intersect V(C) R(306) I V(H) R(36) and intersect V(C) R(306) I V(D) R(36); (5) a portion of a radial extending from V(D) at 36° and extending between intersect V(D) R(36) I V(C) R(306) and intersect V(D) R(36) I matrix complex V(C) R(288); and (6) a portion of a radial extending from matrix complex V(C) at 288° and extending between intersect matrix complex V(C) R(288) I nose/mouth complex V(D) R(36) and intersect matrix complex V(C) R(288) I nose/mouth complex V(H) R(0/360).

7. Lateral Smiling Eye/Cheek Complex

The lateral smiling eye/cheek pentagon complex 196d (FIG. 22) is positioned on the matrix pentagon complex 134d as is the eye/cheek pentagon complex 196 of the frontal repose overlay system 110a described above. Features of the lateral smiling overlay system 110d are defined by fragments of this pentagon complex 196d comprising the same fragments of the eye/cheek complex 196b used to define features of the lateral repose overlay system 110b described above.

8. Lateral Smiling Eye Brow Complex

The lateral smiling eye brow pentagon complex 200d (FIG. 22) is positioned on the matrix pentagon complex 134d as is the eye brow pentagon complex 200 of the frontal repose overlay system 110a described above. Features of the lateral smiling overlay system 110d are defined by fragments of this pentagon complex 200d comprising the same fragments of the eye brow complex 200b used to define features of the lateral repose overlay system 110b described above.

9. Lateral Smiling Internal Ear Complex

The lateral smiling internal ear pentagon complex 226d is positioned on the matrix pentagon complex 134d as is the internal ear pentagon complex 134b of the lateral repose overlay system 110b described above. Features of the lateral smiling overlay system 110d are defined by fragments of this pentagon complex 226d comprising the same fragments of the internal ear complex 226b used to define features of the lateral repose overlay system 110b described above.

F. Pentagon Complexes with n=2

The lateral smiling overlay system 110d includes five pentagon complexes of the size n=2. Three of these pentagon complexes have a Z value of 1 (see FIG. 18): (1) a lateral smiling smile pentagon complex 220d; (2) a lateral smiling smiling pentagon complex 236d; and (3) a lateral smiling ear pentagon complex 228d. One has a Z value of $[(2/\Phi) \times (\Phi^{1/3})]$ (see FIG. 21): (4) a lateral smiling external dimple pentagon complex 230d. One has a Z value of 2/Φ (see FIG. 20): (5) a lateral smiling dimple pentagon complex 232d. The last one has a Z value of Φ/2 (see FIG. 19): (6) a lateral smiling internal smile pentagon complex 234d.

1. Lateral Smiling Smile Complex

The lateral smiling smile pentagon complex 220d (FIG. 18) is positioned on the matrix pentagon complex 134d as is the smile pentagon complex 220 of the frontal repose overlay system 110a described above. Features of the lateral smiling overlay system 110d are defined by fragments of this pentagon complex 220d comprising: (1) a portion of a radial extending from V(D) at 288° and extending between intersect V(D) R(288) I V(I) R(162) and intersect V(D) R(288) I V(I) R(252); and (2) a portion of a radial extending from V(E) at 126° and extending between intersect V(E) R(126) I V(I) R(18) and intersect V(E) R(126) I V(I) R(54).

2. Lateral Smiling Smiling Complex

The lateral smiling smiling pentagon complex 236d (FIG. 18) is positioned on the matrix pentagon complex 134d with V(A) R(180) of the smiling complex 136d coincident with V(A) R(180) of the matrix complex 134d and V(F) R(234) of the smiling complex 236d coincident with V(B) R(234) of the matrix complex 134d. Features of the lateral smiling overlay system 110d are defined by fragments of this pentagon complex 136d comprising: (1) a radial extending from V(I) at 18° and extending to intersect V(I) R(18) I V(E) R(90); (2) a portion of a radial extending from V(I) at 90° and extending between intersect V(I) R(90) I V(H) R(324) and intersect V(I) R(90) I V(D) R(18); (3) a portion of a radial extending from V(E) at 144° and extending between intersect V(E) R(144) I V(I) R(18) and intersect V(E) R(144) I V(I) R(90); and (4) a portion of a radial extending from matrix complex V(I) at 108° and extending between intersect matrix complex V(I) R(108) I smiling complex V(I) R(36) and intersect matrix complex V(I) R(108) I smiling complex V(I) R(72).

When considering this smiling complex 236d in conjunction with the lateral smiling nose/mouth pentagon complex 184d described above, additional fragments may be described comprising: (5) a radial extending from nose/mouth complex V(E) at 252° and extending to intersect nose/mouth complex V(E) R(252) I smiling complex V(J) R(198); and (6) a line extending between intersect smiling complex V(A) R(198) I smiling complex V(F) R(234) and intersect smiling complex V(J) R(198) I nose/mouth complex V(E) R(252).

3. Lateral Smiling Ear Complex

The lateral smiling ear pentagon complex 228d (FIG. 18) is positioned on the matrix pentagon complex 134d as is the ear pentagon complex 228b of the lateral repose overlay system 110b described above. Features of the lateral smiling overlay system 110d are defined by fragments of this pentagon complex 228d comprising the same fragments of the ear complex 228b used to define features of the lateral repose overlay system 110b described above.

4. Lateral Smiling External Dimple Complex

The lateral smiling external dimple pentagon complex 238d (FIG. 21) is positioned on the matrix pentagon complex 134d as is the smiling external dimple pentagon complex 230c of the frontal smiling overlay system 110c described above. Features of the lateral smiling overlay system 110d are defined by fragments of this pentagon complex 230d comprising: (1) a point at V(E). Additional fragments of this pentagon complex 230d may be defined if this complex 230d is taken into consideration in conjunction with a lateral smiling internal smile pentagon complex 234d described below.

5. Lateral Smiling Dimple Complex

The lateral smiling dimple pentagon complex 232d (FIG. 20) is positioned on the matrix pentagon complex 134d as is the smiling dimple pentagon complex 232c of the frontal smiling overlay system 110c described above. Features of the lateral smiling overlay system 110d are defined by fragments of this pentagon complex 232d comprising: (1) a point at intersect V(A) R(216) I V(E) R(126).

6. Lateral Smiling Internal Smile Complex

The lateral smiling internal smile pentagon complex 234d (FIG. 19) is positioned on the matrix pentagon complex 134d as is the smiling internal smile pentagon complex 234c of the frontal smiling overlay system 110c described above. Features of the lateral smiling overlay system 110d are defined by fragments of this pentagon complex 234d comprising: (1) a radial extending from V(E) at 198° and extending to intersect V(E) R(198) I V(I) R(270).

When considering this complex 234d in conjunction with the lateral smiling external dimple pentagon complex 230d described above, additional fragments may be described comprising: (2) a portion of a radial extending from dimple complex V(J) at 180° and extending between intersect dimple complex V(J) R(180) I dimple complex V(I) R(36) and intersect dimple complex V(J) R(180) I smiling complex V(E) R(198); and (3) a portion of a radial extending from V(I) at 36° and extending between intersect dimple complex V(I) R(36) I dimple complex V(J) R(180) and intersect dimple complex V(I) R(36) I smiling complex V(E) R(198).

While an embodiment of the present invention has been shown and described, various modifications may be made without departing from the scope of the present invention, and all such modifications and equivalents are intended to be covered.

I claim:

1. A method for recording and analyzing an image of a human face comprising aligning the face relative to an image-recording device, recording an image of the face, comparing the major anthropometric points on the image of the face with an overlay system comprised of a plurality of line segments and points that form the features of an aesthetically ideal human face, the overlay system having been created by selecting portions from a plurality of regular pentagons and radials thereof to form the features of the aesthetically ideal human face.

2. The method of claim 1 wherein the size of each the plurality of regular pentagons is related by the Φ proportion.

3. A method for creating a system to analyze the human face comprising:

creating a series of regular pentagons whose relative sizes are related by the Φ proportion, selecting line segments from at least one pentagon complex comprised of the regular pentagons and a plurality of radials thereof combining the selected line segments to form the features of an ideal human face, and comparing said features of the ideal human face with the actual features of the subject's face to evaluate the subject's facial components.

4. The method of claim 3 wherein the features of the ideal human face are fixed in a transparency.

5. The method of claim 3 wherein the feature of the ideal human face represent a profile view of a face in repose.

6. The method of claim 3 wherein the features of the ideal human face represent a profile view of a face in repose.

7. The method of claim 3 wherein the features of the ideal human face represent a frontal view of a smiling face.

8. The method of claim 3 wherein the features of the ideal human face represent a profile view of a smiling face.

9. A method to correct variations from a desired appearance of the human face comprising:

fixing the position of a subject's face, establishing major anthropometric points on the subject's face, applying an overlay system to the subject's image and aligning the overlay system with the facial image so that said major anthropometric points coincide, wherein said overlay system is comprised of a plurality of line segments selected from a series of regular pentagons of at least two different sizes and wherein the size of at least two of said regular pentagons of different sizes is related by the $\Phi$ proportion.

10. The method of claim 9 wherein the position of the subject's face is a frontal view.

11. The method of claim 9 wherein the position of the subject's face is a profile view.

12. The method of claim 9 wherein the overlay system is comprised of an outline of ideal facial features in a smiling face.

13. The method of claim 9 wherein the overlay system is comprised of an outline of ideal facial features in a face in repose.

14. An overlay system comprising an outline of an ideal human face wherein said outline is comprised of line segments selected from a first complex of regular pentagons and line segments selected from a second complex of regular pentagons wherein the size of the pentagons in the second complex is related to the size of the pentagons in the first complex by the $\Phi$ proportion, and means for applying said outling to the image of a subject's face for analyzing the subject's facial components.

15. The overlay system of claim 14 wherein said ideal human face is a frontal view.

16. The overlay system of claim 14 wherein said ideal human face is a profile view.

17. The overlay system of claim 14 wherein said ideal human face is a face in repose.

18. The overlay system of claim 14 wherein said ideal human face is a smiling face.

19. A method to construct a two-dimensional geometric form to describe the form of the human face comprising providing a first pentagon complex comprised of a pair of regular pentagons of equal size having equal sides and equal internal angles and where said regular pentagons are superimposed in an inverted relationship with a common center, creating radials comprised of lines drawn from each vertex of each of said regular pentagons to each other vertex of each of said regular pentagons, forming at least a second pentagon complex wherein the size of said first and second pentagon complexes are related by the $\Phi$ proportion, and wherein said first and second pentagon complexes share at least one common radial or intersect of said radials, selecting portions of said radials and intersects of said radials to create said two-dimensional geometric form which is comprised of major anthropometric points of the human face, and applying said two-dimensional geometric overlay system to the image of a subject's face for analyzing the subject's facial components.

20. The method of claim 19 further comprising the step of analyzing the face of a human by comparison with said two-dimensional geometric form.

21. The method of claim 19 further comprising the step of altering the appearance of the human face to more closely coincide with said two dimensional geometric form.

22. The method of claim 21 wherein said alteration is surgical.

23. The method of claim 21 wherein said alteration is achieved by the application of cosmetics.

24. A two-dimensional geometric overlay system to describe the form of an ideal human face comprising a first pentagon complex comprised of a pair of regular pentagons of equal size having equal sides and equal internal angles and where said regular pentagons are superimposed in an inverted relationship with a common center, radials comprised of lines drawn from each vertex of each of said regular pentagons to each other vertex of each of said regular pentagons, at least a second pentagon complex wherein the size of said first and second pentagon complexes are related by the $\Phi$ proportion, and wherein said first and second pentagon complexes share at least one common radial or intersect of said radials, portions of said radials and intersects of said radials create said two-dimensional geometric overlay system which is comprised of major anthropometric points of the ideal human face, and means for applying said overlay system to the image of a subject's face for analyzing the subject's facial components.

25. The overlay system of claim 24 wherein said ideal human face is a frontal view.

26. The overlay system of claim 24 wherein said ideal human face is a profile view.

27. The overlay system of claim 24 wherein said ideal human face is a face in repose.

28. The overlay system of claim 24 wherein said ideal human face is a smiling face.

* * * * *